United States Patent
Saito et al.

(10) Patent No.: US 6,764,778 B2
(45) Date of Patent: Jul. 20, 2004

(54) THIN FILM MAGNETIC ELEMENT WITH ACCURATELY CONTROLLABLE TRACK WIDTH AND METHOD OF MANUFACTURING THE SAME

(75) Inventors: Masamichi Saito, Niigata-ken (JP); Naoya Hasegawa, Niigata-ken (JP); Toshihiro Kuriyama, Niigata-ken (JP); Eiji Umetsu, Niigata-ken (JP); Kenichi Tanaka, Niigata-ken (JP); Yosuke Ide, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 198 days.

(21) Appl. No.: 09/997,910

(22) Filed: Oct. 31, 2001

(65) Prior Publication Data

US 2002/0051897 A1 May 2, 2002

(30) Foreign Application Priority Data

| Nov. 1, 2000 | (JP) | 2000-334232 |
| Nov. 1, 2000 | (JP) | 2000-334239 |
| Nov. 1, 2000 | (JP) | 2000-334268 |
| Apr. 24, 2001 | (JP) | 2001-125565 |
| Apr. 24, 2001 | (JP) | 2001-125580 |
| Apr. 24, 2001 | (JP) | 2001-125596 |

(51) Int. Cl.$^7$ ............... G11B 5/27; G11B 5/33; G11B 5/39
(52) U.S. Cl. ............... 428/692; 360/324.12
(58) Field of Search ............... 360/313, 314, 360/322, 324–324.12, 326; 428/326, 457, 692

(56) References Cited

U.S. PATENT DOCUMENTS

| 5,408,377 | A | | 4/1995 | Gurney et al. |
| 5,465,185 | A | | 11/1995 | Heim et al. |
| 5,701,223 | A | | 12/1997 | Fontana, Jr. et al. |
| 5,708,358 | A | * | 1/1998 | Ravipati ............ 324/252 |
| 5,751,521 | A | | 5/1998 | Gill |
| 5,949,623 | A | * | 9/1999 | Lin ............ 360/113 |
| 6,030,753 | A | | 2/2000 | Lin |
| 6,271,997 | B1 | * | 8/2001 | Gill ............ 360/314 |
| 6,329,078 | B1 | * | 12/2001 | Tsuge ............ 428/678 |
| 6,466,419 | B1 | * | 10/2002 | Mao ............ 360/324.12 |

FOREIGN PATENT DOCUMENTS

JP  11-121832  * 4/1999

* cited by examiner

Primary Examiner—Paul Thibodeau
Assistant Examiner—Nikolas J. Uhlir
(74) Attorney, Agent, or Firm—Brinks Hofer Gilson & Lione

(57) ABSTRACT

A longitudinal bias layer is laminated above a free magnetic layer with a nonmagnetic layer provided therebetween so that the magnetization direction of the free magnetic layer is oriented by RKKY interaction with the longitudinal bias layer. The RKKY interaction exerts only between the longitudinal bias layer and the regions of the free magnetic layer which are located directly below both ends D of the longitudinal bias layer. Therefore, a thin film magnetic element can be provided, in which the width dimension of a recess formed in the longitudinal bias layer coincides with the magnetic track width.

57 Claims, 37 Drawing Sheets

FIG. 44
PRIOR ART
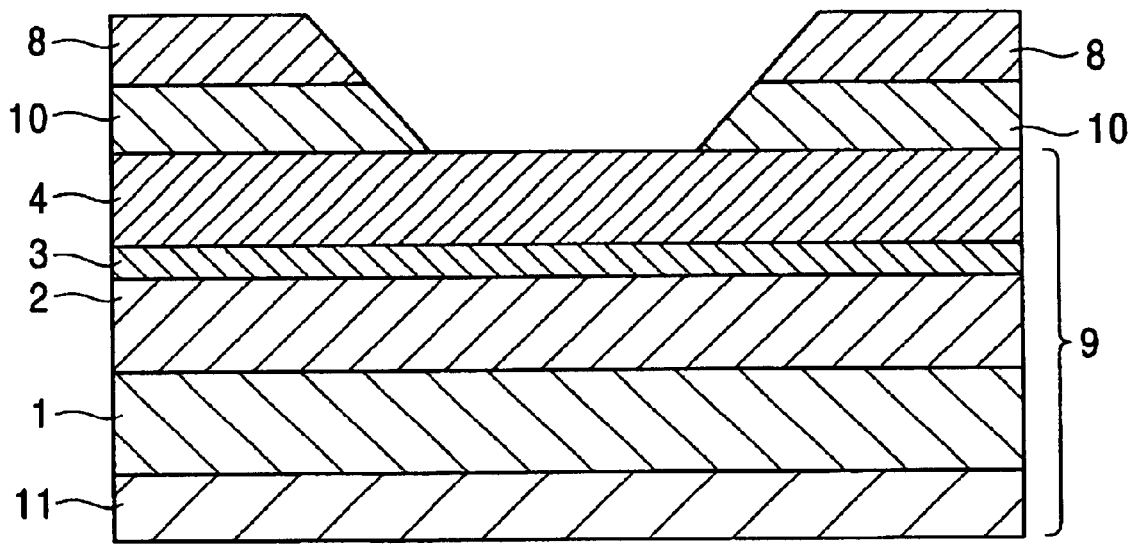
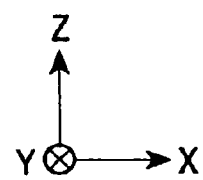

THIN FILM MAGNETIC ELEMENT WITH ACCURATELY CONTROLLABLE TRACK WIDTH AND METHOD OF MANUFACTURING THE SAME

BACKGROUND OF THE INVENTION

1. Field of the Invention

The present invention relates to a so-called thin film magnetic element, in which electric resistance changes according to the relation between the magnetization direction of a pinned magnetic layer and the magnetization direction of a free magnetic layer affected by an external magnetic field, and particularly to a thin film magnetic element adaptable for track narrowing.

2. Description of the Related Art

FIG. 18, designated "PRIOR ART," is a sectional view of the structure of a conventional thin film magnetic element as viewed from the air bearing surface (ABS) side.

The thin film magnetic element shown in FIG. 18 is referred to as a "spin valve thin film magnetic element" which is one of GMR (giant magnetoresistive) elements utilizing a giant magnetoresistive effect, for detecting a recording magnetic field from a recording medium such as a hard disk or the like.

The spin valve thin film magnetic element comprises a multilayer film 9 comprising an underlying layer 6, an antiferromagnetic layer 1, a pinned magnetic layer 2, a nonmagnetic conductive layer 3, a free magnetic layer 4, and a protecting layer 7, which are laminated in turn from the bottom. A pair of hard bias layers 5 are formed on both sides of the multilayer film 9, and a pair of electrode layers 8 are formed on the hard bias layers 5. Each of the underlying layer 6 and the protecting layer 7 comprises a Ta (tantalum) film or the like. The track width Tw is determined by the width dimension of the upper surface of the multilayer film 9.

Generally, the antiferromagnetic layer 1 comprises a Fe—Mn (iron-manganese) alloy film or a Ni—Mn (nickel-manganese) alloy film, each of the pinned magnetic layer 2 and the free magnetic layer 4 comprises a Ni—Fe (nickel-iron) alloy film, the nonmagnetic conductive layer 3 comprises a Cu (copper) film, the hard bias layers 5 comprise a Co—Pt (cobalt-platinum) alloy film, and the electrode layers 8 comprise a Cr (chromium) film.

As shown in FIG. 18, magnetization of the pinned magnetic layer 2 is put into a single magnetic domain state in the Y direction (the direction of a leakage magnetic field from a recording medium; height direction) by an exchange anisotropic magnetic field with the antiferromagnetic layer 1. Magnetization of the free magnetic layer 4 is oriented in the X direction by the influence of a bias magnetic field from the hard bias layers 5.

Namely, the magnetization direction of the pinned magnetic layer 2 is set to be perpendicular to the magnetization direction of the free magnetic layer 4.

In the spin valve thin film magnetic element, a sensing current is supplied to the pinned magnetic layer 2, the nonmagnetic conductive layer 3 and the free magnetic layer 4 from the electrode layers 8 respectively formed on the hard bias layers 5. The movement direction of the recording medium such as a hard disk or the like coincides with the Z direction. When a leakage magnetic field is applied from the recording medium in the Y direction, the magnetization direction of the free magnetic layer 4 is changed from the X direction to the Y direction. As a result, the electric resistance changes based on the relation between the change in the magnetization direction of the free magnetic layer 4 and the pinned magnetization direction of the pinned magnetic layer 2 (this is referred to as the "magnetoresistive effect"), and thus the leakage magnetic field from the recording medium is detected by a voltage change based on the change in the electric resistance value.

However, the conventional thin film magnetic element shown in FIG. 18 has the following problems.

As described above, the magnetization direction of the pinned magnetic layer 2 is put into the single magnetic domain state and pinned in the Y direction, but the hard bias layers 5 magnetized in the X direction are provided on both sides of the pinned magnetic layer 2. Therefore, particularly, magnetization at either end of the pinned magnetic layer 2 is not pinned in the Y direction due to the influence of the bias magnetic fields of the hard bias layers 5.

Namely, the magnetization direction of the free magnetic layer 4 put into the single magnetic domain state in the X direction is not perpendicular to the magnetization direction of the pinned magnetic layer 2 due to magnetization of the hard bias layers 5 in the X direction, particularly, in the vicinities of the side ends of the multilayer film 9. The reason for setting the magnetization directions of the free magnetic layer 4 and the pinned magnetic layer 2 to be perpendicular to each other is that magnetization of the free magnetic layer 4 can be easily changed with a small external magnetic field to greatly change the electric resistance, thereby improving reproduction sensitivity. The other reason is that the perpendicular relation permits the formation of an output waveform having good symmetry.

Furthermore, in the thin film magnetic element shown in FIG. 18, the side surfaces of the multilayer film 9 are inclined, and the inclination angle e of the side surfaces of the multilayer film 9 readily varies with the product. A variation in the inclination angle causes a variation in the length of the free magnetic layer 4 in the track width direction. Namely, the width dimension Ew of the sensitive zone $E_A$ exhibiting the magnetoresistive effect also varies to cause the problem of causing a variation in magnetic field sensitivity of the thin film magnetic element.

In the multilayer film 9, the central zone excluding the dead zones $D_A$ is a sensitive zone $E_A$ which substantially contributes to reproduction of the recording magnetic field and which exhibits the magnetoresistive effect. The width of the sensitive zone $E_A$ is shorter than the track width Tw set at the time of formation of the multilayer film 9 by an amount corresponding to the width of the dead zones $D_A$.

In this way, in the magnetoresistive element, the dead zones $D_A$ which less contributes to reproduced output are formed in the multilayer film 9 near the both sides thereof, and thus the dead zones $D_A$ are only zones in which the DC resistance value (DCR) is increased.

In recent years, the track width Tw of the thin film magnetic element has been further decreased with a further increase in recording density of a magnetic recording medium, and thus the track width Tw has been required to be decreased to 0.5 μm or less. However, the width dimension Dw of the dead zones $D_A$ is about 0.1 μm, and with a track width Tw of 0.5 μm or less, the ratio of the width dimension Dw of the dead zones to the track width Tw is increased to cause difficulties in accurately controlling the width dimension Ew of the sensitive zone $E_A$. When the ratio of the width dimension Dw of the dead zones $D_A$ to the track width Tw is increased, reproduced output is also decreased.

Furthermore, in the thin film magnetic element shown in FIG. 18, the side surfaces of the multilayer film 9 are inclined, and the inclination angle θ of the side surfaces of the multilayer film 9 readily varies with the product. A variation in the inclination angle causes a variation in the length of the free magnetic layer 4 in the track width direction. Namely, the width dimension Ew of the sensitive zone $E_A$ exhibiting the magnetoresistive effect also varies to cause the problem of causing a variation in magnetic field sensitivity of the thin film magnetic element.

FIG. 44, designated as "PRIOR ART," is a sectional view showing the structure of another thin film magnetic element manufactured by a conventional manufacturing method, as viewed from the ABS side.

The thin film magnetic element shown in FIG. 44 is called a spin valve thin film magnetic element which is one of GMR (giant magnetoresistive) elements utilizing the giant magnetoresistive effect, for detecting a recording magnetic field from a recording medium such as a hard disk or the like.

The spin valve thin film magnetic element shown in FIG. 44 comprises a multilayer film 9 comprising a substrate 11, an antiferromagnetic layer 1, a pinned magnetic, layer 2, a nonmagnetic conductive layer 3, and a free magnetic layer 4, which are laminated in turn from the bottom. A pair of longitudinal bias layers 10 are formed on the multilayer film 9, and a pair of electrode layers 8 are formed on the longitudinal bias layers 10.

Generally, each of the antiferromagnetic layer 1 and the longitudinal bias layers 10 comprises a Fe—Mn (iron-manganese) alloy film or a Ni—Mn (nickel-manganese) alloy film. Each of the pinned magnetic layer 2 and the free magnetic layer 4 comprises a Ni—Fe (nickel-iron) alloy film. The nonmagnetic conductive layer 3 comprises a Cu (copper) film, and the electrode layers 8 comprise a Cr film.

As shown in FIG. 44, magnetization of the pinned magnetic layer 2 is preferably put into the single magnetic domain state in the Y direction (the direction of a leakage magnetic field from a recording medium; height direction) by an exchange anisotropic magnetic field with the antiferromagnetic layer 1. Magnetization of the free magnetic layer 4 is preferably oriented in the X direction by the influence of an exchange anisotropic magnetic field from the longitudinal bias layers 10.

Namely, the magnetization direction of the pinned magnetic layer 2 is set to be perpendicular to the magnetization direction of the free magnetic layer 4.

In the spin valve thin film magnetic element, a sensing current is supplied to the free magnetic layer 4, the nonmagnetic conductive layer 3 and the pinned magnetic layer 2 from the electrode layers 8 respectively formed on the longitudinal bias layers 10. The movement direction of the recording medium such as a hard disk or the like coincides with the Z direction. When a leakage magnetic field is applied from the recording medium in the Y direction, the magnetization direction of the free magnetic layer 4 is changed from the X direction to the Y direction. As a result, the electric resistance changes according to the relation between the change in the magnetization direction of the free magnetic layer 4 and the pinned magnetization direction of the pinned magnetic layer 2 (this is referred to as the "magnetoresistive effect"), and thus the leakage magnetic field from the recording medium is detected by a voltage change based on the change in the electric resistance value.

In manufacturing the spin valve thin film magnetic element shown in FIG. 44, the antiferromagnetic layer 1, the pinned magnetic layer 2, the nonmagnetic conductive layer 3, and the free magnetic layer 4 are continuously successively deposited on the substrate 11 to form the multilayer film 9. Then the longitudinal bias layers 10 and the electrode layers 8 are further continuously deposited on the multilayer film 9.

After the layers from the antiferromagnetic layer 1 to the electrode layers 8 are deposited, first magnetic field annealing must be performed for orienting the magnetization direction of the pinned magnetic layer 2 in the Y direction. Then the second magnetic field annealing must be performed for orienting the magnetization direction of the free magnetic layer 4 in the X direction.

However, in the first magnetic field annealing and the second magnetic field annealing after the layers from the antiferromagnetic layer 1 to the electrode layers 8 are deposited, the exchange anisotropic magnetic field exerting on the interface between the antiferromagnetic layer 1 and the pinned magnetic layer 2. The inclination is changed from the Y direction to the X direction in the second magnetic field annealing. As a result, the magnetization directions of the pinned magnetic layer 2 and the free magnetic layer 4 are not perpendicular to each other to cause the problem of increasing a degree (asymmetry) with which the symmetry of a output signal waveform cannot be obtained.

The above-described problem significantly occurs when the antiferromagnetic layer 1 and the longitudinal bias layers 10 are made of antiferromagnetic materials having the same composition.

SUMMARY OF THE INVENTION

The present invention has been achieved for solving the above problems of conventional elements, and an object of the present invention is to provide a thin film magnetic element in which no dead zone is formed in a multilayer film having the magnetoresistive effect so that a track width can be precisely controlled, and a decrease in reproduced output can be prevented.

Another object of the present invention is to provide a method of manufacturing a spin valve thin film magnetic element comprising first and second antiferromagnetic layers which are laminated in the thickness direction with other layers including a pinned magnetic layer and a free magnetic layer provided therebetween, the method comprising annealing the first antiferromagnetic layer in a first magnetic field, and laminating the second antiferromagnetic layer and annealing the second antiferromagnetic layer in a second magnetic field so that the magnetization directions of the pinned magnetic layer and the free magnetic layer can be made perpendicular to each other.

In order to achieve the objects, in accordance with an aspect of the present invention, a thin film magnetic element comprises a multilayer film exhibiting a magnetoresistive effect, and a first antiferromagnetic layer for orienting the magnetization direction of at least one magnetic layer which constitutes the multilayer film, wherein the first antiferromagnetic layer is laminated above or below the multilayer film through a nonmagnetic layer.

With the first antiferromagnetic layer laminated above or below the multilayer film through the nonmagnetic layer, the magnetization direction of a magnetic layer, which is oriented by the first antiferromagnetic layer, is oriented by RKKY (method of measuring exchange force) interaction with the first antiferromagnetic layer. The RKKY interaction exerts only between the antiferromagnetic layer having a thickness with antiferromagnetism and a magnetic layer directly above or below the antiferromagnetic layer, but does not exert on a region deviating from the region directly above or below the antiferromagnetic layer having a thickness with antiferromagnetism.

Therefore, the region of the track width (optical track width) Tw set at the time of formation of the multilayer film substantially contributes to reproduction of a recording magnetic field, and thus functions as the sensitive zone exhibiting the magnetoresistive effect. Namely, the thin film magnetic element of the present invention has an optical track width equal to a magnetic track width, and can thus easily comply with an increase in recording density of a recording medium, as compared with a hard bias system which easily causes difficulties in controlling the magnetic track due to the presence of the dead zones.

Also, no dead zone is formed in the region of the track width (optical track width) Tw set at the time of formation of the multilayer film. Therefore, when the optical track width Tw of the thin film magnetic element is decreased to comply with a higher recording density, a decrease in reproduced output can be suppressed.

Furthermore, in the thin film magnetic element of the present invention, the side surfaces of the multilayer film can be formed perpendicularly to the substrate surface, thereby suppressing a variation in the length of the free magnetic layer in the width direction thereof.

In the present invention, the magnetization direction of the magnetic layer is oriented by RKKY interaction with the first antiferromagnetic layer, and thus exchange coupling force can be strengthened as compared with the case of direct contact between the first antiferromagnetic layer and the magnetic layer.

In the present invention, the nonmagnetic layer is preferably made of a conductive material.

Particularly, the nonmagnetic layer is preferably made of at least one element selected from Ru, Cu, Ag, and Au.

More preferably, the nonmagnetic layer is made of Ru, and has a thickness of 8 to 11 Å (angstrom).

In the present invention, the nonmagnetic layer is made of a conductive material so that the nonmagnetic layer can be caused to function as a backed layer having a spin filter effect.

When the backed layer having the spin filter effect is provided in contact with the free magnetic layer, the center height of the laminate at which a sensing current flows can be shifted to the backed layer Side as compared with a case without the backed layer. Namely, the center height of the sensing current flow deviates from the free magnetic layer to decrease the strength of a sensing current magnetic field at the position of the free magnetic layer, thereby decreasing the influence of the sensing current magnetic field on variable magnetization of the free magnetic layer. Therefore, asymmetry can be decreased.

The "asymmetry" means the degree of asymmetry of a reproduced output waveform, and the obtained reproduced output having a symmetry waveform has low asymmetry. Therefore, the reproduced output waveform having asymmetry close to zero has excellent symmetry.

The asymmetry is zero when the magnetization directions of the free magnetic layer and the pinned magnetic layer are perpendicular to each other. When the asymmetry greatly deviates, information from a medium cannot be accurately read to cause an error. Therefore, with lower asymmetry, reproduced signal processing has improved reliability, thereby providing an excellent spin valve thin film magnetic element.

In the present invention, the mean free path of spin-up electrons contributing the magnetoresistive effect can be lengthened to obtain a high rate of change in resistance due to the so-called spin filter effect.

In the spin valve thin film magnetic element, with the sensing current applied, conduction electrons mainly move near a nonmagnetic material having low electric resistance. The conduction electrons include the two types of electrons including spin-up electrons and spin-down electrons which are present in stochastically equal amounts.

In the spin valve thin film magnetic element, the rate of change in magnetoresistance shows positive correlation with the difference between the mean free paths of the two types of conduction electrons.

The spin-down electrons are scattered at the interface between the nonmagnetic material layer and the free magnetic layer regardless of the direction of the applied external magnetic field, and the probability of movement to the free magnetic layer is kept down. Therefore, the mean free path of the spin-down conduction electrons remains shorter than that of the spin-up conduction electrons.

On the other hand, with respect to the spin-up conduction electrons, when the magnetization direction of the free magnetic layer is oriented in parallel with the magnetization direction of the pinned magnetic layer with the external magnetic field applied, the spin-up conduction electrons have the high probability of movement from the nonmagnetic material layer to the free magnetic layer to lengthen the mean free path. However, when the magnetization direction of the nonmagnetic material layer is changed from the parallel state with the magnetization direction of the pinned magnetic layer by the external magnetic field, the probability of scattering at the interface between the nonmagnetic material layer and the free magnetic layer increases to shorten the mean free path of the spin-up conduction electrons.

In this way, the mean free path of the spin-up conduction electrons is greatly changed by the action of the external magnetic field in comparison to the mean free path of the spin-down conduction electrons, thereby significantly changing the difference between the mean free paths. Therefore, the mean free path of all conduction electrons is also greatly changed to increase the rate of change (AR/R) in magnetoresistance of the spin valve thin film magnetic element.

When the backed layer is connected to the free magnetic layer, the spin-up conduction electrons moving in the free magnetic layer move into the backed layer to further lengthen the mean free path of the spin-up conduction electrons in proportion to the thickness of the backed layer. Therefore, the so-called spin filter effect can be exhibited to increase the difference between the mean free paths of the conduction electrons, thereby further increase the rate of change (AR/R) in magnetoresistance of the spin valve thin film magnetic element.

The present invention can be applied to a thin film magnetic element comprising a multilayer film comprising a second antiferromagnetic layer, a pinned magnetic layer in which the magnetization direction is pinned by the second antiferromagnetic layer, a nonmagnetic material layer, and a free magnetic layer in which the magnetization direction changes with an external magnetic field, wherein the first antiferromagnetic layer is laminated above or below the free magnetic layer with the nonmagnetic layer provided therebetween so that the magnetization direction of the free magnetic layer is oriented in a direction crossing the magnetization direction of the pinned magnetic layer by magnetic coupling with the first antiferromagnetic layer.

In the present invention, another antiferromagnetic layer is preferably provided between the nonmagnetic layer and the first antiferromagnetic layer.

The other antiferromagnetic layer has the function to prevent oxidation of the nonmagnetic layer due to contact with the air in deposition of the first antiferromagnetic layer above the nonmagnetic layer in the method of manufacturing a thin film magnetic element of the present invention which will be described below.

As the first antiferromagnetic layer, a pair of antiferromagnetic layers can be formed above or below the nonmagnetic layer to be arranged with a predetermined space therebetween in the track width direction.

The pair of the antiferromagnetic layers orients the magnetization direction of the free magnetic layer in the predetermined direction by RKKY coupling with the free magnetic layer. Namely, the pair of the antiferromagnetic layers functions as side bias layers.

When the first antiferromagnetic layers function as the side bias layers, the thickness of the other antiferromagnetic layer is preferably more than 0 and 30 Å or less. With the other antiferromagnetic layer having a thickness of 30 Å or more, it is difficult to make the magnetization direction of the first antiferromagnetic layer intersect the magnetization direction of the second antiferromagnetic layer at right angles in the method of manufacturing a thin film magnetic element of the present invention which will be described below.

Furthermore, a recess having a width dimension corresponding to the track width is preferably formed in the first antiferromagnetic layer.

Particularly, the recess preferably has the side surfaces perpendicular to the surface of the substrate.

In the present invention, the track width of the thin film magnetic element is determined by the width dimension of the recess. Namely, the magnetization direction of a magnetic layer such as the free magnetic layer or the like, in which the magnetization direction changes with the external magnetic field, can be changed only in the region overlapped with the bottom of the recess. The recess can be formed only by cutting the first antiferromagnetic layer having a uniform thickness by reactive ion etching (RIE) or ion milling perpendicularly to the surface of the substrate. Therefore, the recess with an accurate width dimension can be formed. Namely, the track width of the thin film magnetic element can be precisely defined.

In the present invention, the bottom of the recess can be provided in the first antiferromagnetic layer. In this case, the thickness of the region of the first antiferromagnetic layer, which is overlapped with the bottom of the recess, or the total thickness of the region of the first antiferromagnetic layer, which is overlapped with the bottom of the recess, and the other antiferromagnetic layer is preferably 30 Å or less because the magnetization directions of the first and second antiferromagnetic layers can easily be caused to cross at right angles in the method of manufacturing a thin film magnetic element of the present invention which will be described below.

Alternatively, the bottom of the recess may be provided in the other antiferromagnetic layer.

In this case, the thickness of the region of the other antiferromagnetic layer, which is overlapped with the bottom of the recess, is preferably more than 0 and 30 Å or less. The total thickness of the region of the first antiferromagnetic layer, which is overlapped with the bottom of the recess, and the other antiferromagnetic layer, or the thickness of the region of the other antiferromagnetic layer, which is overlapped with the bottom of the recess, is a thickness which causes no exchange anisotropic magnetic field between the fist antiferromagnetic layer or the other antiferromagnetic layer and at least one magnetic layer.

Alternatively, the bottom of the recess may be provided in the nonmagnetic layer.

In the present invention, as the other antiferromagnetic layer, a specular reflection layer can be formed by using a material which can form an energy gap having the high probability of specular reflection for maintaining the spin state of conduction electrons, extending the mean free path of conduction electrons by the specular reflection effect.

The other antiferromagnetic layer comprising the specular reflection layer, which extends the mean free path of the conduction electrons by the specular reflection effect, can form a potential barrier at the interface between the antiferromagnetic layer and the nonmagnetic layer, so that the spin-up conduction electrons moving in the free magnetic layer and the nonmagnetic layer can be reflected while maintaining the spin state to further extend the mean free path of the spin-up conduction electrons.

Namely, the mean free path of all conduction electrons can be greatly changed by the action of the external magnetic field to significantly increase the rate of change ($\Delta R/R$) in magnetoresistance of the spin valve thin film magnetic element.

The other antiferromagnetic layer comprising the specular reflection layer may comprise a single layer film or multilayer film made of, for example, a semi-metal Heusler alloy such as NiMnSb, PtMnSb, or the like. By using such a material, a sufficient potential barrier can be formed between the other antiferromagnetic layer and the adjacent layer, thereby obtaining the sufficient specular reflection effect.

In the present invention, the thickness of the free magnetic layer is preferably set in the range of 15 to 45 Å.

When the free magnetic layer has a relatively small thickness, the difference between the mean free paths of the spin-up conduction electrons and the spin-down conduction electrons is effectively increased by the spin filter effect and the specular reflection effect.

With the free magnetic layer having a thickness of less than 15 Å, the free magnetic layer cannot easily be formed to function as a ferromagnetic material layer, thereby failing to obtain the sufficient magnetoresistive effect.

With the free magnetic layer having a thickness of over 45 Å, the number of the spin-up conduction electrons scattered before reaching the specular reflection layer is increased to undesirably decrease the rate of change in the rate of resistance change with the specular effect.

The pinned magnetic layer preferably comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other.

When the pinned magnetic layer comprises ferromagnetic material layers laminated with a nonmagnetic intermediate layer provided therebetween in the thickness direction, the magnetization directions of the ferromagnetic material layers are pinned by each other to strongly pin the magnetization direction of the whole pinned magnetic layer in a predetermined direction. Namely, a large value of exchange coupling magnetic field Hex between the second antiferromagnetic layer and the pinned magnetic layer can be obtained. Therefore, in magnetic field annealing for orienting the magnetization direction of the first antiferromagnetic layer in the track width direction after or before magnetic field annealing for orienting the magnetization direction of the second antiferromagnetic layer in the height direction, the longitudinal bias magnetic field applied by the first antiferromagnetic layer can be increased while the magnetization of the pinned magnetic layer is prevented from being inclined in the track width direction and pinned.

Furthermore, a demagnetizing field (dipole magnetic field) due to pinned magnetization of the pinned magnetic layer can be canceled by canceling the static magnetic field coupling between the plurality of ferromagnetic material layers. Therefore, contribution to variable magnetization of the free magnetic layer from the demagnetizing field (bipolar magnetic field) due to pinned magnetization of the pinned magnetic layer can be decreased.

Therefore, the direction of variable magnetization of the tree magnetic layer can be easily corrected in the desired direction, thereby obtaining a thin film magnetic element having excellent symmetry with low asymmetry.

Also, the demagnetizing field (bipolar magnetic field) Hd due to pinned magnetization of the pinned magnetic layer has a nonuniform distribution in which the demagnetizing field is high at the ends, and low at the center in the direction of the element height. Therefore, in some cases, the free magnetic layer is inhibited from being put into the single magnetic domain state. However, by using the above laminated structure for the pinned magnetic layer, the demagnetizing field Hd can be made substantially zero Hd=0, thereby preventing the occurrence of Barkhausen noise due to the nonuniformity in magnetization which is caused by a magnetic domain wall formed in the free magnetic layer.

The free magnetic layer preferably comprises a plurality of ferromagnetic material layers having magnetic moments of different magnitudes of per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other. This is because an effect equivalent to the effect of decreasing the thickness of the free magnetic layer can be obtained, and thus magnetization of the free magnetic layer easily changes to improve the magnetic field sensitivity of a magnetoresistive element.

The magnitude of magnetic moment per unit area of each of the ferromagnetic material layers is represented by the product of the saturation magnetization (Ms) and the thickness (t) of the ferromagnetic layer.

Each of the nonmagnetic intermediate layers can be made of an alloy of at least one element of Ru, Rh, Ir, Cr, Re and Cu.

In the present invention, at least one of the plurality of ferromagnetic layers is preferably made of a magnetic material having the following composition.

The composition is represented by the formula CoFeNi in which the composition ratio of Fe is 9 atomic % to 17 atomic % (at %), the composition ratio of Ni is 0.5 atomic % to 10 atomic %, and the balance is the composition ratio of Co.

Also, an intermediate layer made of a CoFe alloy or Co is preferably formed between the nonmagnetic material layer and the ferromagnetic material layer laminated closest to the nonmagnetic material layer. When the intermediate layer is formed, at least one of the plurality of ferromagnetic material layers is preferably made of a magnetic material having the following composition.

The composition is represented by the formula CoFeNi in which the composition ratio of Fe is 7 atomic % to 15 atomic %, the composition ratio of Ni is 5 atomic % to 15 atomic %, and the balance is the composition ratio of Co.

In the present invention, all of the plurality of the ferromagnetic material layers are preferably made of CoFeNi.

In the present invention, in the film structure of nonmagnetic material layer/first free magnetic layer/nonmagnetic intermediate layer/second free magnetic layer, CoFeNi preferably has a Fe composition ratio of 9 atomic % to 17 atomic %, a Ni composition ratio of 0.5 atomic % to 10 atomic %, and a Co composition ratio as the balance. With a Fe composition ratio of over 17 atomic %, magnetostriction is increased to $-3 \times 10^{-6}$ or more in the negative direction, and soft magnetic properties deteriorate.

With a Fe composition ratio of less than 9 atomic %, magnetostriction is increased to $3 \times 10^{-6}$ or more, and soft magnetic properties deteriorate.

With a Ni composition ratio of over 10 atomic %, magnetostriction is increased to $3 \times 10^{-6}$ or more, and the amount of resistance change ($\Delta R/R$) and the rate of resistance change ($\Delta R/R$) are decreased due to Ni diffusion between the nonmagnetic material and the ferromagnetic material layer.

With a Ni composition ratio of less than 0.5 atomic %, magnetostriction is increased to $-3 \times 10^{-6}$ or more in the negative direction.

In the above-described composition range, a coercive force of 790 ampere/meter (A/m) or less can be obtained.

When an intermediate layer made of a CoFe alloy or Co is formed between the nonmagnetic material layer and the ferromagnetic material layer laminated closest to the nonmagnetic material layer, for example, in the film structure of nonmagnetic material layer/intermediate layer (CoFe alloy)/ first free magnetic layer/nonmagnetic intermediate layer/ second free magnetic layer, CoFeNi preferably has a Fe composition ratio of 7 atomic % to 15 atomic %, a Ni composition ratio of 5 atomic % to 15 atomic %, and a Co composition ratio as the balance. With a Fe composition ratio of over 15 atomic %, magnetostriction is increased to $-3 \times 10^{-6}$ or more in the negative direction, and soft magnetic properties deteriorate.

With a Fe composition ratio of less than 7 atomic %, magnetostriction is increased to $3 \times 10^{6}$ or more, and soft magnetic properties deteriorate.

With a Ni composition ratio of over 15 atomic %, magnetostriction is increased to $3 \times 10^{6}$ or more.

With a Ni composition ratio of less than 5 atomic %, magnetostriction is increased to $-3 \times 10^{6}$ or more in the negative direction.

In the above-described composition range, a coercive force of 790 (A/m) or less can be obtained. Since the intermediate layer made of CoFe or Co has minus magnetostriction, the Fe composition of the CoFeNi alloy is slightly decreased, and the Ni composition is slightly increased, as compared with a film structure without the intermediate layer between the first free magnetic layer and the nonmagnetic material layer.

Like in the above-described film structure, the intermediate layer made of a CoFe alloy or Co is preferably interposed between the nonmagnetic material layer and the first free magnetic layer because diffusion of a metal element between the first free magnetic layer and the nonmagnetic material layer can be effectively prevented. In the present invention, even when the first antiferromagnetic layer and the second antiferromagnetic layer are made of antiferromagnetic materials having the same composition, the magnetization directions of the first and second antiferromagnetic layers can easily be made intersect at right angles. Therefore, without the external magnetic field applied, the magnetization directions of the free magnetic layer and the pinned magnetic layer can be made to intersect at right angles.

The first antiferromagnetic layer and/or the second antiferromagnetic layer is preferably made of a PtMn alloy. The antiferromagnetic layers may be made of a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

In the PtMn alloy and the alloy represented by the formula X—Mn, Pt or X is preferably in the range of 37 to 63 at %, and more preferably 47 to 57 at %. The upper and lower limits of the numerical range means "not more than" and "not less than", respectively, unless otherwise specified. In another aspect of the present invention, a thin film magnetic element comprises a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field, wherein a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer, and another antiferromagnetic layer is laminated between the free magnetic layer and the second antiferromagnetic layer.

When the second antiferromagnetic layer is provided above or below the free magnetic layer, the magnetization direction of the free magnetic layer is oriented by an exchange coupling magnetic field with the second antiferromagnetic layer. The exchange coupling magnetic field exerts only between an antiferromagnetic layer having a thickness with antiferromagnetism and a region of a magnetic layer which is located immediately above or below the antiferromagnetic layer, not exerts in the region out of the region immediately below or above the antiferromagnetic layer having a thickness with antiferromagnetism.

Therefore, the region of the track width (optical track width) Tw which is set at the time of formation of the thin film magnetic element, is the sensitive zone which substantially contributes to reproduction of a recording magnetic field and exhibits the magnetoresistive effect. Namely, in the thin film magnetic element of the present invention, the optical track width is substantially the same as the magnetic track width, thereby making it easy to comply with increases in the recording density of a recording medium, in comparison to a hard bias system which is difficult to control the magnetic track width because the dead zones are present.

Since there is no dead zone in the region of the track width (optical track width) which is set at the time of formation of the thin film magnetic element, a decrease in reproduced output can be suppressed when the optical track with Tw of the thin film magnetic element is decreased for complying with a higher recording density.

Furthermore, in the present invention, the side surfaces of the thin film magnetic element can be formed perpendicularly to the surface of the substrate, thereby suppressing a variation in the length of the free magnetic layer in the width direction. The other antiferromagnetic layer has the function to prevent oxidation of the free magnetic layer due to contact with the air in the method of manufacturing a thin film magnetic element of the present invention, which will be described below.

In the present invention, the other antiferromagnetic layer is made of a material which can form an energy gap having the high probability of specular reflection for maintaining the spin state of conduction electrons. Therefore, the other antiferromagnetic layer can be caused to function as a specular reflection layer which extends the mean free path of conduction electrons by the specular reflection effect.

The other antiferromagnetic layer functioning as the specular reflection layer may comprise a single layer film or multilayer film made of, for example, a semi-metal Heusler alloy such as NiMnSb, PtMnSb, or the like.

When the other antiferromagnetic layer functions as the specular reflection layer, the thickness of the free magnetic layer is preferably set in the range of 15 to 45 Å.

The thickness of the other antiferromagnetic layer is preferably more than 0 and 30 Å or less.

With the other antiferromagnetic layer having a thickness of more than 0 and 30 Å or less, the magnetization direction of the first antiferromagnetic layer can be easily made to intersect the magnetization direction of the second antiferromagnetic layer at right angles in the method of manufacturing a thin film magnetic element of the present invention which will be described below.

The thickness of the other antiferromagnetic layer is more preferably 10 Å to 30 Å.

Furthermore, a recess having a width dimension corresponding to the track width is preferably formed in the second antiferromagnetic layer.

Particularly, the recess preferably has the side surfaces perpendicular to the surface of the substrate.

In the present invention, the track width of the thin film magnetic element is determined by the width dimension of the recess. Namely, the magnetization direction of the free magnetic layer can be changed only in the region overlapped with the bottom of the recess. Furthermore, the recess can be formed only by cutting the second antiferromagnetic layer having a uniform thickness by reactive ion etching (RIE) or ion milling perpendicularly to the surface of the substrate. Therefore, the recess with an accurate width dimension can be formed. Namely, the track width of the thin film magnetic element can be precisely defined.

In the present invention, the bottom of the recess may be provided in the second antiferromagnetic layer. In this case, the total thickness of the region of the second antiferromagnetic layer, which is overlapped with the bottom of the recess, and the other antiferromagnetic layer is preferably more than 0 and 30 Å or less because the magnetization directions of the first and second antiferromagnetic layers can easily be caused to cross at right angles in the method of manufacturing a thin film magnetic element of the present invention which will be described below.

Alternatively the bottom of the recess may be provided in the other antiferromagnetic layer.

In this case, the thickness of the region of the other antiferromagnetic layer, which is overlapped with the bottom of the recess, is preferably more than 0 and 30 Å or less because the magnetization directions of the first and second antiferromagnetic layers can easily be caused to cross at right angles in use of the method of manufacturing a thin film magnetic element of the present invention which will be described below.

The total thickness of the region of the first antiferromagnetic layer, which is overlapped with the bottom of the recess, and the other antiferromagnetic layer, or the thickness of the region of the other antiferromagnetic layer, which is overlapped with the bottom of the recess, is a thickness which causes no exchange anisotropic magnetic field between the other antiferromagnetic layer and the free magnetic layer.

In the present invention, even when the first antiferromagnetic layer and the second antiferromagnetic layer are made of antiferromagnetic materials having the same composition, the magnetization directions of the first and second antiferromagnetic layers can easily be made to intersect at right angles. Therefore, without the external magnetic field applied, the magnetization directions of the free magnetic layer and the pinned magnetic layer can be made to intersect at right angles.

The pinned magnetic layer preferably comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other.

When the pinned magnetic layer comprises ferromagnetic material layers laminated with a nonmagnetic intermediate layer provided therebetween in the thickness direction, the magnetization directions of the ferromagnetic material layers are pinned by each other to strongly pin the magnetization direction of the whole pinned magnetic layer in a predetermined direction. Namely, a large value of exchange coupling magnetic field Hex between the first antiferromagnetic layer and the pinned magnetic layer can be obtained. Therefore, in magnetic field annealing for orienting the magnetization direction of the second antiferromagnetic layer in the track width direction after or before magnetic field annealing for orienting the magnetization direction of the first antiferromagnetic layer in the height direction, the longitudinal bias magnetic field applied by the second antiferromagnetic layer can be increased while the magnetization of the pinned magnetic layer is prevented from being inclined in the track width direction and pinned.

Furthermore, a demagnetizing field (dipole magnetic field) due to pinned magnetization of the pinned magnetic layer can be canceled by canceling the static magnetic field coupling between the plurality of pinned material layers. Therefore, contribution to variable magnetization of the free magnetic layer from the demagnetizing field (bipolar magnetic field) due to pinned magnetization of the pinned magnetic layer can be decreased.

Therefore, the direction of variable magnetization of the free magnetic layer can be easily corrected in the desired direction, thereby obtaining a spin valve thin film magnetic element having excellent symmetry with low asymmetry.

The "asymmetry" means the degree of asymmetry of a reproduced output waveform, and the obtained reproduced output having a symmetry waveform has low asymmetry. Therefore, the reproduced output waveform having asymmetry close to zero has excellent symmetry.

When the magnetization directions of variable magnetization of the free magnetic layer and the pinned magnetization direction of the pinned magnetic layer are perpendicular to each other, the asymmetry is zero. When the asymmetry greatly deviates, information from a medium cannot be accurately read to cause an error. Therefore, with lower asymmetry, reproduced signal processing has improved reliability, thereby providing an excellent spin valve thin film magnetic element. The demagnetizing field Hd (bipolar magnetic field) due to pinned magnetization of the pinned magnetic layer has a nonuniform distribution in which the demagnetizing field is high at the ends, and low at the center in the direction of the element height. Therefore, in some cases, the free magnetic layer is inhibited from being put into the single magnetic domain state. However, by using the above laminated structure for the pinned magnetic layer, the demagnetizing field Hd can be made substantially zero Hd=0, thereby preventing the occurrence of Barkhausen noise due to the nonuniformity in magnetization which is caused by a magnetic domain wall formed in the free magnetic layer.

In a further aspect of the present invention, a thin film magnetic element comprises a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field, wherein a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer, a recess having a width dimension corresponding to the track width is formed in the second antiferromagnetic layer, the first and second antiferromagnetic layers are made of antiferromagnetic materials having the same composition, and the pinned magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other.

In the present invention, the track width of the thin film magnetic element can be precisely defined. Furthermore, the first and second antiferromagnetic layers can be made of antiferromagnetic materials having the same composition, thereby simplifying the process for manufacturing a thin film magnetic element.

Since the pinned magnetic layer is a ferrimagnetic pinned magnetic layer in a ferrimagnetic state in which the magnetization directions of the adjacent ferromagnetic material layers with the nonmagnetic intermediate layer provided therebetween are antiparallel to each other, the magnetization direction of the pinned magnetic layer can be strongly pinned, for example, with a magnitude of 80 to 160 kA/m. Therefore, the exchange coupling magnetic field of the second antiferromagnetic layer (longitudinal bias layer) for orienting the magnetization direction of the free magnetic layer can be increased, thereby stabilizing the perpendicular state of the magnetization directions of the free magnetic layer and the pinned magnetic layer. Furthermore, a demagnetizing field (dipole magnetic field) due to pinned magnetization of the pinned magnetic layer can be canceled by canceling the static magnetic field coupling between the plurality of ferromagnetic material layers. Therefore, contribution to variable magnetization of the free magnetic layer from the demagnetizing field (bipolar magnetic field) due to pinned magnetization of the pinned magnetic layer can be decreased.

Therefore, the direction of variable magnetization of the free magnetic layer can be easily corrected in the desired direction, thereby obtaining a thin film magnetic element having excellent symmetry with low asymmetry.

Also, the demagnetizing field (bipolar magnetic field) Hd due to pinned magnetization of the pinned magnetic layer has a nonuniform distribution in which the demagnetizing field is high at the ends, and it is low at the center in the direction of the element height. Therefore, in some cases, the free magnetic layer is inhibited from being put into the single magnetic domain state. However, by using the above laminated structure for the pinned magnetic layer, the demagnetizing field Hd can be made substantially zero Hd=0, thereby preventing the occurrence of Barkhausen noise due to the nonuniformity in magnetization which is caused by a magnetic domain wall formed in the free magnetic layer.

In the present invention, the bottom of the recess may be provided in the second antiferromagnetic layer. In this case, the thickness of the region of the second antiferromagnetic layer, which is overlapped with the bottom of the recess, is preferably more than 0 and 30 Å or less.

The thickness of the region of the second antiferromagnetic layer, which is overlapped with the bottom of the recess, is a thickness which causes no exchange anisotropic magnetic field between the second antiferromagnetic layer and the free magnetic layer.

The free magnetic layer preferably comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other. This is because an effect equivalent to the effect of decreasing the thickness of the free magnetic layer can be obtained, and thus magnetization of the free magnetic layer easily changes to improve the magnetic field sensitivity of a magnetoresistive element.

The magnitude of magnetic moment per unit area of each of the ferromagnetic material layers is represented by the product of the saturation magnetization (Ms) and the thickness (t) of the ferromagnetic layer.

Each of the nonmagnetic intermediate layers can be made of an alloy of at least one element of Ru, Rh, Ir, Cr, Re and Cu.

In the present invention, at least one of the plurality of ferromagnetic material layers is preferably made of a magnetic material having the following composition.

The composition is represented by the formula CoFeNi in which the composition ratio of Fe is 9 atomic to 17 atomic the composition ratio of Ni is 0.5 atomic % to 10 atomic %, and the balance is the composition ratio of Co.

Also, an intermediate layer made of a CoFe alloy or Co is preferably formed between the nonmagnetic material layer and the ferromagnetic material layer laminated closest to the nonmagnetic material layer. When the intermediate layer is formed, at least one of the plurality of ferromagnetic material layers is preferably made of a magnetic material having the following composition.

The composition is represented by the formula CoFeNi in which the composition ratio of Fe is 7 atomic % to 15 atomic %, the composition ratio of Ni is 5 atomic % to 15 atomic %, and the balance is the composition ratio of Co.

In the present invention, all of the plurality of ferromagnetic material layers are preferably made of CoFeNi.

In the present invention, in the film structure of nonmagnetic material layer/first free magnetic layer/nonmagnetic intermediate layer/second free magnetic layer, CoFeNi preferably has a Fe composition ratio of 9 atomic % to 17 atomic %, a Ni composition ratio of 0.5 atomic % to 10 atomic %, and a Co composition ratio as the balance. With a Fe composition ratio of over 17 atomic %, magnetostriction is increased to $-3 \times 10^{-6}$ or more in the negative direction, and soft magnetic properties deteriorate.

With a Fe composition ratio of less than 9 atomic %, magnetostriction is increased to $3 \times 10^{-6}$ or more, and soft magnetic properties deteriorate.

With a Ni composition ratio of over 10 atomic %, magnetostriction is increased to $3 \times 10^{-6}$ or more, and the amount of resistance change ($\Delta R/R$) and the rate of resistance change ($\Delta R/R$) are decreased due to Ni diffusion between the nonmagnetic material layer and the ferromagnetic material layer.

With a Ni composition ratio of less than 0.5 atomic %, magnetostriction is increased to $-3 \times 10^{-6}$ or more in the negative direction.

In the above-described composition range, a coercive force of 790 (A/m) or less can be obtained.

When an intermediate layer made of a CoFe alloy or Co is formed between the nonmagnetic material layer and the ferromagnetic material layer laminated closest to the nonmagnetic material layer, for example, in the film structure of nonmagnetic material layer/intermediate layer (CoFe alloy)/first free magnetic layer/nonmagnetic intermediate layer/second free magnetic layer, CoFeNi preferably has a Fe composition ratio of 7 atomic % to 15 atomic %, a Ni composition ratio of 5 atomic % to 15 atomic %, and a Co composition ratio as the balance. With a Fe composition ratio of over 15 atomic %, magnetostriction is increased to $-3 \times 10^{-6}$ or more in the negative direction, and soft magnetic properties deteriorate.

With a Fe composition ratio of less than 7 atomic %, magnetostriction is increased to $3 \times 10^{-6}$ or more, and soft magnetic properties deteriorate.

With a Ni composition ratio of over 15 atomic, magnetostriction is increased to $3 \times 10^{-6}$ or more.

With a Ni composition ratio of less than 5 atomic %, magnetostriction is increased to $-3 \times 10^{-6}$ or more in the negative direction.

In the above-described composition range, a coercive force of 790 (A/m) or less can be obtained. Since the intermediate layer made of CoFe or Co has minus magnetostriction, the Fe composition of the CoFeNi alloy is slightly decreased, and the Ni composition is slightly increased, as compared with a film structure without the intermediate layer between the first free magnetic layer and the nonmagnetic material layer.

Like in the above-described film structure, the intermediate layer made of a CoFe alloy or Co is preferably interposed between the nonmagnetic material layer and the first free magnetic layer because diffusion of a metal element between the first free magnetic layer and the nonmagnetic material layer can be effectively prevented.

The first antiferromagnetic layer and/or the second antiferromagnetic layer is preferably made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

In the PtMn alloy or the alloy represented by the formula X—Mn, Pt or X is preferably in the range of 37 to 63 at %, and more preferably 47 to 57 at %. The upper and lower limits of the numerical range means "not more than" and "not less than", respectively, unless otherwise specified.

In the alloy represented by the formula Pt—Mn—X', the total of X'+Pt is preferably in the range of 37 to 63 at %, and more preferably 47 to 57 at %, and X' is preferably in the range of 0.2 to 10 at %. However, when X' is at least one element of Pd, Ir, Rh, Ru, Os, Ni, and Fe, X' is preferably in the range of 0.2 to 40 at %.

By using an alloy in the above-described appropriate composition range for the first and second antiferromagnetic layers, the first and second antiferromagnetic layers producing a large exchange coupling magnetic field can be obtained by annealing the alloy. Particularly, by using a PtMn alloy, the excellent first and second antiferromagnetic layers can be obtained, in which the exchange coupling magnetic field is 48 kA/m or more, for example, over 64 kA/m, and the blocking temperature at which the exchange coupling magnetic field is lost is as high as 380° C.

The above-described alloy has a disordered face centered cubic structure (fcc) in a state immediately after deposition, but it is transformed to a CuAuI-type ordered face-centered tetragonal structure (fct) by heat treatment.

In the present invention, the first antiferromagnetic layer and the second antiferromagnetic layer can be formed by using antiferromagnetic materials having the same composition.

A method of manufacturing a thin film magnetic element of the present invention comprises the steps of (a) depositing a first antiferromagnetic layer, a pinned magnetic layer, a nonmagnetic material layer, and a free magnetic layer to form a multilayer film on a substrate, (b) annealing the multilayer film in a magnetic field of first magnitude at a first heat treatment temperature to pin the magnetization direction of the pinned magnetic layer in a predetermined direction, (c) depositing a second antiferromagnetic layer on the multilayer film, and (d) annealing the multilayer film with the second antiferromagnetic layer laminated thereon in a magnetic field of second magnitude at a second heat treatment temperature to pin the magnetization direction of the free magnetic layer in the direction perpendicular to the magnetization direction of the pinned magnetic layer.

In the present invention, the multilayer film without the second antiferromagnetic layer laminated thereon is annealed in a magnetic field to pin the magnetization direction of the pinned magnetic layer in the predetermined direction, and thus no exchange anisotropic magnetic field occurs in the second antiferromagnetic layer laminated on the multilayer film.

Namely, the exchange anisotropic magnetic field does not occur in the second antiferromagnetic layer until the step (d), thereby facilitating movement of the magnetization direction of the free magnetic layer to the predetermined direction. Therefore, the magnetization direction of the free magnetic layer can easily be pinned perpendicularly to the magnetization direction of the pinned magnetic layer.

The step (a) is preferably performed in a same vacuum deposition apparatus.

In the present invention, in the step (d), the second heat treatment temperature is preferably set to a temperature lower than the blocking temperature at which the exchange coupling magnetic field of the first antiferromagnetic layer is lost.

Furthermore, in the step (d), the second magnitude of the magnetic field is preferably lower than the exchange anisotropic magnetic field of the first antiferromagnetic layer.

The step (a) preferably further comprises the step of laminating another antiferromagnetic layer on the uppermost layer of the multilayer film because oxidation of the uppermost layer of the multilayer film can be prevented.

In the present invention, the other antiferromagnetic layer is made of a material which can form an energy gap having the high probability of specular reflection for maintaining the spin spate of conduction electrons so that the other antiferromagnetic layer can function as a specular reflection layer to extend the mean free path of the conduction electrons by the specular reflection effect.

When the other antiferromagnetic layer functions as the specular reflection layer, the thickness of the free magnetic layer is preferably set in the range of 15 to 45 Å.

With the free magnetic layer having a thickness of less than 15 Å, the free magnetic layer cannot easily be formed to function as a ferromagnetic material layer, thereby failing to obtain the sufficient magnetoresistive effect.

With the free magnetic layer having a thickness of over 45 Å, the number of the spin-up conduction electrons scattered before reaching the specular reflection layer is increased to undesirably decrease the rate of change in the rate of resistance change with the specular effect.

The other antiferromagnetic layer functioning as the specular reflection layer may comprise a single layer film or multilayer film made of, for example, a semi-metal Heusler alloy such as NiMnSb, PtMnSb, or the like.

By using such materials, a sufficient potential barrier can be formed between the other antiferromagnetic layer and the adjacent layer to obtain the sufficient specular effect.

The thickness of the other antiferromagnetic layer is preferably more than 0 and 30 Å or less.

With the other antiferromagnetic layer having a thickness of more than 0 and 30 Å or less, no exchange coupling magnetic field occurs in the other antiferromagnetic layer in the step (b), and thus the magnetization direction of the other antiferromagnetic layer can be prevented from being pinned in the same direction as the magnetization direction of the pinned magnetic layer. Therefore, in the step (c), when the second antiferromagnetic layer is laminated on the other antiferromagnetic layer, the magnetization direction of the free magnetic layer can be prevented from being pinned in the same direction as the magnetization direction of the pinned magnetic layer.

The thickness of the other antiferromagnetic layer is more preferably 10 Å to 30 Å.

In the step (a), a nonmagnetic layer may be laminated in contact with the upper or lower surface of the free magnetic layer, which is away from the nonmagnetic material layer.

In this case, the magnetization direction of the free magnetic layer is oriented by RKKY interaction with the second antiferromagnetic layer through the nonmagnetic layer in the direction intersecting the magnetization direction of the pinned magnetic layer.

When the magnetization direction of the magnetic layer is oriented by RKKY interaction with the second antiferromagnetic layer, exchange coupling force can be strengthened as compared with the case of direct contact between the second antiferromagnetic layer and the magnetic layer.

The nonmagnetic layer is preferably made of a conductive material. The nonmagnetic layer is preferably made of at least one element selected from Ru, Cu, Ag, and Au. Particularly, preferably, the nonmagnetic layer is made of Ru, and has a thickness of 8 to 11 Å.

In the present invention, the nonmagnetic layer is made of a conductive material so that the nonmagnetic layer can be caused to function as a backed layer having a spin filter effect.

When the backed layer having the spin filter effect is provided in contact with the free magnetic layer, the center height of the laminate at which a sensing current flows can be shifted to the backed layer Side as compared with a case without the backed layer. Namely, the center height of the sensing current flow deviates from the free magnetic layer to decrease the strength of a sensing current magnetic field at the position of the free magnetic layer, thereby decreasing the influence of the sensing current magnetic field on variable magnetization of the free magnetic layer. Therefore, asymmetry can be decreased.

The "asymmetry" means the degree of asymmetry of a reproduced output waveform, and the obtained reproduced output having a symmetry waveform has low asymmetry. Therefore, the reproduced output waveform having asymmetry close to zero has excellent symmetry.

The asymmetry is zero when the magnetization directions of the free magnetic layer and the pinned magnetic layer are perpendicular to each other. When the asymmetry greatly deviates, information from a medium cannot be accurately read to cause an error. Therefore, with lower asymmetry, reproduced signal processing has improved reliability, thereby providing an excellent spin valve thin film magnetic element.

In the present invention, the mean free path of spin-up electrons contributing the magnetoresistive effect can be extended to obtain a high rate of change in resistance due to the so-called spin filter effect.

In the spin valve thin film magnetic element, with the sensing current applied, conduction electrons mainly move near the nonmagnetic material layer having low electric resistance. The conduction electrons include the two types of electrons including spin-up electrons and spin-down electrons which are present in stochastically equal amounts.

In the spin valve thin film magnetic element, the rate of change in magnetoresistance shows positive correlation with the difference between the mean free paths of the two types of conduction electrons.

The spin-down electrons are scattered at the interface between the nonmagnetic material layer and the free magnetic layer regardless of the direction of the applied external magnetic field, and the probability of movement to the free magnetic layer is kept down. Therefore, the mean free path of the spin-down conduction electrons remains shorter than that of the spin-up conduction electrons.

On the other hand, with respect to the spin-up conduction electrons, when the magnetization direction of the free magnetic layer is oriented in parallel with the magnetization direction of the pinned magnetic layer with the external magnetic field applied, the spin-up conduction electrons have the high probability of movement from the nonmagnetic material layer to the free magnetic layer to lengthen the mean free path. However, when the magnetization direction of the free magnetic layer is changed from the parallel state with the magnetization direction of the pinned magnetic layer by the external magnetic field, the probability of scattering at the interface between the nonmagnetic material layer and the free magnetic layer increases to shorten the mean free path of the spin-up conduction electrons.

In this way, the mean free path of the spin-up conduction electrons is greatly changed by the action of the external magnetic field in comparison to the mean free path of the spin-down conduction electrons, thereby significantly changing the difference between the mean free paths. Therefore, the mean free path of all conduction electrons is also greatly changed to increase the rate of change ($\Delta R/R$) in magnetoresistance of the spin valve thin film magnetic element.

When the backed layer is connected to the free magnetic layer, the spin-up conduction electrons moving in the free magnetic layer can move into the backed layer to further lengthen the mean free path of the spin-up conduction electrons in proportional to the thickness of the backed layer. Therefore, the so-called spin filter effect can be exhibited to increase the difference between the mean free paths of the conduction electrons, thereby further increase the rate of change ($\Delta R/R$) in magnetoresistance of the spin valve thin film magnetic element.

The manufacturing method of the present invention may comprise the step (a) of laminating in turn the first antiferromagnetic layer, the pinned magnetic layer, the nonmagnetic material layer and the free magnetic layer on the substrate to form the multilayer film, and the step (c) of forming a lift off resist layer having an undercut formed on the lower side thereof on the free magnetic layer, depositing the second antiferromagnetic layer on the multilayer film and then removing the resist layer from the multilayer film.

Alternatively, after the second antiferromagnetic layer is deposited, a pair of resist layers may be laminated on the second antiferromagnetic layer with a space therebetween corresponding to the track width, and then the portion of the second antiferromagnetic layer, which is held between the resist layers, is cut out perpendicularly to the surface of the substrate so that the track width of the thin film magnetic element can precisely be defined.

Alternatively, in the step (c), a pair of resist layers may be deposited with a space therebetween after the second antiferromagnetic layer is formed on the multilayer film, and the portion of the second antiferromagnetic layer, which is held between the resist layers, is cut perpendicularly to the surface of the substrate to form a recess.

In the present invention, the track width of the thin film magnetic element is determined by the width dimension of the recess. Namely, the magnetization direction of the free magnetic layer can be changed only in the region overlapped with the bottom of the recess. Furthermore, the recess can be formed only by cutting the second antiferromagnetic layer having a uniform thickness with reactive ion etching (RIE) or ion milling perpendicularly to the surface of the substrate. Therefore, the recess having an accurate width dimension can be formed. Namely, the track width of the thin film magnetic element can be precisely defined.

In the present invention, the recess may be provided so that the bottom of the recess is located in the second antiferromagnetic layer.

In this case, the thickness of the region of the second antiferromagnetic layer, which is located below the bottom of the recess, or the total thickness of the region of the second antiferromagnetic layer, which is located below the bottom of the recess, and the other antiferromagnetic layer is preferably more than 0 and 30 Å or less because no exchange coupling magnetic field occurs in the region of the second antiferromagnetic layer, which is located below the bottom of the recess, or the regions of the second antiferromagnetic layer and the other antiferromagnetic layer, which are located below the bottom of the recess.

Alternatively, the recess may be provided so that the bottom of the recess is located in the other antiferromagnetic layer.

In this case, the thickness of the region of the other antiferromagnetic layer, which is located below the bottom of the recess, is preferably more than 0 and 30 Å or less because no exchange anisotropic magnetic field occurs in the region of the other antiferromagnetic layer, which is located below the bottom of the recess.

Alternatively, the recess may be formed so that the bottom of the recess is located in the nonmagnetic layer.

In the step (a), the pinned magnetic layer is preferably formed by laminating a plurality of ferromagnetic material layers having magnetic moments of different magnitudes per unit area through nonmagnetic intermediate layers.

When the pinned magnetic layer comprises ferromagnetic material layers laminated with a nonmagnetic intermediate layer provided therebetween in the thickness direction, the magnetization directions of the ferromagnetic material layers are pinned by each other to strongly pin the magnetization direction of the whole pinned magnetic layer in a predetermined direction. Namely, a large value of exchange coupling magnetic field Hex, for example, 80 to 160 kA/m, between the first antiferromagnetic layer and the pinned magnetic layer can be obtained. Therefore, in magnetic field annealing for orienting the magnetization direction of the second antiferromagnetic layer in the track width direction after or before magnetic field annealing for orienting the magnetization direction of the first antiferromagnetic layer in the height direction, the longitudinal bias magnetic field applied by the second antiferromagnetic layer can be increased while the magnetization of the pinned magnetic layer is prevented from being inclined in the track width direction and pinned.

Furthermore, a demagnetizing field (dipole magnetic field) due to pinned magnetization of the pinned magnetic layer can be canceled by canceling the static magnetic field coupling between the plurality of ferromagnetic material layers. Therefore, contribution to variable magnetization of the free magnetic layer from the demagnetizing field (bipolar magnetic field) due to pinned magnetization of the pinned magnetic layer can be decreased.

Therefore, the direction of variable magnetization of the free magnetic layer can be easily corrected in the desired direction, thereby obtaining a spin valve thin film magnetic element having excellent symmetry with low asymmetry.

The demagnetizing field (bipolar magnetic field) Hd due to pinned magnetization of the pinned magnetic layer has a nonuniform distribution in which the demagnetizing field is high at the ends, and low at the center in the direction of the element height. Therefore, in some cases, the free magnetic layer is inhibited from being put into the single magnetic domain state. However, by using the above laminated structure for the pinned magnetic layer, the demagnetizing field Hd can be made substantially zero Hd=0, thereby preventing the occurrence of Barkhausen noise due to the nonuniformity in magnetization which is caused by a magnetic domain wall formed in the free magnetic layer.

In the present invention, the pinned magnetic layer may comprise a single ferromagnetic layer.

In the step (a), the free magnetic layer is preferably formed by laminating a plurality of ferromagnetic material layers having magnetic moments of different magnitudes per unit area through nonmagnetic intermediate layers.

In the present invention, the adjacent ferromagnetic layers with the nonmagnetic intermediate layer provided therebetween are in the ferrimagnetic state in which the magnetization directions are antiparallel to each other, and thus an effect equivalent to the effect of decreasing the thickness of the free magnetic layer can be obtained, Therefore, magnetization of the free magnetic layer easily changes to improve the magnetic field sensitivity of a magnetoresistive element.

The magnitude of magnetic moment per unit area of each of the ferromagnetic material layers is represented by the product of the saturation magnetization (Ms) and the thickness (t) of the ferromagnetic layer.

Each of the nonmagnetic intermediate layers can be made of an alloy of at least one element of Ru, Rh, Ir, Cr, Re and Cu.

In the present invention, at least one of the plurality of the ferromagnetic material layers is preferably made of a magnetic material having the following composition.

The composition is represented by the formula CoFeNi in which the composition ratio of Fe is 9 atomic % to 17 atomic %, the composition ratio of Ni is 0.5 atomic % to 10 atomic %, and the balance is the composition ratio of Co.

Also, an intermediate layer made of a CoFe alloy or Co is preferably formed between the nonmagnetic material layer and the ferromagnetic material layer laminated closest to the nonmagnetic material layer. When the intermediate layer is formed, at least one of the plurality of ferromagnetic material layers is preferably made of a magnetic material having the following composition.

The composition is represented by the formula CoFeNi in which the composition ratio of Fe is 7 atomic % to 15 atomic %, the composition ratio of Ni is 5 atomic % to 15 atomic %, and the balance is the composition ratio of Co.

In the present invention, all of the plurality of the ferromagnetic material layers are preferably made of CoFeNi.

In the present invention, in the film structure of nonmagnetic material layer/first free magnetic layer/nonmagnetic intermediate layer/second free magnetic layer, CoFeNi preferably has a Fe composition ratio of 9 atomic % to 17 atomic %, a Ni composition ratio of 0.5 atomic % to 10 atomic %, and a Co composition ratio as the balance. With a Fe composition ratio of over 17 atomic %, magnetostriction is increased to $-3\times10^{-6}$ or more in the negative direction, and soft magnetic properties deteriorate.

With a Fe composition ratio of less than 9 atomic %, magnetostriction is increased to $3\times10^{-6}$ or more, and soft magnetic properties deteriorate.

With a Ni composition ratio of over 10 atomic %, magnetostriction is increased to $3\times10^{-6}$ or more, and the amount of resistance change ($\Delta R/R$) and the rate of resistance change ($\Delta R/R$) are decreased due to Ni diffusion between the nonmagnetic material layer and the ferromagnetic material layer.

With a Ni composition ratio of less than 0.5 atomic %, magnetostriction is increased to $-3\times10^{-6}$ or more in the negative direction.

In the above-described composition range, a coercive force of 790 (A/m) or less can be obtained.

When the intermediate layer made of a CoFe alloy or Co is formed between the nonmagnetic material layer and the ferromagnetic material layer laminated closest to the nonmagnetic material layer, for example, in the film structure of nonmagnetic material layer/intermediate layer (CoFe alloy)/first free magnetic layer/nonmagnetic intermediate layer/second free magnetic layer, CoFeNi preferably has a Fe composition ratio of 7 atomic % to 15 atomic %, a Ni composition ratio of 5 atomic % to 15 atomic %, and a Co composition ratio as the balance. With a Fe composition ratio of over 15 atomic %, magnetostriction is increased to $-3\times10^{-6}$ or more in the negative direction, and soft magnetic properties deteriorate.

With a Fe composition ratio of less than 7 atomic %, magnetostriction is increased to $3\times10^{-6}$ or more, and soft magnetic properties deteriorate.

With a Ni composition ratio of over 15 atomic %, magnetostriction is increased to $3\times10^{-6}$ or more.

With a Ni composition ratio of less than 5 atomic %, magnetostriction is increased to $-3\times10^{-6}$ or more in the negative direction.

In the above-described composition range, a coercive force of 790 (A/m) or less can be obtained. Since the intermediate layer made of CoFe or Co has minus magnetostriction, the Fe composition of the CoFeNi alloy is slightly decreased, and the Ni composition is slightly increased, as compared with a film structure without the intermediate layer between the first free magnetic layer and the nonmagnetic material layer.

Like in the above-described film structure, the intermediate layer made of a CoFe alloy or Co is preferably interposed between the nonmagnetic material layer and the first free magnetic layer because diffusion of a metal element between the first free magnetic layer and the nonmagnetic material layer can be effectively prevented.

In the present invention, even when the first and second antiferromagnetic layers are formed by using antiferromagnetic materials having the same composition, the magnetization direction of the free magnetic layer can easily be pinned in the direction perpendicular to the magnetization direction of the pinned magnetic layer.

The first antiferromagnetic layer and/or the second antiferromagnetic layer is preferably made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

In the PtMn alloy or the alloy represented by the formula X—Mn, Pt or X is preferably in the range of 37 to 63 at %, and more preferably 47 to 57 at %. The upper and lower limits of the numerical range means "not more than" and "not less than", respectively, unless otherwise specified.

In the alloy represented by the formula Pt—Mn—X', the total of X'+Pt is preferably in the range of 37 to 63 at %, and more preferably 47 to 57 at %, and X' is preferably in the range of 0.2 to 10 at %. However, when X' is at least one element of Pd, Ir, Rh, Ru, Os, Ni, and Fe, X' is preferably in the range of 0.2 to 40 at %. By using an alloy in the above-described appropriate composition range for the first and second antiferromagnetic layers, the first and second antiferromagnetic layers producing a large exchange coupling magnetic field can be obtained by annealing the alloy. Particularly, by using a PtMn alloy, the excellent first and second antiferromagnetic layers can be obtained, in which the exchange coupling magnetic field is 48 kA/m or more, for example, over 64 kA/m, and the blocking temperature at which the exchange coupling magnetic field is lost is as high as 380° C.

The above-described alloy has a disordered face-centered cubic structure (fcc) in a state immediately after deposition, but it is transformed to a CuAuI-type ordered face-centered tetragonal structure (fct) by heat treatment.

In the present invention, the first antiferromagnetic layer and the longitudinal bias layer can be formed by using antiferromagnetic materials having the same composition.

BRIEF DESCRIPTION OF THE DRAWINGS

FIG. 44 is a sectional view of a conventional thin film magnetic element.

DESCRIPTION OF THE PREFERRED EMBODIMENTS

Figure 1:
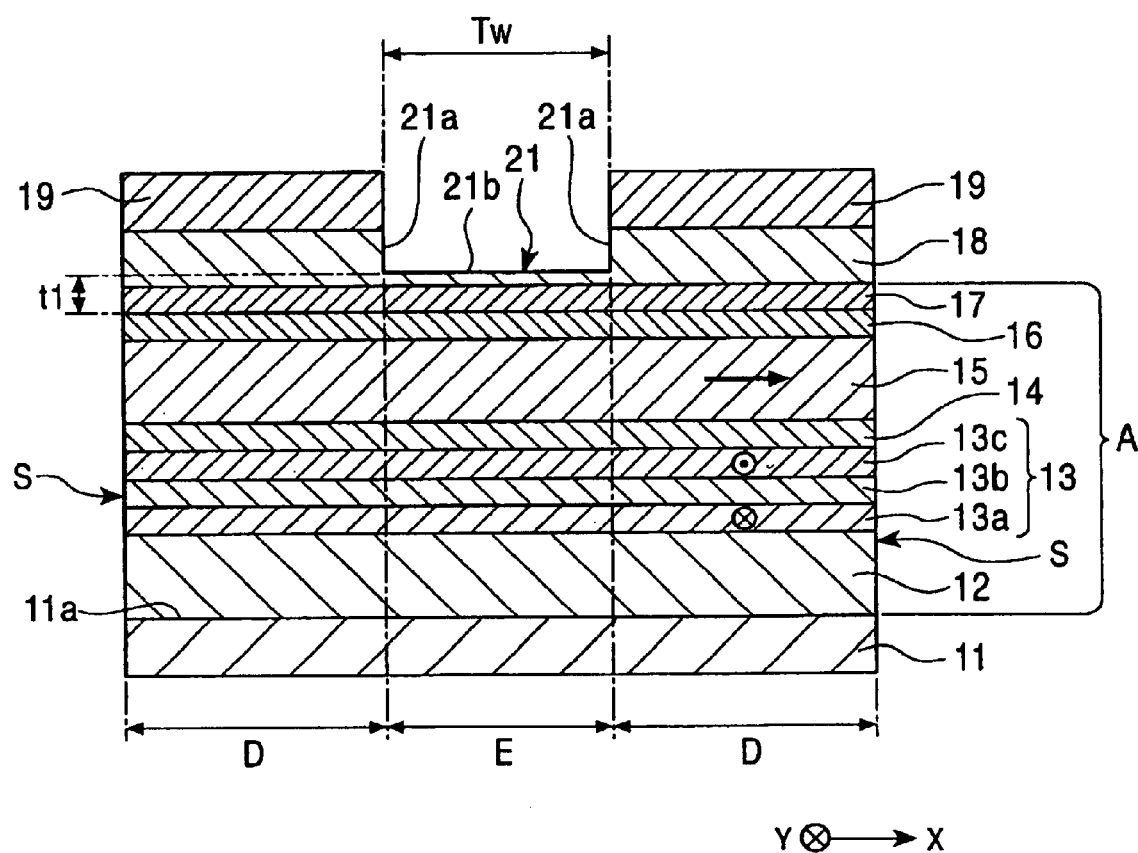
FIG. 1 is a sectional view of a thin film magnetic element according to a first embodiment of the present invention.

FIG. 1 is a sectional view of a thin film magnetic element according to a first embodiment of the present invention, as viewed from the ABS side.

In the thin film magnetic element shown in FIG. 1, a second antiferromagnetic layer 12 is laminated on a substrate 11, and a multilayer film A comprising a synthetic ferrimagnetic pinned magnetic layer 13 comprising a first pinned magnetic layer 13a, a nonmagnetic intermediate layer 13b and a second pinned magnetic layer 13c, a nonmagnetic material layer 14, a free magnetic layer 15, a nonmagnetic layer 16 and another antiferromagnetic layer 17 is laminated on the second antiferromagnetic layer 12. Furthermore, a longitudinal bias layer 18 serving as a first antiferromagnetic layer and an electrode layer 19 are deposited on the multilayer film A.

The second antiferromagnetic layer 12, the pinned magnetic layer 13, the nonmagnetic material layer 14, the free magnetic layer 15, the nonmagnetic layer 16, the other antiferromagnetic layer 17, the longitudinal bias layer 18 and the electrode layer 19 are formed by a thin film forming process such as sputtering, vaporization, or the like. The second antiferromagnetic layer 12, the other antiferromagnetic layer 17 and the longitudinal bias layer 18 are made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr). By using such an alloy for the second antiferromagnetic layer 12, the other antiferromagnetic layer 17 and the longitudinal bias layer 18, the second antiferromagnetic layer 12, the other antiferromagnetic layer 17 and the longitudinal bias layer 18 each of which produces a large exchange coupling magnetic field can be obtained by annealing the alloy. Particularly, by using the PtMn alloy, the excellent second antiferromagnetic layer 12, other antiferromagnetic layer 17 and longitudinal bias layer 18 can be obtained, in which the exchange coupling magnetic field is 48 kA/m or more, for example, over 64 kA/m, and the blocking temperature at which the exchange coupling magnetic field is lost is as high as 380° C.

The above-described alloys have a disordered face-centered cubic structure (fcc) in a state immediately after deposition, but the fcc structure is transformed to a CuAuI-type ordered face-centered tetragonal structure (fct) by heat treatment.

The thickness of the second antiferromagnetic layer 12 is 80 to 300 Å, for example, 200 Å, near the center in the track width direction. The thickness of the other antiferromagnetic layer 17 is about 30 Å, and the thickness of the longitudinal bias layer 18 is 80 to 300 Å, for example, 200 Å, near both ends in the track width direction.

In the thin film magnetic element of this embodiment, the second antiferromagnetic layer 12 and the longitudinal bias layer 18 can be formed by using antiferromagnetic materials having the same composition.

In order to form the second antiferromagnetic layer 12, the other antiferromagnetic layer 17 and the longitudinal bias layer 18, the content of Pt or X in the PtMn alloy or the alloy represented by the formula X—Mn is preferably in the range of 37 to 63 at %, and more preferably in the range of 47 to 57 at %. The upper and lower limits of the numerical range represent "not more than" and "not less than", respectively, unless otherwise specified.

In the alloy represented by the formula Pt—Mn—X', the total of X'+Pt is preferably in the range of 37 to 63 at %, and more preferably 47 to 57 at %, and X' is preferably in the range of 0.2 to 10 at %. However, when X' is at least one element of Pd, Ir, Rh, Ru, Os, Ni, and Fe, X' is preferably in the range of 0.2 to 40 at %. By using an alloy in the above-described appropriate composition range for the first and second antiferromagnetic layers, the first and second antiferromagnetic layers producing a large exchange coupling magnetic field can be obtained by annealing the alloy. Particularly, by using the PtMn alloy, the excellent first and second antiferromagnetic layers can be obtained, in which the exchange coupling magnetic field is 48 kA/m or more, for example, over 64 kA/m, and the blocking temperature at which the exchange coupling magnetic field is lost is as high as 380° C.

The above-described alloys have a disordered face centered cubic structure (fcc) in a state immediately after deposition, but the fcc structure is transformed to a CuAuI-type ordered face-centered tetragonal structure (fct) by heat treatment.

The first and second pinned magnetic layers 13a and 13c are made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

The nonmagnetic material layer 14 is a layer for preventing magnetic coupling between the pinned magnetic layer 13 and the free magnetic layer 15, and a sensing current mainly flows through the nonmagnetic material layer 14. The nonmagnetic material layer 14 is preferably made of a nonmagnetic material having conductivity, such as Cu, Cr, Au, Ag or the like, and particularly, Cu is preferably used.

The free magnetic layer 15 is made of a ferromagnetic material, for example, a NiFe alloy, Co, a CoNiFe alloy, a CoFe alloy, a CoNi alloy, or the like. Particularly, the NiFe alloy or Co is preferably used.

The nonmagnetic layer 16 is made of Ru, and has a thickness of 8 to 11 Å. The nonmagnetic layer 16 may be made of at least one element of Ru, Cu, Ag, and Au.

The electrode layer 19 is formed by depositing, for example, Au, W, Cr, Ta, or the like.

The longitudinal bias layer 18 has a recess 21 formed therein. The side surfaces 21a of the recess 21 are perpendicular to the surface 11a of the substrate 11. In FIG. 1, the recess 21 is formed so that the bottom 21b of the recess 21 is located in the longitudinal bias layer 18.

In this case, the total thickness t1 of the region of the longitudinal bias layer 18, which is overlapped with the bottom 21b of the recess 21, and the other antiferromagnetic layer 17 is more than 0 and 30 Å or less.

In this embodiment, the nonmagnetic layer 16 is deposited in contact with the upper surface of the free magnetic layer 15. The magnetization direction of the free magnetic layer 15 is oriented in the X direction shown in FIG. 1 by RKKY coupling with the longitudinal bias layer 18 through the nonmagnetic layer 16.

In this embodiment, even when the second antiferromagnetic layer 12 and the longitudinal bias layer 18 are made of antiferromagnetic materials having the same composition, the exchange anisotropic magnetic field of the longitudinal bias layer 18 can be oriented in the X direction shown in the drawing, while the exchange anisotropic magnetic field of the second antiferromagnetic layer 12 is oriented in the Y direction shown in the drawing.

Namely, in this embodiment, the magnetization direction of the free magnetic layer 15 can be pinned in the direction perpendicular to the magnetization direction of the pinned magnetic layer 13.

Like in this embodiment, when the total thickness t1 of the region of the longitudinal bias layer 18, which is overlapped with the bottom 21b of the recess 21, and the other antiferromagnetic layer 17 is more than 0 and 30 Å or less, the transformation from the disordered structure to the ordered structure does not occur in the regions of the longitudinal bias layer 18 and the other antiferromagnetic layer 17, which are overlapped with the bottom 21b of the recess 21, by second magnetic field annealing, thereby causing no exchange coupling magnetic field.

Namely, the magnetization direction of the free magnetic layer 15 is pinned by RKKY coupling with the longitudinal bias layer 18 only in the regions D at both ends in the track width direction except the region overlapped with the bottom 21b of the recess 21.

In the region E of the free magnetic layer 15 overlapped with the bottom 21b of the recess 21, with no external magnetic field applied, the magnetization direction is oriented in the X direction, following both end regions in which the magnetization is pinned by RKKY coupling with the longitudinal bias layer 18, while with the external magnetic field, the magnetization direction is changed.

Therefore, the track width of the thin film magnetic element is determined by the width dimension Tw of the recess. As described above, in the present invention, the recess 21 can be formed only by cutting the longitudinal bias layer 18 having a uniform thickness by reactive ion etching or ion milling perpendicularly to the surface 11a of the substrate 11. Therefore, the recess 21 having a precise width dimension Tw can be formed, i.e., the track width of the thin film magnetic element can be precisely defined.

Although, in this embodiment, the second antiferromagnetic layer 12 is laminated directly on the substrate 11, the second antiferromagnetic layer 12 may be laminated on the substrate 11 with an underlying layer provided therebetween and comprising an alumina layer, Ta, or the like.

When the longitudinal bias layer 18 is laminated on the multilayer film A with the nonmagnetic layer 16 provided therebetween, the magnetization direction of the free magnetic layer 15 is oriented by RKKY interaction with the longitudinal bias layer 18. The RKKY interaction exerts only on the regions located directly below the antiferromagnetic layer (longitudinal bias layer 18) having a thickness with antiferromagnetism, does not exert on the region out of the regions directly below the antiferromagnetic layer having a thickness with antiferromagnetism. Namely, the RKKY interaction exerts only on the regions D at both ends in the track width direction, which are not overlapped with the bottom 21b of the recess 21, but does no exert on the region E overlapped with the bottom 21b of the recess 21.

Therefore, the region of the track width (optical track width) Tw set as the width dimension of thee recess 21 formed in the longitudinal bias layer 18 is the sensitive zone substantially contributing reproduction of a recording medium and exhibiting the magnetoresistive effect. Namely, in the thin film magnetic element of the present invention, the optical track width of the thin film magnetic element is equal to the magnetic track width, and thus the thin film magnetic element can easily comply with the higher recording density of a recording medium, as compared with a hard bias system which causes difficulties in controlling the magnetic track width because of the presence of dead zones.

Also, no dead zone occurs in the region of the track width (optical track width) Tw set at the time of formation of the thin film magnetic element, and when the optical track width Tw of the thin film magnetic element is decreased for complying with a higher recording density, a decrease in the reproduced output can thus be suppressed.

Furthermore, in this embodiment, the side end surfaces S of the thin film magnetic element can be formed perpendicularly to the surface 11a of the substrate 11, thereby suppressing a variation in the length of the free magnetic layer 15 in the width direction.

Like in this embodiment, when the magnetization direction of the free magnetic layer 15 can be oriented by RKKY interaction with the longitudinal bias layer 18, exchange coupling force can be strengthened as compared with the case of direct contact between the longitudinal bias layer 18 and the free magnetic layer 15.

Like in this embodiment, when the nonmagnetic layer 16 is made of a conductive material, the nonmagnetic layer 16 can be caused to function as a backed layer having the spin filter effect.

When the backed layer (the nonmagnetic layer 16) having the spin filter effect is provided in contact with the free magnetic layer 15, the position at the center height at which a sensing current flows through the laminate can be moved to the backed layer Side in comparison to a case in which the backed layer is not provided. Namely, the position at the center height of the sensing current deviates from the free magnetic layer 15 to decrease the intensity of the sensing current magnetic field at the position of the free magnetic layer 15, thereby decreasing the influence of the sensing current magnetic field on variable magnetization of the free magnetic layer 15. Therefore, asymmetry can be decreased.

The "asymmetry" means the degree of asymmetry of a reproduced output waveform, and the obtained reproduced output having a symmetry waveform has low asymmetry. Therefore, the reproduced output waveform having asymmetry of approximately zero has excellent symmetry.

When the variable magnetization direction of the free magnetic layer and the pinned magnetization direction of the pinned magnetic layer are perpendicular to each other, the asymmetry is zero. When the asymmetry greatly deviates, information from a medium cannot be accurately read to cause an error. Therefore, with lower asymmetry, reproduced signal processing has improved reliability, thereby providing an excellent spin valve thin film magnetic element.

Figure 14:
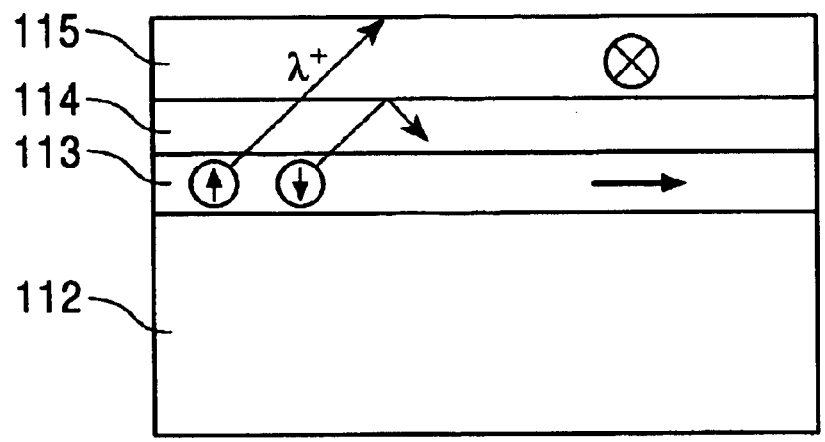
FIG. 14 is a schematic drawing illustrating a spin filter effect by a backed layer.
Figure 15:
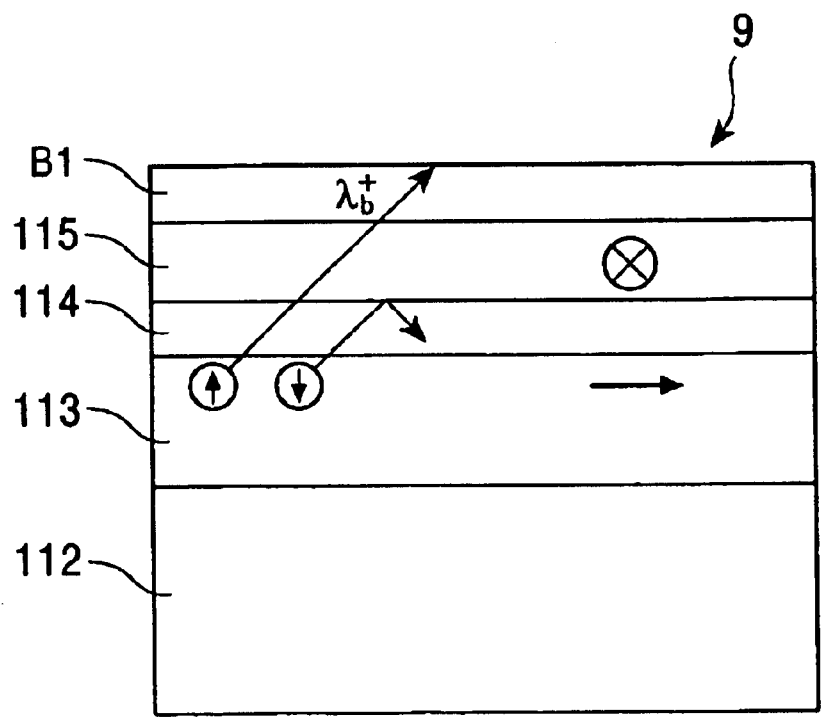
FIG. 15 is a schematic drawing illustrating a spin filter effect by a backed layer.

The spin filter effect is described below. FIGS. 14 and 15 are schematic drawings illustrating the spin filter effect of a backed layer in a spin valve thin film magnetic element. FIG. 14 is a schematic drawing illustrating an example of a structure without the backed layer, and FIG. 15 is a schematic drawing illustrating an example of a structure comprising the backed layer.

The giant magnetoresistive (GMR) effect is mainly due to "spin-dependent scattering" of electrons. Namely, the GMR effect utilizes the difference between the mean free path $\lambda^+$ of conduction electrons having spin (for example, spin-up) parallel to the magnetization direction of a magnetic material, i.e., a free magnetic layer, and the mean free path $\lambda^-$ of conduction electrons having a spin (for example, spin-down) antiparallel to the magnetization direction. In FIGS. 14 and 15, the conduction electrons having the spin-up are shown by an upward arrow, and the conduction electrons having the spin-down are shown by a downward arrow. When electrons pass through the free magnetic layer, the electrons having the spin-up parallel to the magnetization direction of the free magnetic layer can freely move, while the electrons having the spin-down are immediately scattered.

This is because the mean free path $\lambda^+$ of the electrons having the spin-up is, for example, about 50 angstroms, while the mean free path $\lambda^-$ of the electrons having the spindown is about 6 angstroms, and is as small as about one tenth of that of the spin-up electrons. The thickness of the free magnetic layer 115 is set to be larger than the mean free path $\lambda^-$ of about 6 angstroms of the electrons having the spin-down, and smaller than that mean free path $\lambda^+$ of about 50 angstroms of the electrons having the spin-up.

Therefore, when the electrons pass through the free magnetic layer 115, the electrons having the spin-up parallel to the magnetization direction of the free magnetic layer 115 can freely move, while the electrons having the spin-down are immediately scattered (filtered out).

The spin-down electrons produced in a pinned magnetic layer 113 and passing through a nonmagnetic material layer 114 are scattered near the interface between the free magnetic layer 115 and the nonmagnetic material layer 114, and less reach the free magnetic layer 115. Namely, even when the magnetization direction of the free magnetic layer 115 is rotated, the mean free path of the spin-down electrons is not changed to cause no influence on the rate of resistance change by the GMR effect. Therefore, only the behavior of the spin-up electrons may be considered for the GMR effect.

The spin-up electrons produced in the pinned magnetic layer 113 move through the nonmagnetic material layer 114 having a thickness smaller than the mean free path of the spin-up electrons, and reach the free magnetic layer 115. The spin-up electrons can freely pass through the free magnetic layer 115 because the spin-up electrons have spin parallel to the magnetization direction of the free magnetic layer 115. In the state in which the magnetization directions of the pinned magnetic layer and the free magnetic layer are antiparallel to each other, the spin-up electrons are not electrons having spin parallel to the magnetization direction of the free magnetic layer 115. Therefore, the spin-up electrons are scattered near the interface between the free magnetic layer 115 and the nonmagnetic material layer 114 to rapidly decrease the effective mean free path of the spin-up electrons. Namely, the resistance value is increased. The rate of resistance change has a positive correlation with the amount of change in the effective mean free path of the spin-up electrons.

As shown in FIG. 15, when a backed layer B1 is provided, the spin-up electrons passing through the free magnetic layer 115 move through the additional mean free path $\lambda^+b$ in the backed layer B1, which is determined by the material of the backed layer B1, and are then scattered. In other words, by providing the backed layer B1, the mean free path $\lambda^+$ of the spin-up electrons is lengthened by the additional mean free path $\lambda^+b$.

In this embodiment comprising the nonmagnetic layer 16 functioning as the backed layer, the mean free path of the spin-up conduction electrons can be lengthened. Therefore, the amount of change in the mean free path of the spin-up electrons with application of the external magnetic field can be increased to improve the rate of magnetoresistance change ($\Delta R/R$) of the spin valve thin film magnetic element. In this embodiment, the other antiferromagnetic layer 17 may be formed as a specular reflection layer. In order to form the other antiferromagnetic layer 17 as the specular reflection layer, the other antiferromagnetic layer 17 may comprise a single layer film or multilayer film of a semi-metal Heusler alloy, for example, NiMnSb, PtMnSb, or the like.

By using such a material, a sufficient potential barrier can be formed between the other antiferromagnetic layer 17 and the adjacent layer to obtain the sufficient specular effect.

Figure 16:
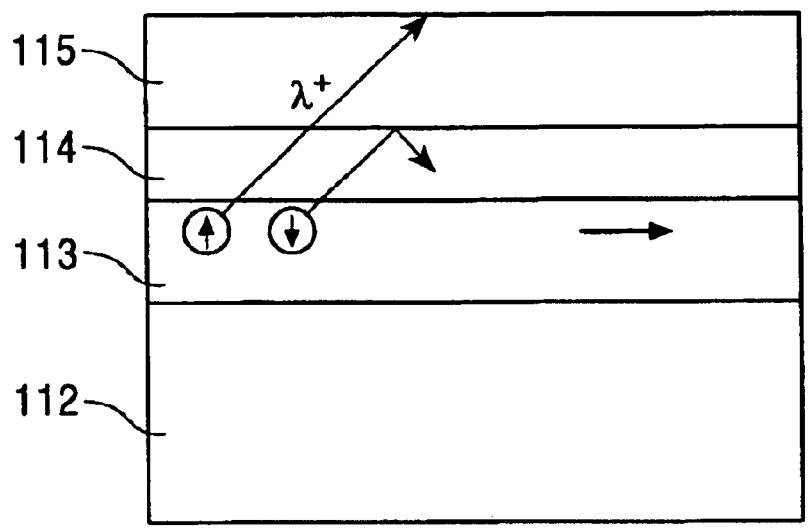
FIG. 16 is a schematic drawing illustrating a specular effect by a specular reflection layer.
Figure 17:
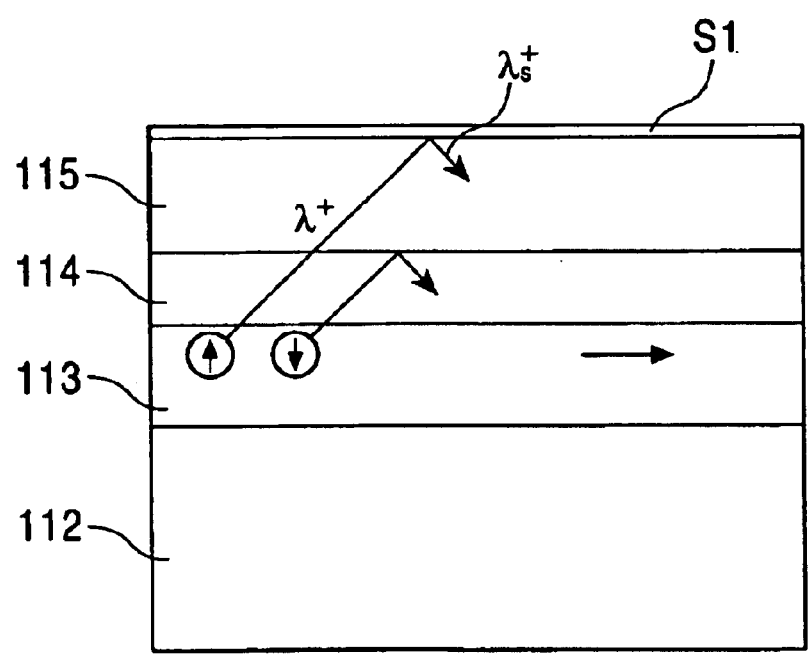
FIG. 17 is a schematic drawing illustrating a specular effect by a specular reflection layer.
Figure 18:
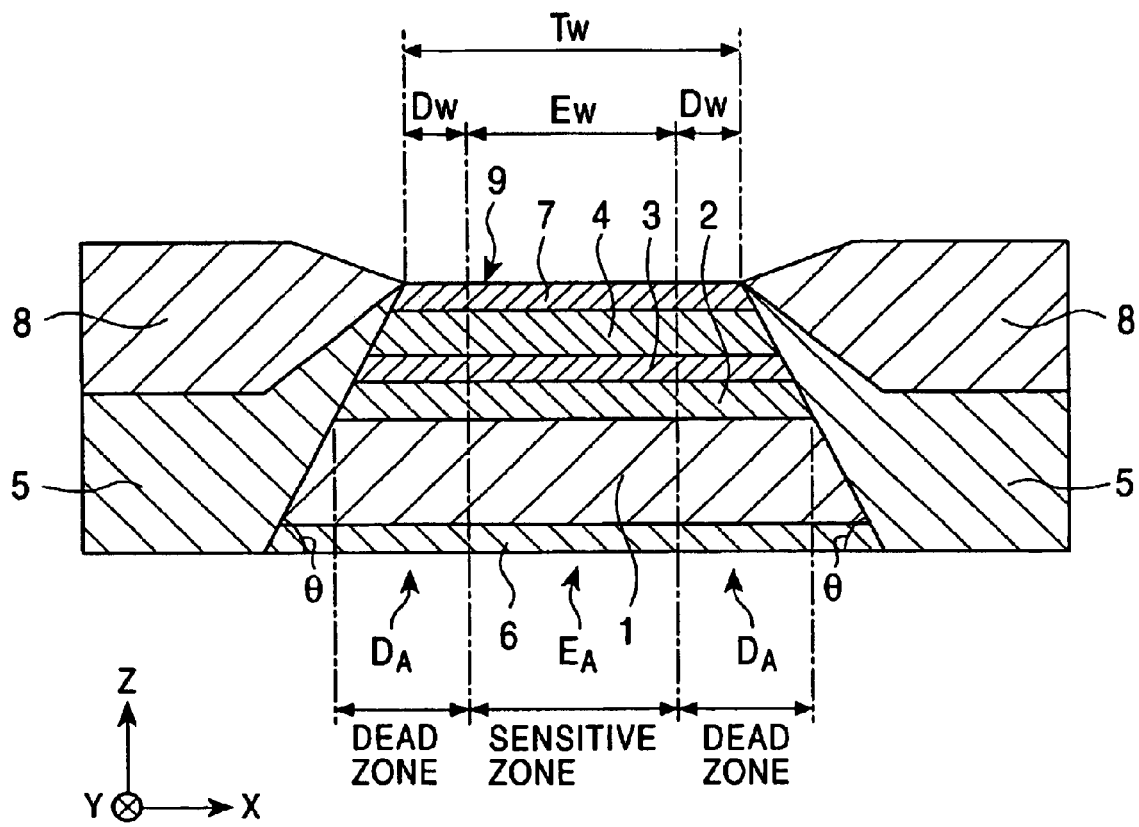
FIG. 18 is a sectional view of a conventional thin film magnetic element.

The specular reflection effect will be described. FIGS. 16 and 17 are schematic drawings illustrating the specular reflection effect of a specular reflection layer S1 in a spin valve thin film magnetic element. As described above in the description of the spin filter effect, only the behavior of the spin-up electrons which is defined by the pinned magnetization direction of the pinned magnetic layer 113 may be considered for the GMR effect.

In the state in which the magnetization directions of the pinned magnetic layer and the free magnetic layer are parallel to each other, the spin-up electrons pass through the nonmagnetic material layer 114 to reach the free magnetic layer 115, as shown in FIGS. 16 and 17. Then, the spin-up electrons move through the free magnetic layer 115 to reach the vicinity of the interface between the free magnetic layer 115 and the specular reflection layer S1.

As shown in FIG. 16, when the specular reflection layer is not provided, the spin-up electrons move through the free magnetic layer 115, and are scattered by the upper surface of the free magnetic layer 115. Therefore, the mean free path is shown by $\lambda^+$ in the drawing.

On the other hand, as shown in FIG. 17, when the specular reflection layer S1 is provided, the potential barrier is formed near the interface between the free magnetic layer 115 and the specular reflection layer S1, and thus the spin-up electrons are specularly reflected (specular scattering) near the interface between the free magnetic layer 115 and the specular reflection layer S1.

In general, the spin state (energy, quantum state, etc.) of conduction electrons is changed by scattering. However, in specular scattering, the spin-up electrons are likely to be reflected while maintaining the spin state, and again move through the free magnetic layer 115. Namely, the spin state of the spin-up conduction electrons is maintained in specular reflection, and thus the spin-up electrons move through the free magnetic layer as if they were not scattered.

This means that the mean free path is lengthened by specular reflection of the spin-up electrons by a reflection mean free path $\lambda^+s$.

In the state in which the magnetization directions of the pinned magnetic layer and the free magnetic layer are antiparallel to each other, the spin-up electrons are not electrons having spin parallel to the magnetization direction of the free magnetic layer 115. Therefore, the spin-up electrons are scattered near the interface between the free magnetic layer 115 and the nonmagnetic material layer 114 to rapidly decrease the effective mean free path of the spin-up electrons. Namely, the resistance value is increased. The rate of resistance change has a positive correlation with the amount of change in the effective mean free path of the spin-up electrons.

In this embodiment comprising the other antiferromagnetic layer 17 functioning as the specular reflection layer, the mean free path of the spin-up conduction electrons can be lengthened. Therefore, the amount of change in the mean free path of the spin-up electrons with application of the external magnetic field can be increased to improve the rate of magnetoresistance change (ΔR/R) of the spin valve thin film magnetic element.

When the free magnetic layer is relatively thin, the difference between the mean free paths of the spin-up and spin-down conduction electrons is more effectively increased by the spin filter effect and the specular reflection effect.

With the free magnetic layer 15 having a thickness of less than 15 Å, the free magnetic layer 15 cannot easily be formed to function as a ferromagnetic material layer, thereby failing to obtain the sufficient magnetoresistive effect.

With the free magnetic layer 15 having a thickness of over 45 Å, the number of the spin-up conduction electrons scattered before reaching the specular reflection layer is increased to undesirably decrease the rate of change in the rate of resistance change with the specular effect.

In FIG. 1, the first pinned magnetic layer 13a and the second pinned magnetic layer 13c having different magnetic moments per unit area are laminated with the nonmagnetic intermediate layer 13b provided therebetween to form the single pinned magnetic layer 13.

The first pinned magnetic layer 13a is formed in contact with the antiferromagnetic layer 12, and annealing in a magnetic field produces an exchange anisotropic magnetic field by exchange coupling at the interface between the first pinned magnetic layer 13a and the antiferromagnetic layer 12 to pin the magnetization direction of the first pined magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material. In FIG. 1, the first and second pinned magnetic layers 13a and 13c are formed by using the same material to have different thicknesses so that the magnetic moments per unit area are different.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layer 18 in the track width direction to increase the longitudinal bias magnetic field of the longitudinal bias layer 18.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

However, the pinned magnetic layer may comprise a single ferromagnetic material layer.

The method of manufacturing the thin film magnetic element of this embodiment will be described below.

First, the second antiferromagnetic layer 12, the pinned magnetic layer 13, the nonmagnetic material layer 14, the free magnetic layer 15, the nonmagnetic layer 16 and the other antiferromagnetic layer 17 are laminated in order on the substrate 11 to form the multilayer film A.

The second antiferromagnetic layer 12, the pinned magnetic layer 13, the nonmagnetic material layer 14, the free magnetic layer 15, the nonmagnetic layer 16 and the other antiferromagnetic layer 17 are formed by the thin film forming process such as sputtering, evaporation, or the like. Next, first magnetic field annealing of the multilayer film A is preformed at a first heat treatment temperature in a magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the other antiferromagnetic layer 17 is oxidized by a thickness of 10 to 20 Å from the surface thereof. Therefore, in the multilayer film A, the surface of the other antiferromagnetic layer 17 is cut by 20 Å by ion milling to remove the oxidized portion. In this embodiment, the other antiferromagnetic layer 17 is deposited on the uppermost layer of the multilayer film A, and thus oxidation of the nonmagnetic layer 16 and the free magnetic layer 15 can be prevented.

Next, the longitudinal bias layer 18 is deposited as the second antiferromagnetic layer on the multilayer film A, and the electrode layer 19 is deposited on the longitudinal bias layer 18.

Next, a resist is deposited on the electrode layer 19 to mask the electrode layer 19 with a space corresponding to the track width Tw.

Furthermore, the portion of the longitudinal bias layer 18, which is not masked with the resist, is cut off by ion milling or reaction ion etching (RIE) perpendicularly to the surface 11a of the substrate 11 to form the recess 21. The side surfaces 21a of the recess 21 are perpendicular to the surface 11a of the substrate 11. In the thin film magnetic element shown in FIG. 1, the recess 21 is formed so that the bottom 21b thereof is located in the longitudinal bias layer 18.

In this case, the total of the thickness of the region of the longitudinal bias layer 18, which is overlapped with the bottom 21b of the recess 21, and the thickness of the other antiferromagnetic layer 17 is more than 0 and 30 Å or less.

After the recess 21 is formed, the multilayer film B ranging to the electrode layer 19 is subjected to second magnetic field annealing at a second heat treatment temperature in a magnetic field of second magnitude in the X direction to produce an exchange anisotropic magnetic field in the longitudinal bias layer 18, to pin the magnetization direction of the free magnetic layer 15 in the X direction. In this embodiment, the second heat treatment temperature is 250° C., and the second magnitude of the magnetic field is 24 k (A/m).

In the present invention, the nonmagnetic layer 16 is laminated in contact with the upper surface of the free magnetic layer 15. The magnetization direction of the free magnetic layer 15 is oriented in the X direction by RKKY coupling with the longitudinal bias layer 18 through the nonmagnetic layer 16.

After the second annealing, the resist layer is removed to obtain the thin film magnetic element shown in FIG. 1.

The exchange anisotropic magnetic field of the longitudinal bias layer 18 is not produced until the step of second magnetic field annealing. Therefore, in order to orient the exchange anisotropic magnetic field of the longitudinal bias layer 18 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer 12 is lost, and the second magnitude of the magnetic field is set to be lower than that of the exchange anisotropic magnetic field of the second antiferromagnetic layer 12. Also, even when the second antiferromagnetic layer 12 and the longitudinal bias layer 18 are formed by using antiferromagnetic materials having the same composition, the second magnetic annealing under these conditions can orient the magnetization direction of the longitudinal bias layer 18 in the X direction with the magnetization direction of the exchange anisotropic magnetic field of the second antiferromagnetic layer 12 being oriented in the Y direction.

Namely, in the present invention, the magnetization direction of the free magnetic layer 15 can easily be pinned perpendicularly to the magnetization direction of the pinned magnetic layer 13.

Like in this embodiment, when the total t1 of the thickness of the region of the longitudinal bias layer 18, which is overlapped with the bottom 12b of the recess 21, and the thickness of the other antiferromagnetic layer 17 is more than 0 and 30 Å or less, in the regions of the longitudinal bias layer 18 and the other antiferromagnetic layer 17, which are overlapped with the bottom 21b of the recess 21, the disordered structure is not transformed to the ordered structure by second magnetic field annealing, thereby causing no exchange coupling magnetic field.

Namely, only in both end portions D in the track width direction, except in the portion overlapped with the bottom 21b of the recess 21, the magnetization direction of the free magnetic layer 15 is pinned by RKKY coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed.

Therefore, the track width of the thin film magnetic element is determined by the width dimension Tw of the recess 21. As described above, in the present invention, the recess 21 can be formed only by cutting the longitudinal bias layer 18 having a uniform thickness with reactive ion etching (RIE) or ion milling perpendicularly to the surface 11a of the substrate 11. Therefore, the recess 21 with an accurate width dimension Tw can be formed. Namely, the track width Tw of the thin film magnetic element can be precisely defined.

In this embodiment, after the electrode layer 19 is deposited on the longitudinal bias layer 18, the resist is laminated on the electrode layer 19, and then the recess is formed in the longitudinal bias layer 18. However, a resist may be laminated on the longitudinal bias layer 18, and the electrode layer 19 may be deposited on the longitudinal bias layer 18 after the recess 21 is formed in the longitudinal bias layer 18.

Figure 2:
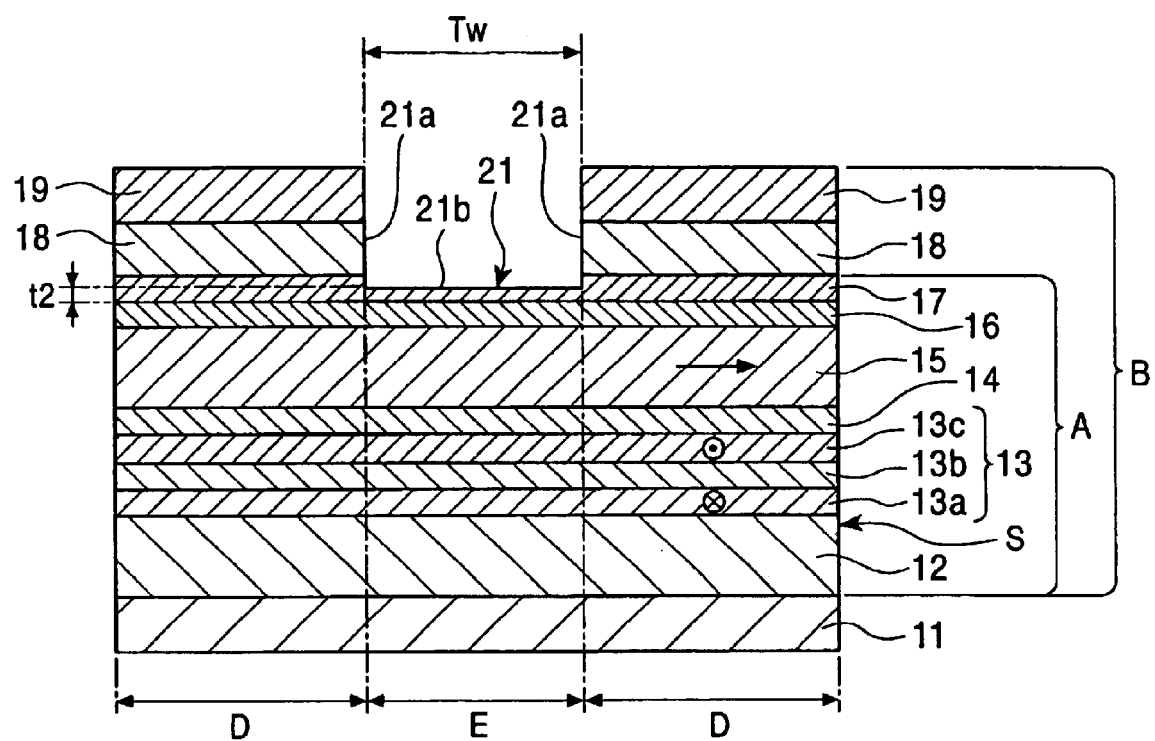
FIG. 2 is a sectional view of a thin film magnetic element according to a second embodiment of the present invention.

FIG. 2 is a sectional view of a thin film magnetic element according to a second embodiment of the present invention, as viewed from the ABS side.

The thin film magnetic element shown in FIG. 2 is substantially the same as the first embodiment except that the recess 21 is formed so that the bottom 21b of the recess 21 is located in the other antiferromagnetic layer 17.

In the second embodiment, the thickness t2 of the region of the other antiferromagnetic layer 17, which is overlapped with the bottom 21b of the recess 21, is more than 0 and 30 Å or less so that transformation from the ordered structure to the ordered structure does not occur in the region of the other antiferromagnetic layer 17, which is overlapped with the bottom 21b of the recess 21, by magnetic field annealing, thereby causing no exchange coupling magnetic field.

Therefore, only in both end portions D in the track width direction, except in the portion overlapped with the bottom 21b of the recess 21, the magnetization direction of the free magnetic layer 15 is pinned by RKKY coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed. Therefore, the track width of the thin film magnetic element is determined by the width dimension Tw of the recess 21.

In the thin film magnetic element of this embodiment in which the recess 21 is formed so that the bottom 21b of the recess 21 is located in the other antiferromagnetic layer 17, like in the thin film magnetic element shown in FIG. 1, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 2 can exhibit effects equivalent to the other effects of the thin film magnetic element of the first embodiment shown in FIG. 1.

Figure 3:
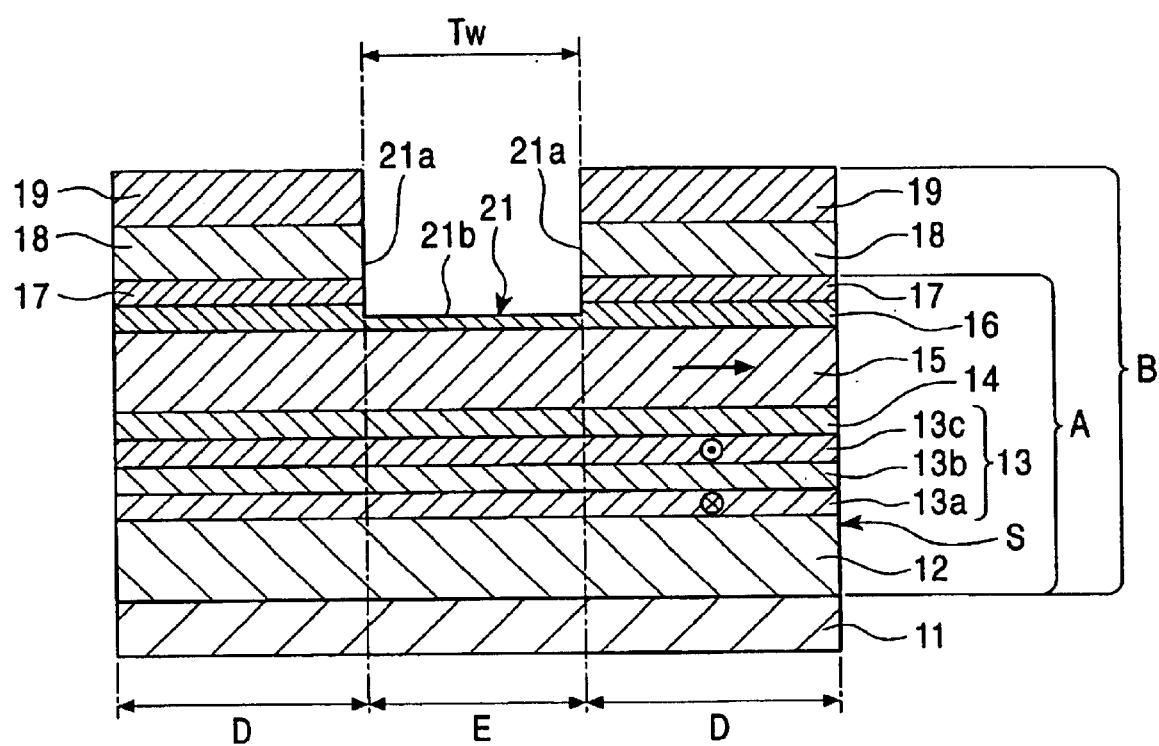
FIG. 3 is a sectional view of a thin film magnetic element according to a third embodiment of the present invention.

FIG. 3 is a sectional view of a thin film magnetic element according to a third embodiment of the present invention, as viewed from the ABS side.

The thin film magnetic element shown in FIG. 3 is substantially the same as the first embodiment except that the recess 21 is formed so that the bottom 21b of the recess 21 is located in the nonmagnetic layer 16.

In the third embodiment, only in both end portions D in the track width direction, except in the portion overlapped with the bottom 21b of the recess 21, the magnetization direction of the free magnetic layer 15 is pinned by RKKY coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed. Therefore, the track width of the thin film magnetic element is determined by the width dimension Tw of the recess 21.

In the thin film magnetic element of this embodiment in which the recess 21 is formed so that the bottom 21b of the recess 21 is located in the nonmagnetic layer 16, like in the thin film magnetic element shown in FIG. 1, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 3 can exhibit effects equivalent to the other effects of the thin film magnetic element of the first embodiment shown in FIG. 1.

Figure 4:
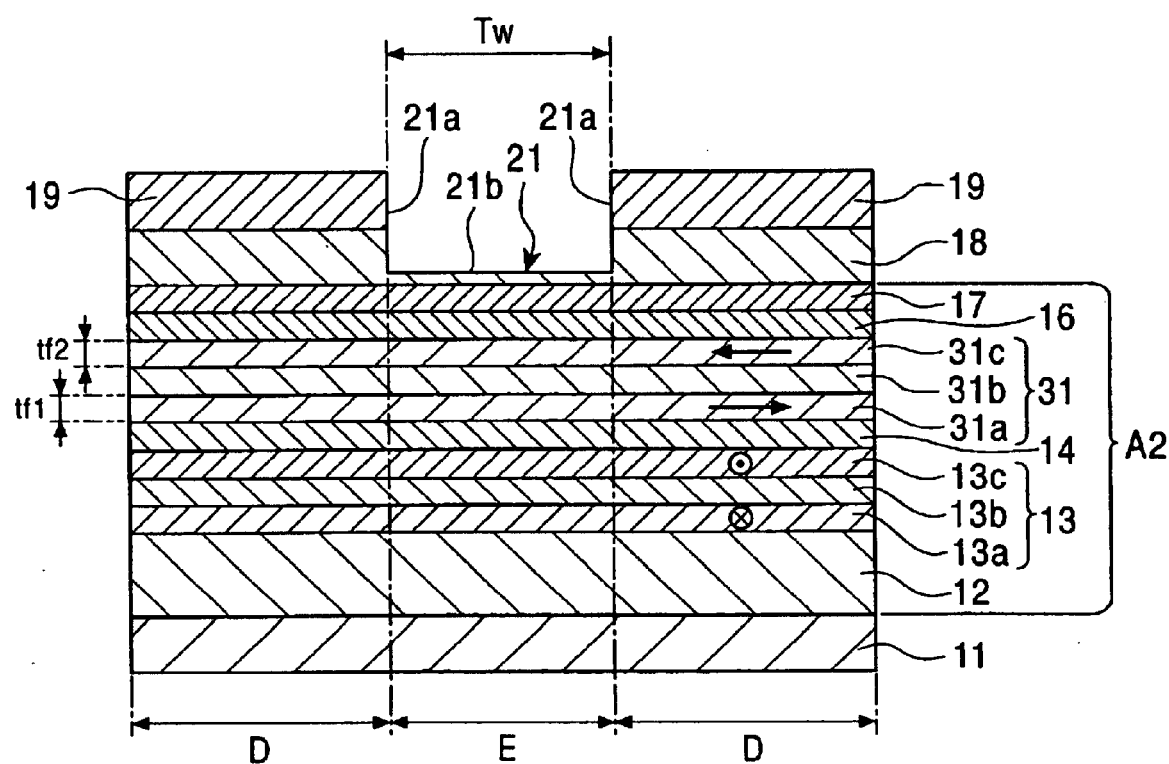
FIG. 4 is a sectional view of a thin film magnetic element according to a fourth embodiment of the present invention.

FIG. 4 is a sectional view of a thin film magnetic element according to a fourth embodiment of the present invention, as viewed from the ABS side.

The thin film magnetic element shown in FIG. 4 is substantially the same as the first embodiment except that a free magnetic layer 31 is formed as a so-called synthetic ferrimagnetic free magnetic layer comprising first and second free magnetic layers 31a and 31c which have magnetic movements of different magnitudes per unit area which are laminated with a nonmagnetic intermediate layer 31b provided therebetween.

The first and second free magnetic layers 31a and 31c are made of a ferromagnetic material, for example, a NiFe alloy, Co, a CoNiFe alloy, a CoFe alloy, a CoNi alloy, or the like. Particularly, the NiFe alloy is preferably used.

The nonmagnetic intermediate layer 31b is made of a nonmagnetic material, for example, an alloy of at least one element of Ru, Rh, Ir, Cr, Re, and Cu. Particularly, Ru is preferably used.

In this embodiment, an anti-diffusion layer made of Co or the like may be formed between the first free magnetic layer 31a and the nonmagnetic material layer 14. The anti-diffusion layer prevents mutual diffusion between the first free magnetic layer 31 and the nonmagnetic material layer 14.

The first and second free magnetic layers 31a and 31c are formed to have different magnetic moments per unit area. The magnetic moment per unit area is represented by the product of the saturation magnetization (Ms) and the thickness (t). Therefore, for example, when the first and second free magnetic layers 31a and 31c are formed by using the same material to have different thicknesses, the first and second free magnetic layers 31a and 31c have different magnetic moments per unit area.

When the anti-diffusion layer of Co or the like is formed between the first free magnetic layer 31a and the nonmagnetic material layer 14, the total magnetic moment per unit area of the first free magnetic layer 31a and the anti-diffusion layer is preferably different from the magnetic moment per unit area of the second free magnetic layer 31c.

The thickness tf2 of the second free magnetic layer 31c is preferably in the range of 0.5 to 2.5 nm. Also, the thickness tf1 of the first free magnetic layer 31a is preferably in the range of 2.5 to 4.5 nm, more preferably in the range of 3.0 to 4.0 nm, and most preferably in the range of 3.5 to 4.0 nm. With the thickness tf1 of the first free magnetic layer 31a out of the above range, the rate of magnetoresistance change of the spin valve thin film magnetic element cannot be increased.

In FIG. 4, the first free magnetic layer 31a and the second free magnetic layer 31c having different magnetic moments per unit area are laminated with the nonmagnetic intermediate layer 31b provided therebetween to form the single free magnetic layer 31.

The first and second free magnetic layers 31a and 31c are in the ferrimagnetic state in which the magnetization directions thereof are 180° different in an antiparallel state. In this case, the magnetization direction the free magnetic layer having a higher magnetic moment per unit area, for example, the first free magnetic layer 31a, is oriented in the direction of the magnetic field produced from the longitudinal bias layer 18, the magnetization direction of the second free magnetic layer 31c being oriented in the 180° opposite direction. When the first and second free magnetic layers 31a and 31c are in the ferrimagnetic state in which the magnetization directions thereof are 180° different in an antiparallel state, an effect equivalent to the effect of decreasing the thickness of the free magnetic layer 31 can be obtained to decrease saturation magnetization. Therefore, magnetization of the free magnetic layer 31 easily varies to improve the magnetic field sensitivity of a magnetoresistive element.

The direction of the synthetic magnetic moment per unit area corresponding to the total of the magnetic moments per unit area of the first and second free magnetic layers 31a and 31c coincides with the magnetization direction of the free magnetic layer 31.

However, only the magnetization direction of the first free magnetic layer 31a contributes to output based on the relation to the magnetization direction of the pinned magnetic layer 13.

When the first and second free magnetic layers have different magnetic thicknesses, the spin flop magnetic field of the free magnetic layer 31 can be increased.

The spin flop magnetic field represents the magnitude of the external magnetic field applied to two magnetic layers having antiparallel magnetization directions to cause a state in which the magnetization directions are not antiparallel.

Figure 13:
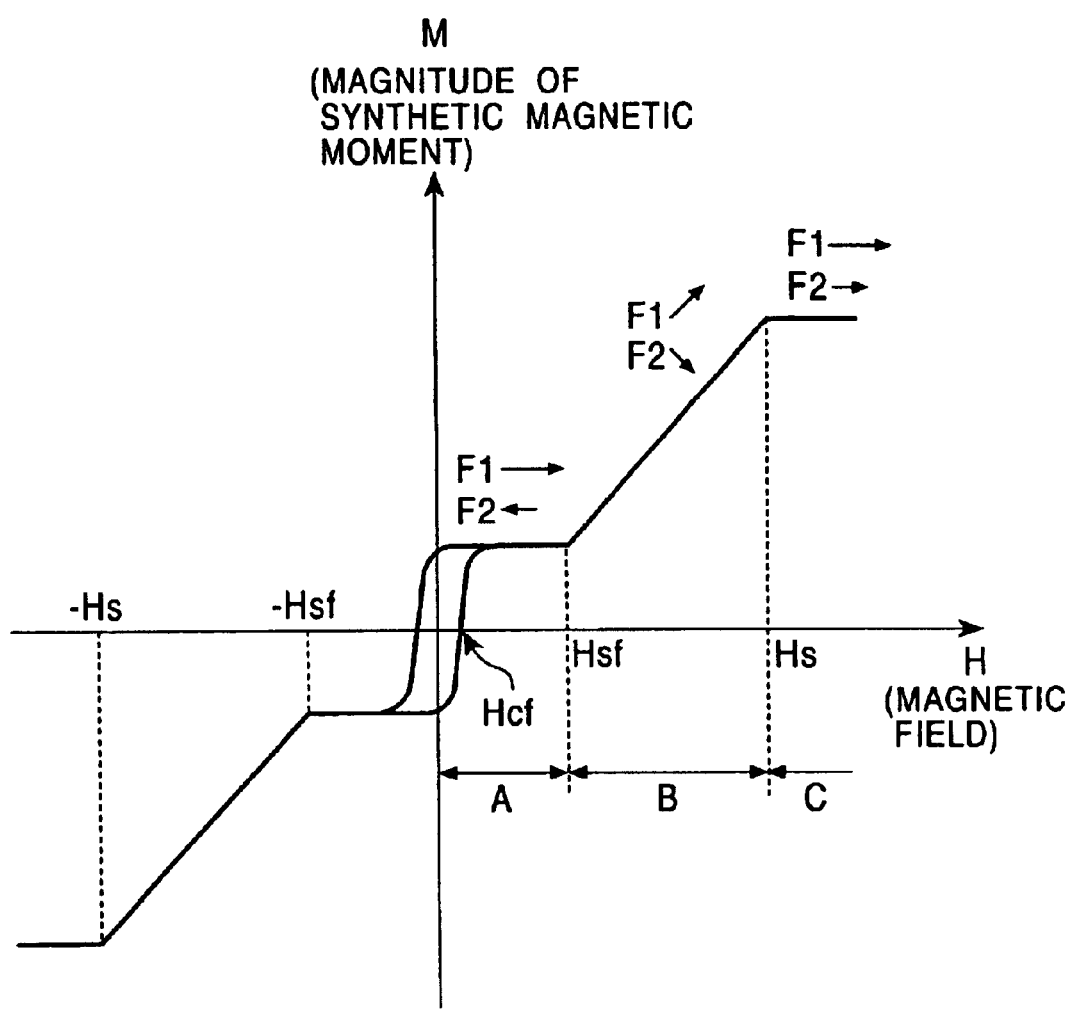
FIG. 13 is a diagram showing a M-H curve of a synthetic ferrimagnetic free magnetic layer.

FIG. 13 is a conceptual drawing of a hysteresis loop of the free magnetic layer 31. The M-H curve shown in FIG. 13 shows changes in magnetization M of the free magnetic layer having the construction shown in FIG. 4 with the external magnetic field applied in the track width direction.

In FIG. 13, arrow F1 represents the magnetization direction of the first free magnetic layer, and arrow F2 represents the magnetization direction of the second free magnetic layer.

As shown in FIG. 13, with the small external magnetic field applied, the first and second free magnetic layers are in the ferrimagnetic state in which the directions of the arrows F1 and F2 are antiparallel, while with the external magnetic field H of magnitude over a predetermined value, RKKY coupling between the first and second free magnetic layers is broken to fail to maintain the ferrimagnetic state. This is referred to as "spin flop transfer". The spin flop magnetic field represents the magnitude of the external magnetic field with which the spin flop transfer occurs, which is shown by Hsf in FIG. 13. In FIG. 13, HcF denotes the coercive force of magnetization of the free magnetic layer.

In the present invention, the free magnetic layer has a laminated ferrimagnetic structure in which a plurality of ferromagnetic material layers having magnetic moments of different magnitudes per unit area are laminated through nonmagnetic intermediate layers so that the adjacent ferromagnetic material layers with the nonmagnetic intermediate layer provided therebetween have antiparallel magnetization directions in the ferrimagnetic state.

In order to appropriately maintain the antiparallel magnetization state, the material of the free magnetic layer must be improved to increase the exchange coupling magnetic field by the RKKY interaction exerting between the plurality of ferromagnetic material layers.

As the magnetic material for forming the ferromagnetic material layers, a NiFe alloy is frequently used. Since the NiFe alloy has excellent soft magnetic properties, it is conventionally used for free magnetic layers. However, in the free magnetic layer having the laminated ferrimagnetic structure, the antiparallel coupling force between the ferromagnetic material layers made of the NiFe alloy is not so strong.

Therefore, in the present invention, the material of the ferromagnetic material layers is improved to strengthen antiparallel coupling force between the plurality of ferromagnetic material layers so that both end portions of the free magnetic layer positioned at both ends in the track width direction are not influenced by the external magnetic field. Therefore, in order to appropriately suppress the occurrence of side reading, a CoFeNi alloy is used for at least one of the plurality of ferromagnetic material layers, preferably all of the ferromagnetic material layers. By adding Co, the antiparallel coupling force can be strengthened.

FIG. 13 is a conceptual drawing of a hysteresis loop of the free magnetic layer having the laminated ferrimagnetic structure. For example, it is assumed that the magnetic moment (saturation magnetization Ms×thickness t) per unit area of the first free magnetic layer (F1) is larger than the magnetic moment per unit area of the second free magnetic layer (F2), and the external magnetic field is, applied in the rightward direction shown in the drawing.

The synthetic magnetic moment per unit area determined by the vector sum ($|Ms·t(F1)+Ms·t(F2)|$) of the magnetic moment per unit area of the first free magnetic layer and the magnetic moment per unit area of the second free magnetic layer is constant in magnitude to a certain time point as the external magnetic field increases from zero. In the external magnetic field region A in which the synthetic magnetic moment per unit area is constant in magnitude, the antiparallel coupling force between the first and second free magnetic layers is stronger than the external magnetic field to appropriately put magnetizations of the first and second magnetic layers into the single magnetic domain state, thereby maintaining the antiparallel state.

However, the synthetic magnetic moment per unit area of the free magnetic layer increases with a slope angle as the external magnetic field increases in the rightward direction shown in FIG. 13. This is because the external magnetic field is stronger than the antiparallel coupling force exerting between the first and second free magnetic layers to disperse the magnetizations of the first and second free magnetic layers to put the first and second magnetic layers into a multidomain state. As a result, the synthetic magnetic moment per unit area, which can be determined by the vector sum, increases. In the external magnetic field region B in which the synthetic magnetic moment per unit area increases, the antiparallel state of the free magnetic layer is broken. The external magnetic field at the starting point of increase in the synthetic magnetic moment per unit area is referred to as the "spin flop magnetic field (Hsf)".

The magnetizations of the first and second free magnetic layers are again put into the single magnetic domain state as the external magnetic field is further increased in the rightward direction shown in FIG. 13, to magnetize both free layers in the rightward direction shown in the drawing in the external magnetic field region C unlike in the external magnetic field region A. In this external magnetic field region C, the synthetic magnetic moment per unit area becomes a constant value. The magnitude of the external magnetic field at the time the synthetic magnetic moment becomes a constant value is referred to as a "saturation magnetic field (Hs)"

In the present invention, it was found that by using the CoFeNi alloy for the first and second free magnetic layers, the magnetic field with which the antiparallel state is broken, i.e., the spin flop magnetic field (Hsf), can be sufficiently increased, as compared with the use of a NiFe alloy.

In the present invention, in order to determine the magnitude of the spin flow magnetic field, experiment was carried out by using a NiFe alloy (comparative example) and a CoFeNi alloy (example) for the first and second magnetic layers in the following film structure.

Substrate/nonmagnetic material layer (Cu)/first free magnetic layer (2.4)/nonmagnetic intermediate layer (Ru)/second free magnetic layer (1.4)

Each numeric value in parenthesis represents the thickness by nm.

In the comparative example, the NiFe alloy having a Ni composition ratio of 80 atomic % and a Fe composition ratio of 20 atomic % was used for the first and second free magnetic layers. In this case, the spin flop magnetic field (Hsf) was about 59 (kA/m).

In the example, the CoFeNi alloy having a Co composition ratio of 87 atomic %, a Fe composition ratio of 11 atomic % and a Ni composition ratio of 2 atomic % was used for the first and second free magnetic layers. In this case, the spin flop magnetic field (Hsf) was about 293 (kA/m).

It was thus found that the spin flop magnetic field could be effectively improved by using the CoFeNi alloy rather than the NiFe alloy for the first and second free magnetic layers.

Next, the composition ratio of the CoFeNi alloy is described. It was also found that the magnetostriction of the CoFeNi alloy in contact with the Ru layer serving as the nonmagnetic intermediate layer was shifted to the positive side from the magnetostriction of the NiFe alloy by about $1 \times 10^{-6}$ to $6 \times 10^{-6}$.

The magnetostriction is preferably in the range of $-3 \times 10^{-6}$ to $3 \times 10^{-6}$, and coercive force is preferably 790 (A/m). With high magnetostriction, the free magnetic layer is easily affected by stress due to deposition distortion and a difference in the coefficient of thermal expansion from another layer. Therefore, magnetostriction is preferably as low as possible. The coercive force is preferably as low as possible because magnetic reversal of the free magnetic layer by the external magnetic field can be improved.

When the first and second free magnetic layers 31a and 31c are formed to have different magnetic moments per unit area, the spin flop magnetic field Hsf of the free magnetic layer 31 is increased to extend the range of a magnetic field in which the free magnetic layer 31 can maintain the ferrimagnetic state, thereby increasing stability of the ferrimagnetic state of the free magnetic layer 31.

In this embodiment, at least one of the first and second free magnetic layers 31a and 31c is preferably made of a magnetic material having the following composition.

The composition is represented by the formula CoFeNi in which the composition ratio of Fe is 9 atomic % to 17 atomic %, the composition ratio of Ni is 0.5 atomic % to 10 atomic %, and the balance is the composition ratio of Co.

As a result, the exchange coupling magnetic field produced between the first and second free magnetic layers 31a and 31c by RKKY interaction can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

Both the first and second free magnetic layers 31a and 31c are preferably made of the CoFeNi alloy. This is because a high spin flop magnetic field can be stably obtained, and the first and second free magnetic layers 31a and 31c can be appropriately magnetized in the antiparallel state.

In the above-described composition range, the magnetostriction of the first and second free magnetic layers 31a and 31c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 31, and appropriately suppress decreases in the amount of resistance change ($\Delta R$) and the rate of resistance change ($\Delta R/R$) due to Ni diffusion between the free magnetic layer 31 and the nonmagnetic material layer 14.

In this embodiment, like in the first embodiment, the magnetization direction of the free magnetic layer 31 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 4 can exhibit effects equivalent to the other effects of the thin film magnetic element of the first embodiment shown in FIG. 1.

Figure 5:
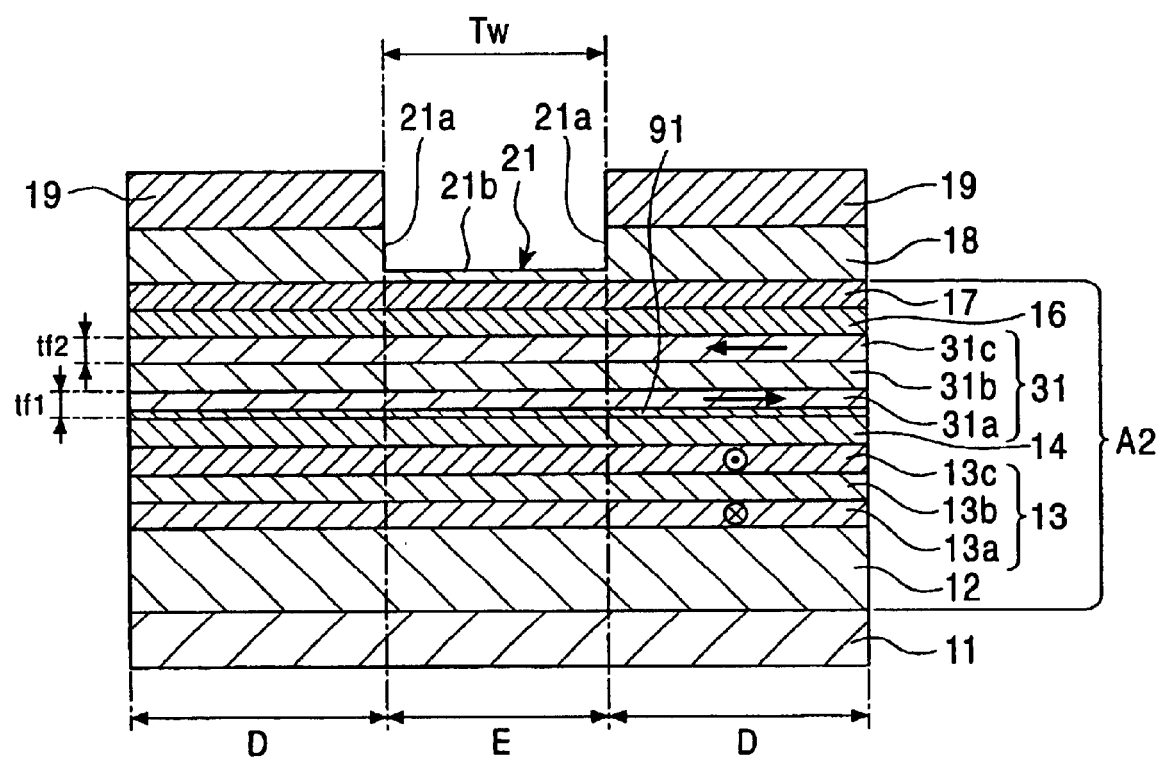
FIG. 5 is a sectional view of a thin film magnetic element according to a fifth embodiment of the present invention.

FIG. 5 is a sectional view of a thin film magnetic element according to a fifth embodiment of the present invention, as viewed from the ABS side.

The thin film magnetic element of this embodiment is different from the thin film magnetic element shown in FIG. 4 in that an intermediate layer 91 is provided between the first free magnetic layer 31a and the nonmagnetic material layer 14. The intermediate layer 91 is preferably made of a CoFe alloy or a Co alloy. Particularly, the CoFe alloy is preferably used.

By forming the intermediate layer 91, it is possible to prevent diffusion of metal elements at the interface with the nonmagnetic material layer 14, and improve the amount of resistance change ($\Delta R$) and the rate of resistance change ($\Delta R/R$). The intermediate layer 91 is formed to about 5 Å.

Particularly, when the first free magnetic layer 31a in contact with the nonmagnetic material layer 14 is made of the CoFeNi alloy having the above composition ratio, diffusion of metal elements between the first free magnetic layer 31a and the nonmagnetic material layer 14 can be appropriately suppressed. Therefore, the necessity for forming the intermediate layer 91 made of a CoFe alloy or Co between the first free magnetic layer 31a and the nonmagnetic material layer 14 is lower than the case in which the first free magnetic layer 31a is made of a magnetic material not containing Co, such as a NiFe alloy or the like.

However, even when the first free magnetic layer 31a is made of the CoFeNi alloy, the intermediate layer 91 made of a CoFe alloy or Co is preferably provided between the first free magnetic layer 31a and the nonmagnetic material layer 14 from the viewpoint that diffusion of metal elements between the first free magnetic layer 31a and the nonmagnetic material layer 14 can be securely prevented.

When the intermediate layer 91 is provided between the first free magnetic layer 31a and the nonmagnetic material layer 14, and at least one of the first and second free magnetic layers 31a and 31c is made of the CoFeNi alloy, the CoFeNi alloy preferably has a Fe composition ratio of 7 atomic % to 15 atomic %, a Ni composition ratio of 5 atomic % to 15 atomic %, and a Co composition ratio as the balance.

In this case, the exchange coupling magnetic field produced by RKKY interaction between the first and second free magnetic layers 31a and 31c can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

In the present invention, both the first and second free magnetic layers 31a and 31c are preferably made of the CoFeNi alloy. This is because a high spin flop magnetic field can be stably obtained.

In the above-described composition range, the magnetostriction of the first and second free magnetic layers 31a and 31c can be kept in the range of $-3 \times 10^{-6}$ to $3 \times 10^{-6}$, and the coercive force can be decreased to 790 (A/m) or less. Furthermore, the soft magnetic properties of the free magnetic layer 31 can be improved.

Figure 6:
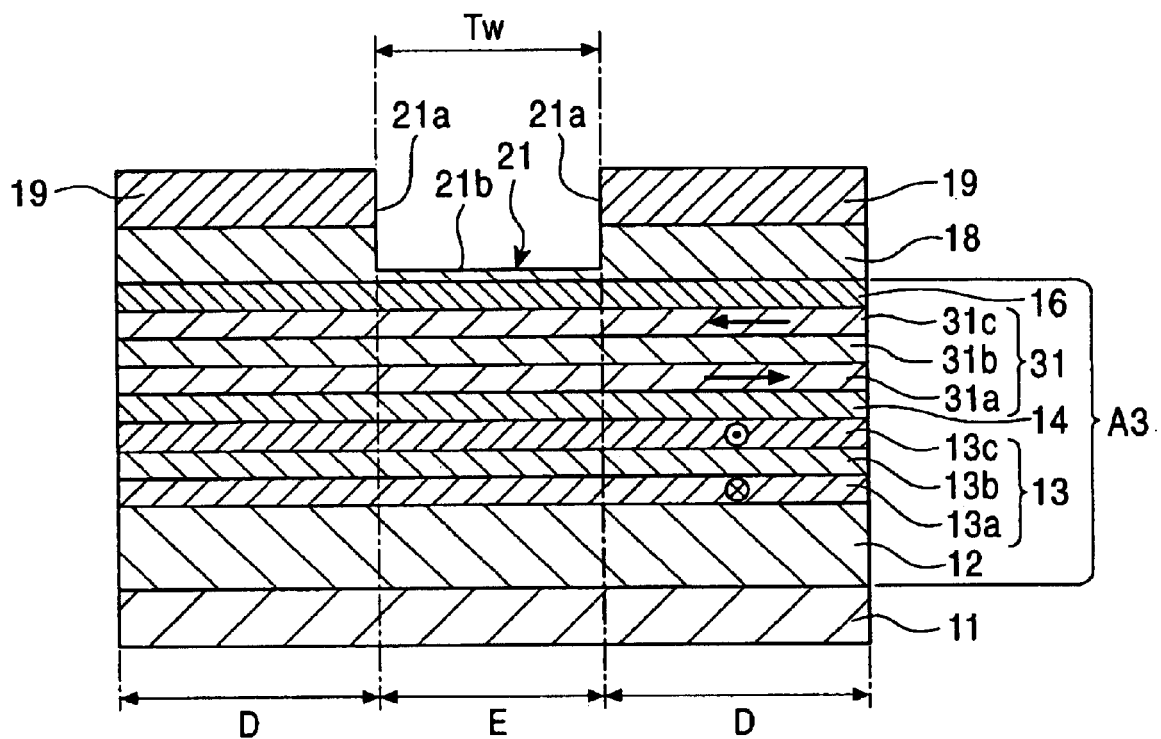
FIG. 6 is a sectional view of a thin film magnetic element according to a sixth embodiment of the present invention.

FIG. 6 is a sectional view of a thin film magnetic element according to a sixth embodiment of the present invention, as viewed from the ABS side.

The thin film magnetic element of this embodiment is substantially the same as the fourth embodiment except that a multilayer film A3 does not include another antiferromagnetic layer.

In this embodiment, the nonmagnetic layer 16 is the uppermost layer of the multilayer film A3, and thus the surface of the nonmagnetic layer 16 is oxidized in first magnetic field annealing of the multilayer film A3. Therefore, the surface of the nonmagnetic layer 16 is cut off by 20 Å by ion milling to remove the oxidized portion before the longitudinal bias layer 18 is deposited.

In this embodiment, like in the first embodiment, the magnetization direction of the free magnetic layer 31 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 6 can exhibit effects equivalent to the other effects of the thin film magnetic element of the fourth embodiment shown in FIG. 4.

In the thin film magnetic elements of the first to third embodiments, the free magnetic layer 15 may be formed as a synthetic ferrimagnetic free magnetic layer.

Figure 7:
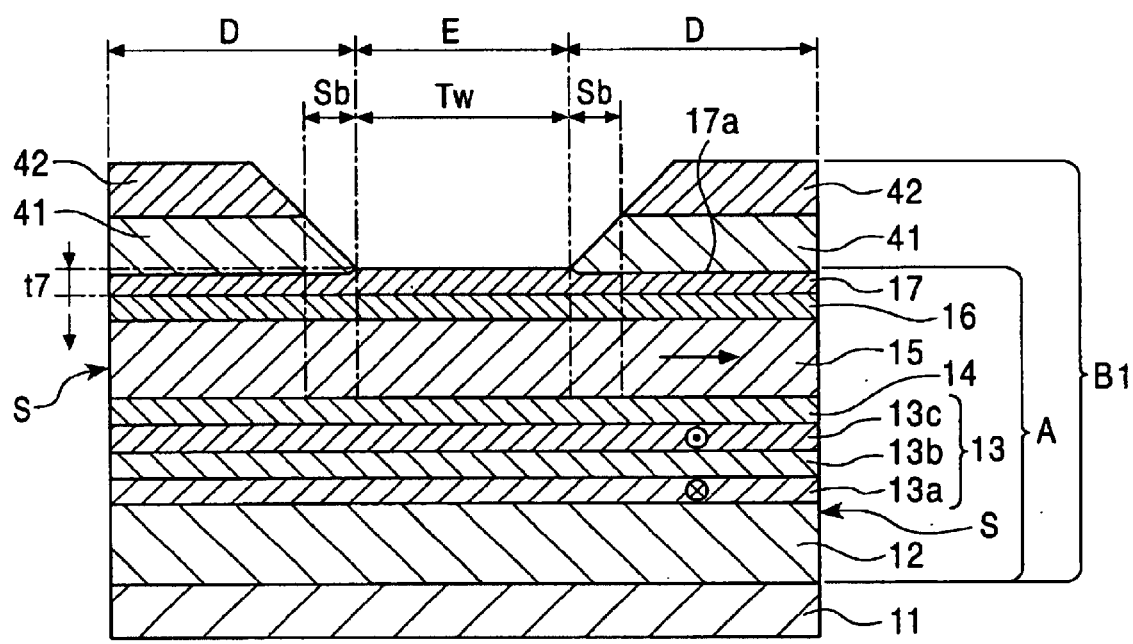
FIG. 7 is a sectional view of a thin film magnetic element according to a seventh embodiment of the present invention.

FIG. 7 is a sectional view of a thin film magnetic element according to a seventh embodiment of the present invention, as viewed from the ABS side.

In the thin film magnetic element of this embodiment, a pair of longitudinal bias layer 41 serving as a first antiferromagnetic layer is provided on the same multilayer film A as the thin film magnetic element shown in FIG. 1 so as to be arranged with a space therebetween corresponding to the track width Tw in the track width direction, and electrode layers 42 are deposited on the longitudinal bias layers 41. The materials and thicknesses of the second antiferromagnetic layer 12, the first pinned magnetic layer 13a, the nonmagnetic intermediate layer 13b, the second pinned magnetic layer 13c, the nonmagnetic material layer 14, the first free magnetic layer 31a, the nonmagnetic intermediate layer 31b, the second free magnetic layer 31c, the nonmagnetic material layer 16, and the other antiferromagnetic layer 17 are the same as the multilayer film A which constitutes the thin film magnetic element shown in FIG. 1. Like the second antiferromagnetic layer 12 and the other antiferromagnetic layer 17, the longitudinal bias layers 41 comprise a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

The thickness of both ends of the longitudinal bias layers 41 is 80 to 300 Å, for example 200 Å.

The electrode layers 42 are formed by depositing, for example, Au, W, Cr, Ta, or the like.

When the longitudinal bias layers 41 are deposited on the multilayer film A, the magnetization direction of the free magnetic layer 15 is oriented by RKKY interaction with the longitudinal bias layers 41 through the nonmagnetic layer 16. The RKKY interaction exerts only on the regions of the magnetic layer, which are located directly below the antiferromagnetic layer (the longitudinal bias layers 41) having a thickness having antiferromagnetism, while it does not exert on the region deviating from the regions directly below the antiferromagnetic layers having a thickness having antiferromagnetism.

Therefore, the region of the track width (optical track width) Tw set as the space dimension between the longitudinal bias layers 41 substantially contributes to reproduction of a recording magnetic field, and functions as the sensitive zone exhibiting the magnetoresistive effect. Namely, in the thin film magnetic element of this embodiment, the optical track width is equal to the magnetic track width, and thus the thin film magnetic element can comply with the higher recording density of a recording medium in comparison to the hard bias system which causes difficulties in controlling the magnetic track width due to the presence of the dead zones.

Also, no dead zone occurs in the region of the track width (optical track width) Tw set at the time of formation of the thin film magnetic element to suppress a decrease in reproduced output when the optical track width Tw of the thin film magnetic element is decreased for complying with a higher recording density.

However, in this embodiment, in the portions Sb at both sides of the track, the thickness dimension of the longitudinal bias layers 41 decreases toward the track. Therefore, in the portions Sb at both sides of the track, the effect of exchange coupling between the free magnetic layer 15 and the longitudinal bias layers 41 decreases. As a result, in the portions Sb at both sides of the track, the magnetization direction of the free magnetic layer 15 shown in FIG. 7 is not completely pinned in the X direction and is thus changed by applying the external magnetic field.

Particularly, when the track is narrowed for improving the recording density of the magnetic recording medium, not only information on a magnetic recording track to be read within the track width Tw but also information on the adjacent magnetic recording track are read by the portions Sb at both sides of the track, i.e., side reading possibly occurs.

In the thin film magnetic element of the present invention, the side end surfaces S of the multilayer film can be formed perpendicularly to the surface of the substrate to suppress a variation in the length of the free magnetic layer 15 in the width direction.

Also, like in this embodiment, when the magnetization direction of the free magnetic layer 15 is oriented by RKKY interaction with the longitudinal bias layers 41, the exchange coupling force can be strengthened as compared with the case of direct contact between the longitudinal bias layers 41 and the free magnetic layer 15.

In this embodiment, even when the second antiferromagnetic layer 12 and the longitudinal bias layers 41 are formed by using antiferromagnetic materials having the same composition, the exchange anisotropic magnetic field of the longitudinal bias layers 41 can be oriented in the X direction with the exchange anisotropic magnetic field of the second antiferromagnetic layer 12 being oriented in the Y direction.

In this embodiment, when the nonmagnetic layer 16 is made of a conductive material, the nonmagnetic layer 16 can be caused to function as the backed layer having the spin filter effect.

When the backed layer (the nonmagnetic layer 16) having the spin filter effect is provided in contact with the free magnetic layer 15, the position at the center height of a sensing current flowing through the laminate can be moved to the backed layer side in comparison to a case in which the backed layer is not provided. Namely, the position at the center height of the sensing current deviates from the free magnetic layer 15 to decrease the intensity of the sensing current magnetic field at the position of the free magnetic layer 15, thereby decreasing the influence of the sensing current magnetic field on variable magnetization of the free magnetic layer 15. Therefore, asymmetry can be decreased.

In this embodiment, the other antiferromagnetic layer 17 comprises a single layer film or multilayer film made of, for example, a semi-metal Heusler alloy such as NiMnSb, PtMnSb, or the like so that the other antiferromagnetic layer 17 can be made to function as the specular reflection layer. The other antiferromagnetic layer 17 functioning as the specular reflection layer forms a potential barrier at the interface between the antiferromagnetic layer 17 and the nonmagnetic layer 16 so that the spin-up conduction electrons moving in the free magnetic layer 15 and the nonmagnetic layer 16 can be reflected while maintaining the spin state to further extend the mean free path of the spin-up conduction electrons. In other words, the so-called specular effect can be exhibited to further increase the difference between the mean free paths of the spin-up conduction electrons and the spin-down conduction electrons.

Namely, the mean free path of all conduction electrons can be greatly changed by the action of the external magnetic field to significantly increase the rate of change ($\Delta R/R$) in magnetoresistance of the spin valve thin film magnetic element.

When the free magnetic layer 15 is relatively thin, the difference between the mean free paths of the spin-up and spin-down conduction electrons is more effectively increased by the spin filter effect and the specular reflection effect.

With the free magnetic layer 15 having a thickness of less than 15 Å, the free magnetic layer 15 cannot easily be formed to function as a ferromagnetic material layer, thereby failing to obtain the sufficient magnetoresistive effect.

With the free magnetic layer 15 having a thickness of over 45 Å, the number of the spin-up conduction electrons scattered before reaching the other antiferromagnetic layer 17 (the specular reflection layer) is increased to undesirably decrease the rate of change in the rate of resistance change with the specular effect.

In FIG. 7, the first pinned magnetic layer 13a and the second pinned magnetic layer 13c having different magnetic moments per unit area are laminated with the nonmagnetic intermediate layer 13b provided therebetween to form the single pinned magnetic layer 13.

The first pined magnetic layer 13a is formed in contact with the antiferromagnetic layer 12, and annealing in a magnetic field produces an exchange anisotropic magnetic field by exchange coupling at the interface between the first pinned magnetic layer 13a and the antiferromagnetic layer 12 to pin the magnetization direction of the first pinned magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

In FIG. 7, the first and second pinned magnetic layers 13a and 13c are formed by using the same material to have different thicknesses so that both layers have different magnetic moments per unit area.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layers 41 in the track width direction to increase the longitudinal bias magnetic field of the longitudinal bias layers 41.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

The method of manufacturing the thin film magnetic element of this embodiment will be described below.

First, the second antiferromagnetic layer 12, the pinned magnetic layer 13, the nonmagnetic material layer 14, the free magnetic layer 15, the nonmagnetic layer 16 and the other antiferromagnetic layer 17 are laminated in order on the substrate 11 to form the multilayer film A.

The second antiferromagnetic layer 12, the pinned magnetic layer 13, the nonmagnetic material layer 14, the free magnetic layer 15, the nonmagnetic layer 16 and the other antiferromagnetic layer 17 are formed by the thin film forming process such as sputtering, evaporation, or the like.

Next, a lift off resist layer is formed on the multilayer film A to completely cover the region of the track width Tw in the multilayer film A.

Next, first magnetic field annealing of the multilayer film A is preformed at a first heat treatment temperature in a magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the region of the other antiferromagnetic layer 17, which is not masked with the resist layer, is oxidized by a thickness of 10 to 20 Å from the surface thereof. Therefore, the surface of the other antiferromagnetic layer 17 is cut by 20 Å by ion milling perpendicularly to the surface of the other antiferromagnetic layer 17 to remove the oxidized portion. In this embodiment, the other antiferromagnetic layer 17 is deposited on the uppermost layer of the multilayer film A, and thus oxidation of the nonmagnetic layer 16 and the free magnetic layer 15 can be prevented.

Furthermore, the longitudinal bias layers 41 as the first antiferromagnetic layers, and the electrode layers 42 are deposited on the multilayer film A. In this embodiment, the longitudinal bias layers 41 and the electrode layers 42 are preferably deposited by a sputtering process such as an ion beam sputtering process, a long slow sputtering process, or a collimation sputtering process.

Sputtered particles are less deposited on the regions which are covered with both ends of the lift off resist layer. Therefore, the longitudinal bias layers 41 and the electrode layers 42 are deposited to a small thickness on the regions covered with both ends of the lift off resist layer, and thus the thickness dimensions of the longitudinal bias layers 41 and the electrode layers 42 decrease in the portions Sb on both sides of the track.

The multilayer film B1 formed up to the electrode layers 42 is subjected to second magnetic field annealing at a second heat treatment temperature in a magnetic field of second magnitude in the X direction to produce an exchange anisotropic magnetic field in the longitudinal bias layers 41, pinning the magnetization direction of the free magnetic layer 15 in the X direction. In this embodiment, the second heat treatment temperature is 250° C., and the second magnitude of the magnetic field is 24 k (A/m).

In the present invention, the nonmagnetic layer 16 is deposited in contact with the upper surface of the free magnetic layer 15. In this case, the magnetization direction of the free magnetic layer 15 is oriented in the X direction by RKKY coupling with the longitudinal bias layers 41 through the nonmagnetic layer 16.

After the second annealing, the resist layer is removed to obtain the thin film magnetic element shown in FIG. 7.

The exchange anisotropic magnetic field of the longitudinal bias layers 41 is not produced until the step of second magnetic field annealing. Therefore, in order to orient the exchange anisotropic magnetic field of the longitudinal bias layers 41 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer is lost, and the second magnitude of the magnetic field is set to be lower than that of the exchange anisotropic magnetic field of the second antiferromagnetic layer. Also, even when the second antiferromagnetic layer 12 and the longitudinal bias layers 41 are formed by using antiferromagnetic materials having the same composition, the second magnetic field annealing under these conditions can orient the magnetization direction of the longitudinal bias layers 41 in the X direction with the magnetization direction of the exchange anisotropic magnetic field of the second antiferromagnetic layer 12 being oriented in the Y direction.

Namely, in the present invention, the magnetization direction of the free magnetic layer 15 can easily be pinned perpendicularly to the magnetization direction of the pinned magnetic layer 13.

Like in this embodiment, when the thickness t7 of the other antiferromagnetic layer 17 is more than 0 and 30 Å or less, in the region in which the longitudinal bias layers 41 are not formed, the disordered structure is not transformed to the ordered structure by second magnetic field annealing, thereby causing no exchange coupling magnetic field.

Namely, only in both end portions D in the track width direction, which are overlapped with the longitudinal bias layers 41, the magnetization direction of the free magnetic layer 15 is pinned by RKKY coupling with the longitudinal bias layers 41.

In the portion E of the free magnetic layer 15, which is not overlapped with the longitudinal bias layers 41, with no external magnetic field applied, the magnetization direction is oriented in the X direction, following both end portions D in which the magnetization direction is pinned by RKKY coupling with the longitudinal bias layers 41. While with the external magnetic field applied, the magnetization direction is changed. Therefore, the distance between the longitudinal bias layers 41 in the track width direction corresponds to the track width Tw of the thin film magnetic element.

Figure 8:
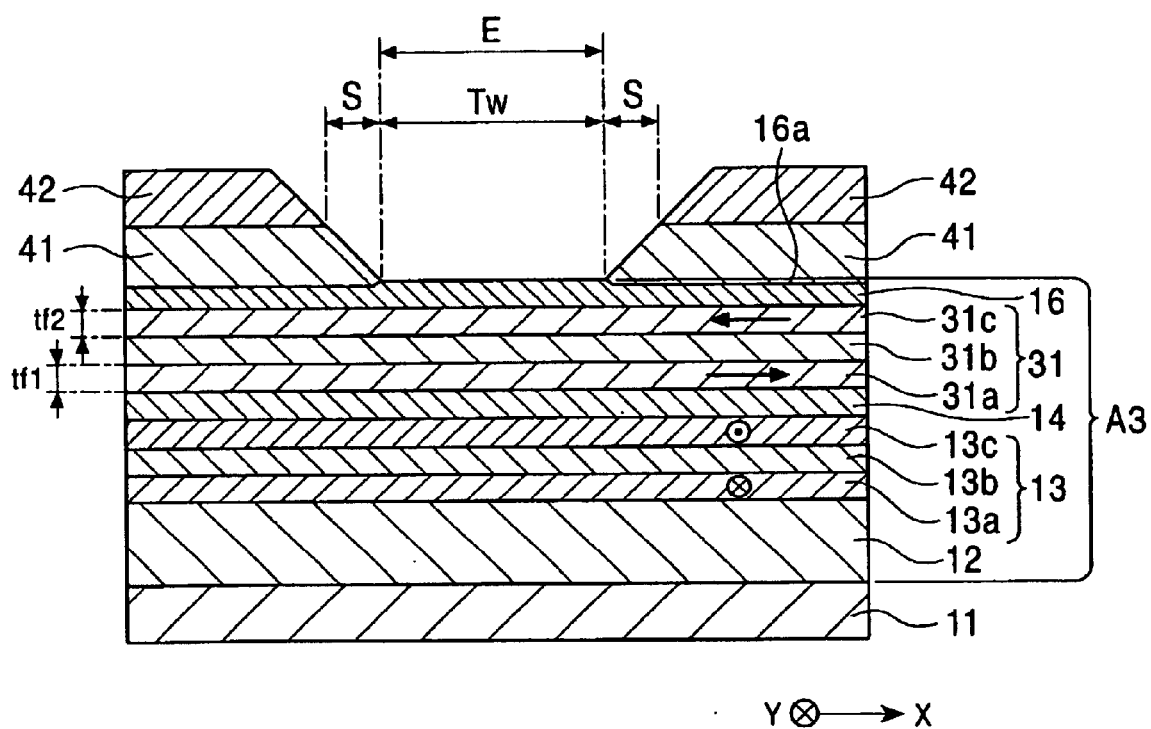
FIG. 8 is a sectional view of a thin film magnetic element according to an eighth embodiment of the present invention.

FIG. 8 is a sectional view of a thin film magnetic element according to an eighth embodiment of the present invention, as viewed from the ABS side.

The thin film magnetic element of this embodiment is substantially the same as the seventh embodiment shown in FIG. 7 except that a free magnetic layer 31 is formed as a so-called synthetic ferrimagnetic free magnetic layer comprising first and second free magnetic layers 31a and 31c which have magnetic movements of different magnitudes per unit area and which are laminated with a nonmagnetic intermediate layer 31b provided therebetween, and that another antiferromagnetic layer is not deposited in a multilayer film A3.

In this embodiment, the nonmagnetic layer 16 is the uppermost layer of the multilayer film A3, and thus the surface of the nonmagnetic layer 16 is oxidized in first magnetic field annealing of the multilayer film A3. Therefore, the surface of the nonmagnetic layer 16 is cut off by 20 Å by ion milling to remove the oxidized portion before the longitudinal bias layers 41 are deposited.

Each of the first and second free magnetic layers 31a and 31c is made of a ferromagnetic material, for example, a NiFe alloy, Co, a CoNiFe alloy, a CoFe alloy, a CoNi alloy, or the like. Particularly, the NiFe alloy is preferably used.

The nonmagnetic intermediate layer 31b is made of a nonmagnetic material, for example, an alloy of at least one element of Ru, Rh, Ir, Cr, Re, and Cu. Particularly, Ru is preferably used.

In this embodiment, an anti-diffusion layer made of Co or the like may be formed between the first free magnetic layer 31a and the nonmagnetic material layer 14. The anti-diffusion layer prevents mutual diffusion between the first free magnetic layer 31a and the nonmagnetic material layer 14.

The first and second free magnetic layers 31a and 31c are formed to have different magnetic moments per unit area. The magnetic moment per unit area is represented by the product of the saturation magnetization (Ms) and the thickness (t). Therefore, for example, when the first and second free magnetic layers 31a and 31c are formed by using the same material to have different thicknesses, the first and second free magnetic layers 31a and 31c have different magnetic moments per unit area.

When the anti-diffusion layer of Co or the like is formed between the first free magnetic layer 31a and the nonmagnetic material layer 14, the total magnetic moment per unit area of the first free magnetic layer 31a and the anti-diffusion layer is preferably different from the magnetic moment per unit area of the second free magnetic layer 31c.

The thickness tf2 of the second free magnetic layer 31c is preferably in the range of 0.5 to 2.5 nm. Also, the thickness tf1 of the first free magnetic layer 31a is preferably in the range of 2.5 to 4.5 nm, more preferably in the range of 3.0 to 4.0 nm, and most preferably in the range of 3.5 to 4.0 nm. With the thickness tf1 of the first free magnetic layer 31a out of the above range, the rate of magnetoresistance change of the spin valve thin film magnetic element cannot be increased.

In FIG. 8, the first free magnetic layer 31a and the second free magnetic layer 31c having different magnetic moments per unit area are laminated with the nonmagnetic intermediate layer 31b provided therebetween to form the single free magnetic layer 31.

The first and second free magnetic layers 31a and 31c are in the ferrimagnetic state in which the magnetization directions thereof are 180° different in an antiparallel state. In this case, the magnetization direction the free magnetic layer having a higher magnetic moment per unit area, for example, the first free magnetic layer 31a, is oriented in the direction of the magnetic field produced from the longitudinal bias layers 41, the magnetization direction of the second free magnetic layer 31c being oriented in the 180° opposite direction. When the first and second free magnetic layers 31a and 31c are in the ferrimagnetic state in which the magnetization directions thereof are 180° different in an antiparallel state, an effect equivalent to the effect of decreasing the thickness of the free magnetic layer 31 can be obtained to decrease saturation magnetization. Therefore, magnetization of the free magnetic layer 31 easily varies to improve the magnetic field sensitivity of a magnetoresistive element.

The direction of the synthetic magnetic moment per unit area corresponding to the total of the magnetic moments per unit area of the first and second free magnetic layers 31a and 31c coincides with the magnetization direction of the free magnetic layer 31.

However, only the magnetization direction of the first free magnetic layer 31a contributes to output based on the relation to the magnetization direction of the pinned magnetic layer 13.

When the first and second free magnetic layers 31a and 31c have different magnetic thicknesses, the spin flop magnetic field of the free magnetic layer 31 can be increased.

In this embodiment, like in the seventh embodiment, the track width Tw of the thin film magnetic element can be precisely defined. Also, even when the second antiferromagnetic layer 12 and the longitudinal bias layers 41 are formed by using antiferromagnetic materials having the same composition, the exchange anisotropic magnetic field of the longitudinal bias layers 41 can be oriented in the X direction with the exchange anisotropic magnetic field of the second antiferromagnetic layer 12 being oriented in the Y direction.

The thin film magnetic element shown in FIG. 8 can exhibit effects equivalent to the other effects of the thin film magnetic element of the seventh embodiment shown in FIG. 7.

The free magnetic layer 15 of the thin film magnetic element of the seventh embodiment may be formed as a synthetic ferrimagnetic free magnetic layer.

Figure 9:
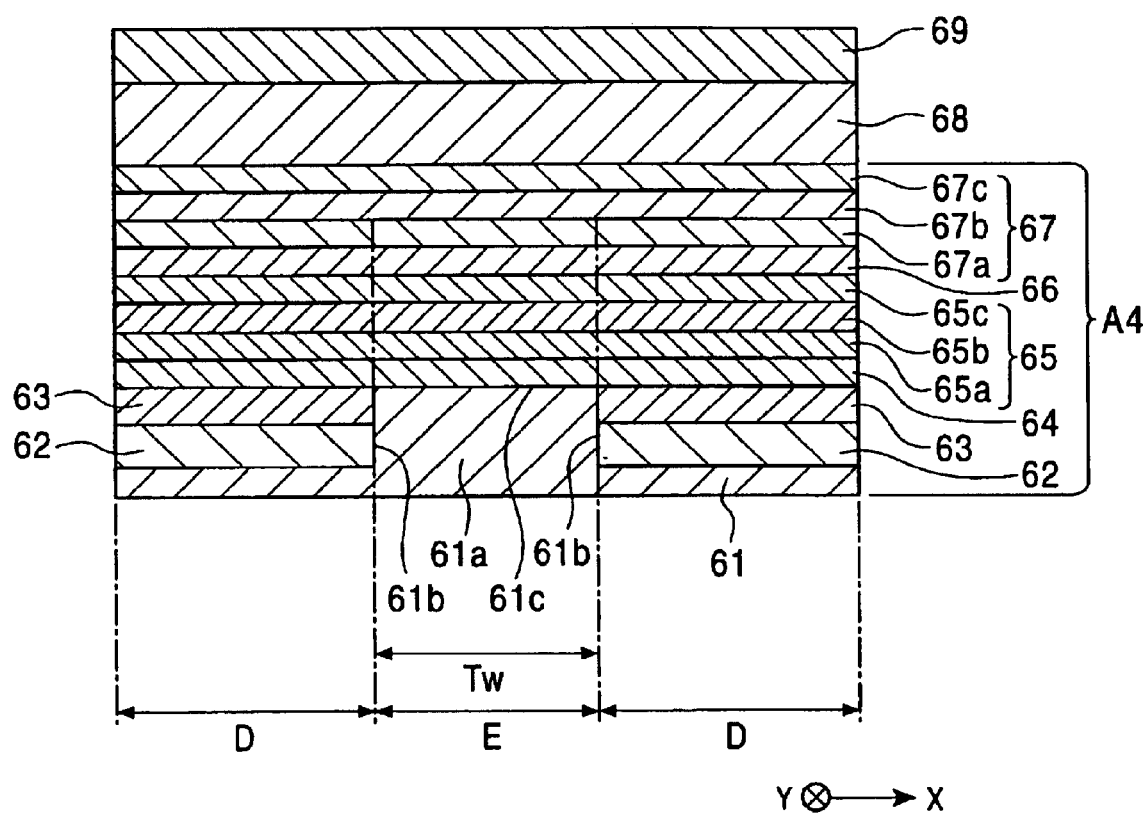
FIG. 9 is a sectional view of a thin film magnetic element according to a ninth embodiment of the present invention.

FIG. 9 is a sectional view of a thin film magnetic element according to a ninth embodiment of the present invention, as viewed from the ABS side.

In the thin film magnetic element shown in FIG. 9, electrode layers 62 and longitudinal bias layers 63 as first antiferromagnetic layers are formed on a substrate 61 to be arranged on both sides of a protrusion 61a formed on the substrate 61. Furthermore, a nonmagnetic layer 64, a free magnetic layer 65 comprising a first free magnetic layer 65a, a nonmagnetic intermediate layer 65b and a second free magnetic layer 65c, a nonmagnetic material layer 66, a synthetic ferrimagnetic pinned magnetic layer 67 comprising a first pinned magnetic layer 67a, a nonmagnetic intermediate layer 67b and a second pinned magnetic layer 67c, a second antiferromagnetic layer 68 and a protecting layer 69 are deposited. The thin film magnetic element shown in FIG. 9 is a so-called top-spin type spin-valve thin film magnetic element.

The electrode layers 62, the longitudinal bias layers 63 as the first antiferromagnetic layers, the nonmagnetic layer 64, the free magnetic layer 65 comprising the first free magnetic layer 65a, the nonmagnetic intermediate layer 65b and the second free magnetic layer 65c, the nonmagnetic material layer 66, the synthetic ferrimagnetic pinned magnetic layer 67 comprising the first pinned magnetic layer 67a, the nonmagnetic intermediate layer 67b and the second pinned magnetic layer 67c, and the second antiferromagnetic layer 68 are formed by the thin film forming process such as the sputtering process, the evaporation process, or the like. The material of each of these layers is the same as the material used for forming the thin film magnetic element shown in FIG. 1.

The thin film magnetic element shown in FIG. 9 can be formed by, for example, the following method.

First, the substrate 61 is cut by ion milling or reactive ion etching (RIE) to form the protrusion 61a, and the electrode layers 62 and the longitudinal bias layers 63 are deposited on both sides of the protrusion 61a. The side surfaces 61b of the protrusion 61a are perpendicular to the surface of the substrate 61.

Furthermore, the nonmagnetic layer 64, the free magnetic layer 65 comprising the first free magnetic layer 65a, the nonmagnetic intermediate layer 65b and the second free magnetic layer 65c, the nonmagnetic material layer 66, and the synthetic ferrimagnetic pinned magnetic layer 67 comprising the first pinned magnetic layer 67a, the nonmagnetic intermediate layer 67b and the second pinned magnetic layer 67c are laminated to form a multilayer film A4.

Next, first magnetic field annealing of the multilayer film A4 is performed at a first heat treatment temperature in a magnetic field of first magnitude to produce an exchange anisotropic magnetic field in the longitudinal bias layers 63, pinning the magnetization direction of the free magnetic layer 65 in the X direction shown in FIG. 9. In this case, the magnetization direction of the free magnetic layer 65 is oriented in the X direction by RKKY interaction with the longitudinal bias layers 63 through the nonmagnetic layer 64.

Furthermore, the second antiferromagnetic layer 68 and the protecting layer 69 made of Ta are deposited, and second magnetic field annealing is performed at a second heat treatment temperature in a magnetic field of second magnitude in the Y direction to produce an exchange anisotropic magnetic field in the second antiferromagnetic layer 68, pinning the magnetization direction of the pinned magnetic layer 67 in the Y direction shown in FIG. 9.

The exchange anisotropic magnetic field of the pinned magnetic layer 67 is not produced until the step of second magnetic field annealing. Therefore, in order to orient the exchange anisotropic magnetic field of the second antiferromagnetic layer 68 in the Y direction with the exchange anisotropic magnetic field of longitudinal bias layers 63 being oriented in the X direction, the second heat treatment temperature is set to a temperature lower than the blocking temperature at which the exchange coupling magnetic field of the longitudinal bias layers 63 is lost, and the second magnitude of the magnetic field is set to be lower than that of the exchange anisotropic magnetic field of the longitudinal bias layers 63. Also, even when the longitudinal bias layers 63 and the second antiferromagnetic layer 68 are formed by using antiferromagnetic materials having the same composition, the second magnetic field annealing under these conditions can orient the exchange anisotropic magnetic field of the second antiferromagnetic layer 68 in the Y direction with the magnetization direction of the exchange anisotropic magnetic field of the longitudinal bias layers 63 being oriented in the X direction.

Namely, in the present invention, the magnetization direction of the free magnetic layer 65 can easily be pinned perpendicularly to the magnetization direction of the pinned magnetic layer 67.

In this embodiment, the magnetization direction of the free magnetic layer 65 is pinned by RKKY coupling with the longitudinal bias layers 63 only in both end portions D in the track width direction.

In the region E of the free magnetic layer 65 overlapped with the top 61c of the protrusion 61a, with no external magnetic field applied, the magnetization direction is oriented in the X direction, following both end portions D in which the magnetization direction is pinned by RKKY coupling with the longitudinal bias layers 63, while with the external magnetic field, the magnetization direction is changed.

Therefore, the track width of the thin film magnetic element is determined by the width dimension Tw of the protrusion. As described above, in the present invention, the protrusion 61a can be formed only by cutting the substrate 61 having a uniform thickness by reactive ion etching (RIE) or ion milling perpendicularly to the surface of the substrate 61. Therefore, the protrusion 61a having a precise width dimension Tw can be formed, i.e., the track width of the thin film magnetic element can be precisely defined.

Figure 10:
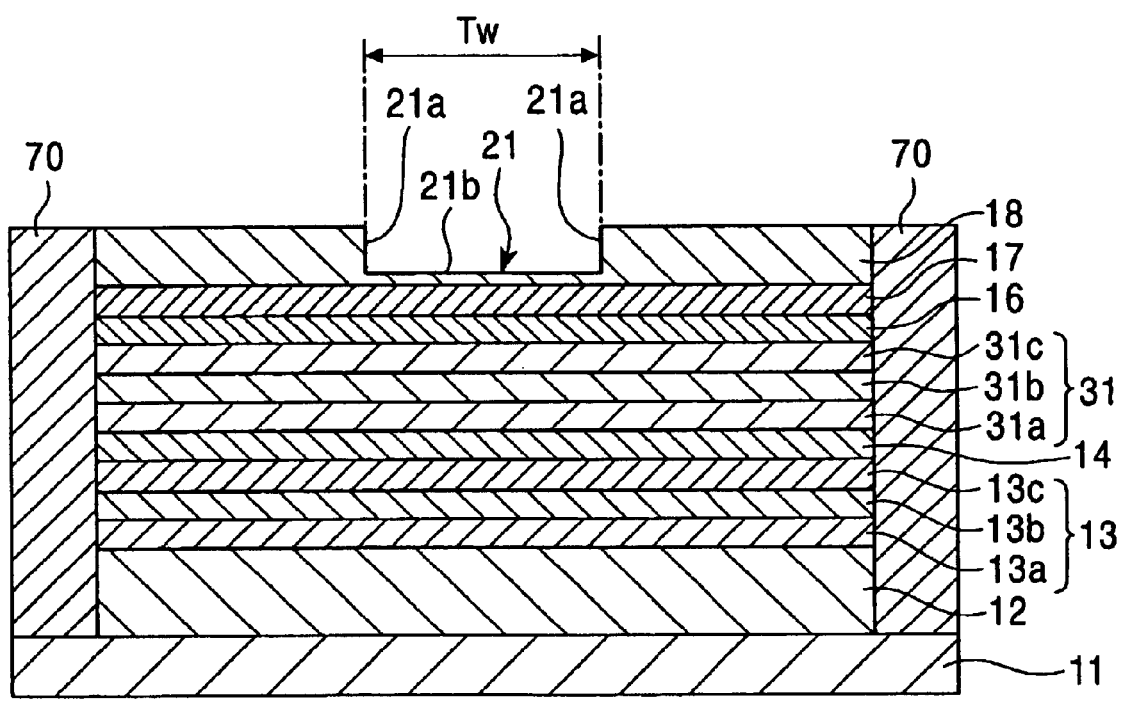
FIG. 10 is a sectional view of a thin film magnetic element according to a tenth embodiment of the present invention.

FIG. 10 is a sectional view of a thin film magnetic element according to a tenth embodiment of the present invention, as viewed from the ABS side.

The thin film magnetic element shown in FIG. 10 is substantially the same as the thin film magnetic element shown in FIG. 4 except that electrode layers 70 are connected to both sides of a laminate formed by laminating from the second antiferromagnetic layer 12 to the longitudinal bias layer 18.

The thin film magnetic element of this embodiment can improve the ratio of the sensing current supplied to the vicinities of the nonmagnetic material layer 14 and the free magnetic layer 31 from the electrode layers 70 without passing through the longitudinal bias layer 18 having a higher resistance value than the nonmagnetic material layer 14 and the free magnetic layer 31. Also, the connection resistance between the laminate and the electrode layers 70, which contributes to the rate of magnetoresistance change, can be decreased to increase the rate of magnetoresistance change ($\Delta R/R$) of the spin-valve thin film magnetic element.

Furthermore, the sensing current can be supplied directly to the vicinities of the free magnetic layer 31 from the electrode layers 70 with the free magnetic layer 31 being put into the single magnetic domain state, thereby preventing side reading and complying with a further increase in the recording density.

A pair of the electrode layers 70 may be arranged on both sides of at least the free magnetic layer 31, the nonmagnetic material layer 14 and the pinned magnetic layer 13 in the planar direction.

Even in the thin film magnetic elements shown in FIGS. 6, 8, 9 and 10, at least one of the first and second free magnetic layers 31a and 31c, or at least one of the first and second free magnetic layers 65a and 65c is preferably made of a magnetic material having the following composition.

The composition is represented by the formula CoFeNi wherein the composition ratio of Fe is 9 atomic % to 17 atomic %, the composition ratio of Ni is 0.5 atomic % to 10 atomic %, and the balance is the composition ratio of Co.

As a result, the exchange coupling magnetic field produced between the first and second free magnetic layers 31a and 31c or between the first and second free magnetic layers 65a and 65c by RKKY interaction can be strengthened. Specifically, the magnetic field with which the antiparallel state is broken, i.e., the spin flop magnetic field (Hsf), can be increased to about 293 (kA/m).

In the above-described composition range, the magnetostriction of the first and second free magnetic layers 31a and 31c or the first and second free magnetic layers 65a and 65c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 31 or 65, and appropriately suppress decreases in the amount of resistance change (ΔR) and the rate of resistance change (ΔR/R) due to Ni diffusion between the free magnetic layer 31 or 65 and the nonmagnetic material layer 14 or 66.

Also, an intermediate layer 91 made of a CoFe alloy or Co may be provided between the first free magnetic layer 31a and the nonmagnetic material layer 14 or between the second free magnetic layer 65c and the nonmagnetic material layer 66.

When the intermediate layer 91 is provided, the CoFeNi alloy preferably has a Fe composition ratio of 7 atomic % to 15 atomic %, a Ni composition ratio of 5 atomic % to 15 atomic %, and a Co composition ratio as the balance.

Figure 11:
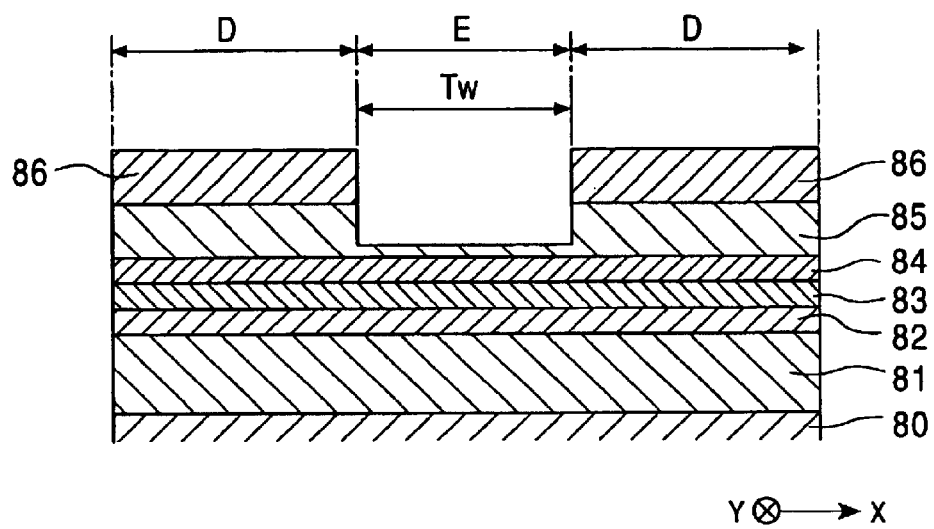
FIG. 11 is a sectional view of a thin film magnetic element according to an eleventh embodiment of the present invention.

The thin film magnetic element shown in FIG. 11 is referred to as an "AMR (anisotropic magnetoresistive) element" in which a soft magnetic layer (SAL layer) 81, a nonmagnetic material layer (SHUNT layer) 82, a magnetoresistive layer (MR layer) 83, a nonmagnetic layer 84, a longitudinal bias layer 85, and an electrode 86 are laminated in turn on a substrate 80. Generally, the soft magnetic layer 81 comprises a NiFeNb alloy film, the nonmagnetic material layer 82 comprises a Ta film, and the magnetoresistive layer 83 comprises a NiFe alloy film.

The longitudinal bias layer 85 as the first antiferromagnetic layer is made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

The nonmagnetic layer 84 is made of Ru and has a thickness of 8 to 11 Å. Also, the nonmagnetic layer 84 may be formed by using at least one element of Ru, Cu, Ag, and Au.

In this embodiment, the magnetization direction of the magnetoresistive layer 83 is oriented in the X direction by RKKY coupling with the longitudinal bias layer 85 through the nonmagnetic layer 84.

Figure 12:
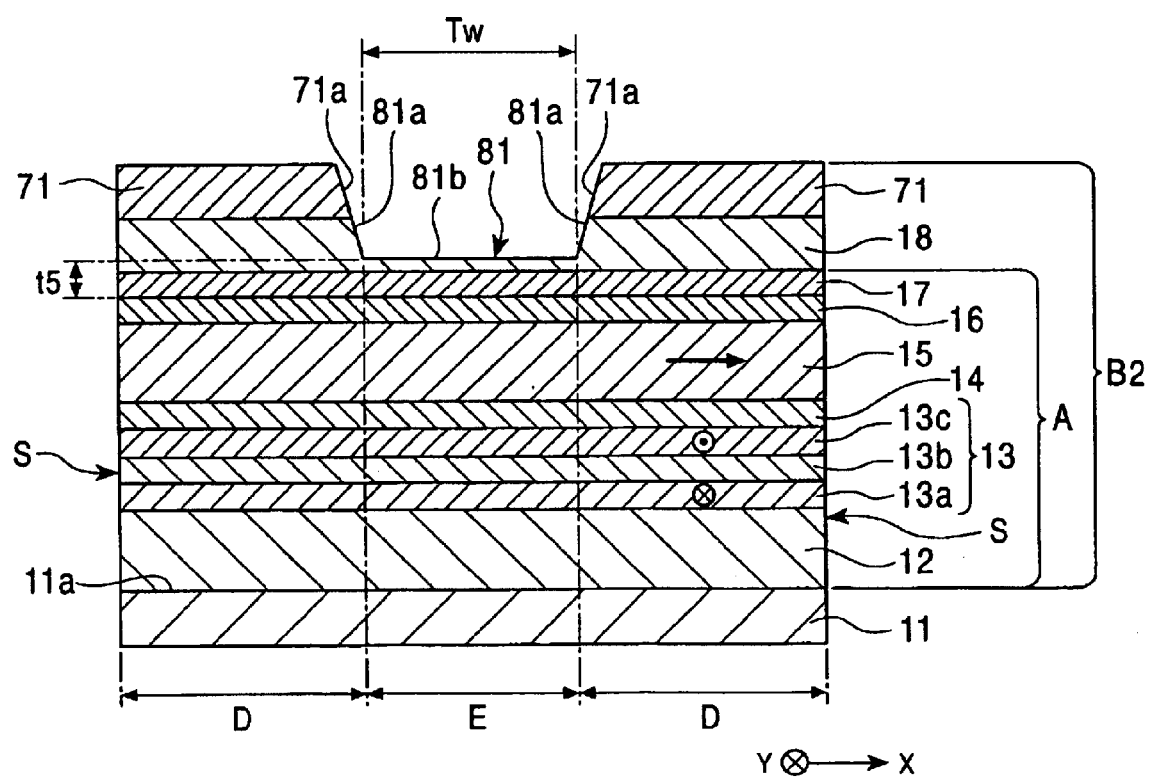
FIG. 12 is a sectional view of a thin film magnetic element according to a twelfth embodiment of the present invention.

FIG. 12 is a sectional view of a thin film magnetic element according to a twelfth embodiment of the present invention, as viewed from the ABS side.

The thin film magnetic element of this embodiment is substantially the same as the first embodiment shown in FIG. 1 except that the side surfaces 81a of a recess 81 are inclined from the direction perpendicular to the surface 11a of the substrate 11.

In this embodiment, the total thickness t5 of the region of the longitudinal bias layer 18, which is overlapped with the bottom 81b of the recess 81, and the other antiferromagnetic layer 17 is more than 0 and 30 Å or less so that transformation from the ordered structure to the ordered structure does not occur in the regions of the longitudinal base layer 18 and the other antiferromagnetic layer 17, which are overlapped with the bottom 81b of the recess 81, by magnetic field annealing, thereby causing no exchange coupling magnetic field.

Therefore, only in both end portions D in the track width direction, except in the portion overlapped with the bottom 81b of the recess 81, the magnetization direction of the free magnetic layer 15 is pinned by RKKY coupling with the longitudinal bias layer 18.

In the portion E of the free magnetic layer 15, which is overlapped with the bottom 81b of the recess 81, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed. Therefore, the track width of the thin film magnetic element is determined by the width dimension Tw of the bottom 81b of the recess 81.

In the thin film magnetic element of this embodiment, like in the thin film magnetic element shown in FIG. 1, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 12 can be manufactured by, for example, the following manufacturing method.

First, the second antiferromagnetic layer 12, the pinned magnetic layer 13, the nonmagnetic material layer 14, the free magnetic layer 15, the nonmagnetic layer 16 and the other antiferromagnetic layer 17 are laminated on the substrate 11 to form a multilayer film A.

The second antiferromagnetic layer 12, the pinned magnetic layer 13, the nonmagnetic material layer 14, the free magnetic layer 15, the nonmagnetic layer 16 and the other antiferromagnetic layer 17 are formed by the thin film forming process such as the sputtering process, the evaporation process, or the like.

Next, first magnetic field annealing of the multilayer film A is performed at a first heat treatment temperature in a magnetic field of first magnitude to produce an exchange anisotropic magnetic field in the second antiferromagnetic layer 12, pinning the magnetization direction of the pinned magnetic layer 13 in the Y direction shown in FIG. 12. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the other antiferromagnetic layer 17 is oxidized by a thickness of 10 to 20 Å from the surface thereof. Therefore, in the multilayer film A, the surface of the other antiferromagnetic layer 17 is cut by 20 Å by ion milling to remove the oxidized portion. In this embodiment, the other antiferromagnetic layer 17 is deposited on the uppermost layer of the multilayer film A, and thus oxidation of the nonmagnetic layer 16 and the free magnetic layer 15 can be prevented. Next, the longitudinal bias layer 18 is deposited as the second antiferromagnetic layer on the multilayer film A.

Next, a lift off resist is deposited on the surface of the longitudinal bias layer 18 to cover a region slightly wider than the track width, and then a pair of electrode layers 71 is deposited on the surface of the longitudinal bias layer 18 so as to be arranged on both sides of the lift off resist with a space therebetween in the track width direction. Then, the lift off resist is removed. Furthermore, the region of the longitudinal bias layer 18, which is held between the pair of the electrode layers 71 is cut off by reactive ion etching (RIE) or ion milling by using the pair of the electrode layers 71 as a mask to form the recess 81 in the longitudinal bias layer 18.

The electrode layers 71 formed by using the lift off resist have inclined surfaces 71a. Therefore, when the region of the longitudinal bias layer 18, which is held between the pair of the electrode layers 71 is cut off by reactive ion etching (RIE) or ion milling using the pair of the electrode layers 71 as a mask, the side surfaces 81a of the recess 81 formed in the longitudinal bias layer 18 are slightly inclined from the direction perpendicular to the surface 11a of the substrate 11.

In the thin film magnetic element shown in FIG. 12, the recess 81 is formed so that the bottom 81b of the recess 81 is located in the longitudinal bias layer 18.

In this case, the total of the thickness of the region of the longitudinal bias layer 18, which is overlapped with the bottom 81b of the recess 81, and the thickness of the other antiferromagnetic layer 17 is more than 0 and 30 Å or less.

After the recess 81 is formed, the multilayer film B2 formed up to the electrode layer 71 is subjected to second magnetic field annealing at a second heat treatment temperature in a magnetic field of second magnitude in the X direction to produce an exchange anisotropic magnetic field in the longitudinal bias layer 18, pinning the magnetization direction of the free magnetic layer 15 in the X direction. As a result the thin film magnetic element shown in FIG. 12 is obtained. In this embodiment, the second heat treatment temperature is 250° C., and the second magnitude of the magnetic field is 24 k (A/m).

The exchange anisotropic magnetic field of the longitudinal bias layer 18 is not produced until the step of second magnetic field annealing. Therefore, in order to orient the exchange anisotropic magnetic field of the longitudinal bias layer 18 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer 12 is lost, and the magnetic field of the second magnitude is set to be lower than that of the exchange anisotropic magnetic field of the antiferromagnetic layer 12. Also, even when the second antiferromagnetic layer 12 and the longitudinal bias layer 18 are formed by using antiferromagnetic materials having the same composition, the second magnetic field annealing under these conditions can orient the exchange anisotropic magnetic field of the longitudinal bias layer 18 in the X direction with the direction of the exchange anisotropic magnetic field of the second antiferromagnetic layer 12 being oriented in the Y direction.

Namely, in the present invention, the magnetization direction of the free magnetic layer 15 can easily be pinned in the direction perpendicular to the magnetization direction of the pinned magnetic layer 13.

In this embodiment, the track width Tw is defined by the width dimension of the bottom 81b of the recess 81. The width dimension of the bottom 81b of the recess 81 can be defined by controlling the dimension of the resist and the depth dimension of the recess 81.

The recess 81 may be formed so that the bottom 81b of the recess 81 is located either in the other antiferromagnetic layer 17 or in the nonmagnetic layer 16. Alternatively, the multilayer film A2 shown in FIG. 4 or the multilayer film A3 shown in FIG. 6 may be formed in place of the multilayer film A. After first magnetic field annealing, the longitudinal bias layer 18 and the resist layer may be deposited, and then the electrode layers 71 and the recess 81 may be formed, followed by second magnetic field annealing. In this case, the bottom 81b of the recess 81 may be located in any one of the longitudinal bias layer 18, the other antiferromagnetic layer 17, and the nonmagnetic layer 16.

In the thin film magnetic elements of the second to tenth embodiments, and the thin film magnetic element of the twelfth embodiment, the pinned magnetic layer 13 may be formed as a single ferromagnetic material layer.

In the thin film magnetic elements shown in FIGS. 1 to 3, and FIGS. 7 to 12, the free magnetic layer 15 may be formed as a synthetic ferrimagnetic free magnetic layer in which at least one of the first and second free magnetic layers may be made of a magnetic material represented by the composition formula CoFeNi wherein the Fe composition ratio is 9 atomic % to 17 atomic %, the Ni composition ratio is 0.5 atomic % to 10 atomic %, and the balance is the Co composition ratio.

When the intermediate layer made of a CoFe alloy or CO alloy is provided between the first free magnetic layer and the nonmagnetic material layer 14, the CoFeNi alloy preferably has a Fe composition ratio of 7 atomic % to 15 atomic %, a Ni composition ratio of 5 atomic % to 15 atomic %, and a Co composition ratio as the balance.

In manufacturing a thin film magnetic head by using any one of the thin film magnetic element shown in FIGS. 1 to 8 and FIGS. 10 to 12, an underlying layer made of an insulating material such as alumina is formed between the substrate 11 and the second antiferromagnetic layer 12, a lower shield made of a magnetic material is deposited on the underlying layer, and a lower gap layer made of an insulating material is deposited on the lower shield layer. The thin film magnetic element is laminated on the lower gap layer. Furthermore, an upper gap layer made of an insulating material is formed on the thin film magnetic element, and an upper shield layer made of a magnetic alloy is deposited on the upper gap layer. A writing inductive element may be laminated on the upper shield layer.

In manufacturing the magnetic head using the thin film magnetic element shown in FIG. 9, the thin film magnetic element is provided between the upper shield layer and the lower shield layer with the upper gap layer and the lower gap layer respectively provided therebetween. In this case, the same protrusion as the substrate 61 shown in FIG. 9 is formed on the upper surface of the lower gap layer, and the thin film magnetic element shown in FIG. 9 is laminated on the upper layer.

Figure 19:
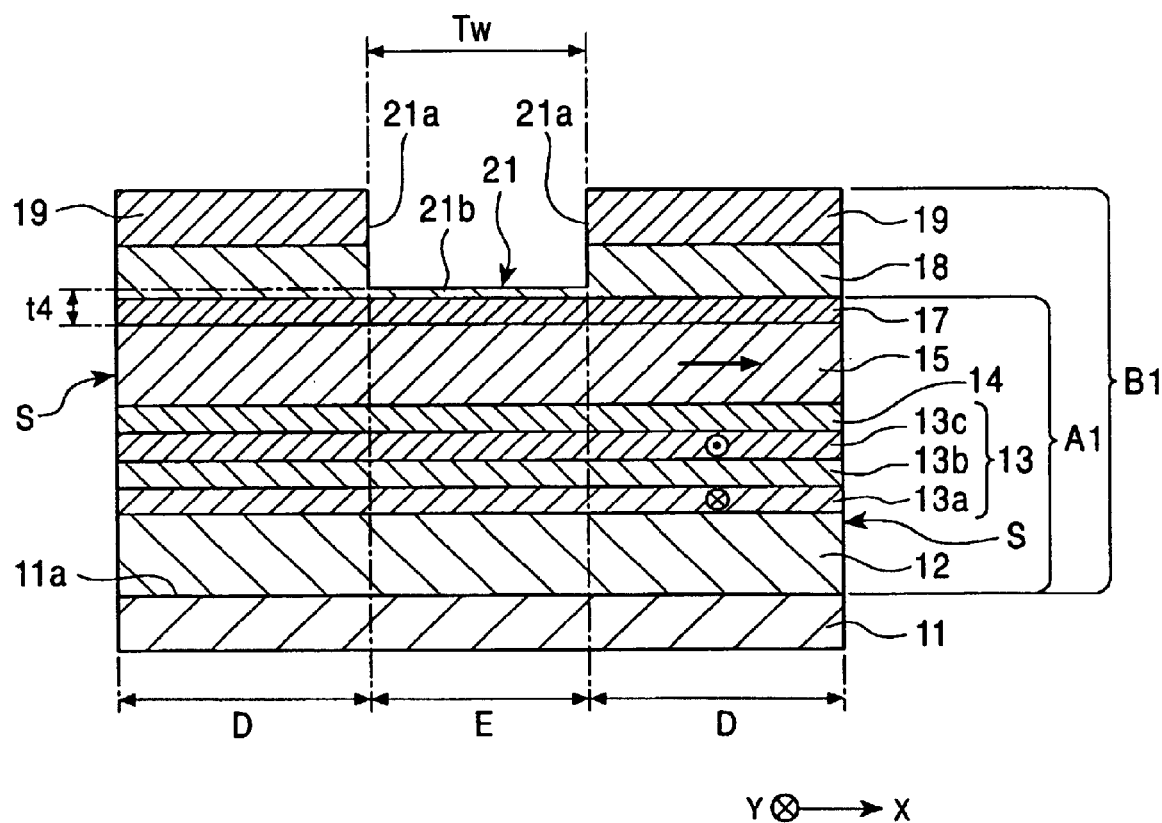
FIG. 19 is a sectional view of a thin film magnetic element according to a thirteenth embodiment of the present invention.

FIG. 19 is a sectional view of a thin film magnetic element according to a thirteenth embodiment of the present invention, as viewed from the ABS side.

In the thin film magnetic element shown in FIG. 19, a second antiferromagnetic layer 12, a synthetic ferrimagnetic pinned magnetic layer 13 comprising a first pinned magnetic layer 13a, a nonmagnetic intermediate layer 13b and a second pinned magnetic layer 13c, a nonmagnetic material layer 14, a free magnetic layer 15 and another antiferromagnetic layer 17 are laminated on a substrate 11 to form a multilayer film A1, and a longitudinal bias layer 18 and an electrode layer 19 are deposited on the multilayer film A1.

The second antiferromagnetic layer 12, the pinned magnetic layer 13, the nonmagnetic material layer 14, the free magnetic layer 15, the other antiferromagnetic layer 17, the longitudinal bias layer 18 and the electrode layer 19 are formed by the thin film forming process such as sputtering, vaporization, or the like. The second antiferromagnetic layer 12, the other antiferromagnetic layer 17 and the longitudinal bias layer 18 are made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr). By using such an alloy for the second antiferromagnetic layer 12, the other antiferromagnetic layer 17 and the longitudinal bias layer 18, the second antiferromagnetic layer 12, the other antiferromagnetic layer 17 and the longitudinal bias layer 18 each of which produces a large exchange coupling magnetic field can be obtained by annealing the alloy. Particularly, by using the PtMn alloy, the excellent second antiferromagnetic layer 12, other antiferromagnetic layer 17 and longitudinal bias layer 18 can be obtained, in which the exchange coupling magnetic field is 48 kA/m or more, for example, over 64 kA/m, and the blocking temperature at which the exchange coupling magnetic field is lost is as high as 380° C.

The above-described alloys have a disordered face centered cubic structure (fcc) in a state immediately after deposition, but the fcc structure is transformed to a CuAuI-type ordered face-centered tetragonal structure (fct) by heat treatment. The thickness of the second antiferromagnetic layer 12 is 80 to 300 Å near the center in the track width direction. The thickness of the other antiferromagnetic layer 17 is about 30 Å.

In order to form the second antiferromagnetic layer 12, the other antiferromagnetic layer 17 and the longitudinal bias layer 18, the content of Pt or X in the PtMn alloy or the alloy represented by the formula X—Mn is preferably in the range of 37 to 63 at %, and more preferably in the range of 47 to 57 at %. The upper and lower limits of the numerical range represent "not more than" and "not less than", respectively, unless otherwise specified.

In the alloy represented by the formula Pt—Mn—X', the total of X'+Pt is preferably in the range of 37 to 63 at %, and more preferably 47 to 57 at %, and X' is preferably in the range of 0.2 to 10 at %. However, when X' is at least one element of Pd, Ir, Rh, Ru, Os, Ni, and Fe, X' is preferably in the range of 0.2 to 40 at %.

In the thin film magnetic element of this embodiment, the second antiferromagnetic layer 12 and the longitudinal bias layer 18 can be formed by using antiferromagnetic materials having the same composition.

The first and second pinned magnetic layers 13a and 13c are made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

The nonmagnetic material layer 14 is a layer for preventing magnetic coupling between the pinned magnetic layer 13 and the free magnetic layer 15, and a sensing current mainly flows through the nonmagnetic material layer 14. The nonmagnetic material layer 14 is preferably made of a nonmagnetic material having conductivity, such as Cu, Cr, Au, Ag or the like, and particularly, Cu is preferably used.

The free magnetic layer 15 is made of a ferromagnetic material, for example, a NiFe alloy, Co, a CoNiFe alloy, a CoFe alloy, a CoNi alloy, or the like. Particularly, the NiFe alloy or Co is preferably used.

The thickness of the longitudinal bias layer 18 is 80 to 300 Å, for example 200 Å, near both ends thereof in the track width direction.

The electrode layer 19 is formed by depositing, for example, Au, W, Cr, Ta, or the like.

The longitudinal bias layer 18 has a recess 21 formed therein. The side surfaces 21a of the recess 21 are perpendicular to the surface 11a of the substrate 11. In FIG. 19, the recess 21 is formed so that the bottom 21b of the recess 21 is located in the longitudinal bias layer 18.

In this case, the total thickness t4 of the region of the longitudinal bias layer 18, which is overlapped with the bottom 21b of the recess 21, and the other antiferromagnetic layer 17 is more than 0 and 30 Å or less.

In this embodiment, even when the second antiferromagnetic layer 12 and the longitudinal bias layer 18 are made of antiferromagnetic materials having the same composition, the exchange anisotropic magnetic field of the longitudinal bias layer 18 can be oriented in the X direction shown in the drawing, while the exchange anisotropic magnetic field of the second antiferromagnetic layer 12 is oriented in the Y direction shown in the drawing.

Namely, in this embodiment, the magnetization direction of the free magnetic layer 15 can be pinned in the direction perpendicular to the magnetization direction of the pinned magnetic layer 13.

Like in this embodiment, when the total thickness t4 of the region of the longitudinal bias layer 18, which is overlapped with the bottom 21b of the recess 21, and the other antiferromagnetic layer 17 is more than 0 and 30 Å or less, the transformation from the disordered structure to the ordered structure does not occur in the regions of the longitudinal bias layer 18 and the other antiferromagnetic layer 17, which are overlapped with the bottom 21b of the recess 21, by second magnetic field annealing, thereby causing no exchange coupling magnetic field.

Namely, the magnetization direction of the free magnetic layer 15 is pinned by exchange coupling with the longitudinal bias layer 18 only in the regions D at both ends in the track width direction, except in the region E overlapped with the bottom 21b of the recess 21.

In the region E of the free magnetic layer 15 overlapped with the bottom 21b of the recess 21, with no external magnetic field applied, the magnetization direction is oriented in the X direction, following both end regions in which the magnetization is pinned by exchange coupling with the longitudinal bias layer 18, while with the external magnetic field, the magnetization direction is changed.

Therefore, the track width of the thin film magnetic element is determined by the width dimension Tw of the recess.

In the present invention, the recess 21 can be formed only by cutting the longitudinal bias layer 18 having a uniform thickness by reactive ion etching (RIE) or ion milling perpendicularly to the surface 11a of the substrate 11. Therefore, the recess 21 having a precise width dimension Tw can be formed, i.e., the track width of the thin film magnetic element can be precisely defined.

Although, in this embodiment, the second antiferromagnetic layer 12 is laminated directly on the substrate 11, the second antiferromagnetic layer 12 may be laminated on the substrate 11 with an underlying layer provide therebetween and comprising an alumina layer, Ta, or the like.

When the longitudinal bias layer 18 is laminated above the multilayer film A, the magnetization direction of the free magnetic layer 15 is oriented by exchange coupling with the longitudinal bias layer 18. The exchange coupling occurs only in the region located directly below the antiferromagnetic layer (longitudinal bias layer 18) having a thickness with antiferromagnetism, but does not occur in the region out of the region directly below the antiferromagnetic layer having a thickness with antiferromagnetism. Namely, the exchange coupling occurs only in the regions D at both ends in the track width direction, which are not overlapped with the bottom 21b of the recess 21, but does no occur in the region E overlapped with the bottom 21b of the recess 21.

Therefore, the region of the track width (optical track width) Tw set as the width dimension of thee recess 21 formed in the longitudinal bias layer 18 is the sensitive zone substantially contributing reproduction of a recording medium and exhibiting the magnetoresistive effect. Namely, in the thin film magnetic element of the present invention, the optical track width of the thin film magnetic element is equal to the magnetic track width, and thus the thin film magnetic element can easily comply with the higher recording density of a recording medium, as compared with a hard bias system which causes difficulties in controlling the magnetic track width because of the presence of dead zones.

Also, no dead zone occurs in the region of the track width (optical track width) Tw set at the time of formation of the thin film magnetic element, and when the optical track width Tw of the thin film magnetic element is decreased for complying with a higher recording density, a decrease in the reproduced output can thus be suppressed.

Furthermore, in this embodiment, the side end surfaces S of the thin film magnetic element can be formed perpendicularly to the surface 11a of the substrate 11, thereby suppressing a variation in the length of the free magnetic layer 15 in the width direction.

In this embodiment, the other antiferromagnetic layer 17 may be formed as a specular reflection layer. In order to form the other antiferromagnetic layer 17 as the specular reflection layer, the other antiferromagnetic layer 17 may comprise a single layer film or multilayer film of a semi-metal Heusler alloy, for example, NiMnSb, PtMnSb, or the like.

By using such a material, a sufficient potential barrier can be formed between the other antiferromagnetic layer 17 and the adjacent layer to obtain the sufficient specular effect.

The specular reflection effect will be described. FIGS. 16 and 17 are schematic drawings illustrating the specular reflection effect of a specular reflection layer S1 in a spin valve thin film magnetic element. As described above in the description of the spin filter effect, only the behavior of the spin-up electrons which is defined by the pinned magnetization direction of the pinned magnetic layer 113 may be considered for the GMR effect.

In the state in which the magnetization directions of the pinned magnetic layer and the free magnetic layer are parallel to each other, the spin-up electrons pass through the nonmagnetic material layer 114 to reach the free magnetic layer 115, as shown in FIGS. 16 and 17. Then, the spin-up electrons move through the free magnetic layer 115 to reach the vicinity of the interface between the free magnetic layer 115 and the specular reflection layer S1.

As shown in FIG. 16, when the specular reflection layer is not provided, the spin-up electrons move through the free magnetic layer 115, and are scattered by the upper surface of the free magnetic layer 115. Therefore, the mean free path is shown by $\lambda^+$ in the drawing.

On the other hand, as shown in FIG. 17, when the specular reflection layer S1 is provided, the potential barrier is formed near the interface between the free magnetic layer 115 and the specular reflection layer S1, and thus the spin-up electrons are specularly reflected (specular scattering) near the interface between the free magnetic layer 115 and the specular reflection layer S1.

In general, the spin state (energy, quantum state, etc.) of conduction electrons is changed by scattering. However, in specular scattering, the spin-up electrons are likely to be reflected while maintaining the spin state, and again move through the free magnetic layer 115. Namely, the spin state of the spin-up conduction electrons is maintained in specular reflection, and thus the spin-up electrons move through the free magnetic layer as if they were not scattered.

This means that the mean free path is lengthened by specular reflection of the spin-up electrons by a reflection mean free path $\lambda^+$s.

In the state in which the magnetization directions of the pinned magnetic layer and the free magnetic layer are antiparallel to each other, the spin-up electrons are not electrons having spin parallel to the magnetization direction of the free magnetic layer 115. Therefore, the spin-up electrons are scattered near the interface between the free magnetic layer 115 and the nonmagnetic material layer 114 to rapidly decrease the effective mean free path of the spin-up electrons. Namely, the resistance value is increased. The rate of resistance change has a positive correlation with the amount of change in the effective mean free pat of the spin-up electrons.

In this embodiment comprising the other antiferromagnetic layer 17 functioning as the specular reflection layer, the mean free path of the spin-up conduction electrons can be lengthened. Therefore, the amount of change in the mean free path of the spin-up electrons with application of the external magnetic field can be increased to improve the rate of magnetoresistance change ($\Delta R/R$) of the spin valve thin film magnetic element.

When the free magnetic layer is relatively thin, the difference between the mean free paths of the spin-up and spin-down conduction electrons is more effectively increased by the spin filter effect and the specular reflection effect.

With the free magnetic layer 15 having a thickness of less than 15 Å, the free magnetic layer 15 cannot easily be formed to function as a ferromagnetic material layer, thereby failing to obtain the sufficient magnetoresistive effect.

With the free magnetic layer 15 having a thickness of over 45 Å, the number of the spin-up conduction electrons scattered before reaching the specular reflection layer is increased to undesirably decrease the rate of change in the rate of resistance change with the specular effect.

In FIG. 19, the first pinned magnetic layer 13a and the second pinned magnetic layer 13c having different magnetic moments per unit area are laminated with the nonmagnetic intermediate layer 13b provided therebetween to form the single pinned magnetic layer 13.

The first pined magnetic layer 13a is formed in contact with the antiferromagnetic layer 12, and annealing in a magnetic field produces an exchange anisotropic magnetic field by exchange coupling at the interface between the first pinned magnetic layer 13a and the antiferromagnetic layer 12 to pin the magnetization direction of the first pined magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

In FIG. 19, the first and second pinned magnetic layers 13a and 13c are formed by using the same material to have different thicknesses so that the magnetic moments per unit area are different.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layer 18 in the track width direction to increase the longitudinal bias magnetic field of the longitudinal bias layer 18.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

The "asymmetry" means the degree of asymmetry of a reproduced output waveform, and the obtained reproduced output having a symmetry waveform has low asymmetry. Therefore, the reproduced output waveform having asymmetry close to zero has excellent symmetry.

When the variable magnetization direction of the free magnetic layer and the pinned magnetization direction of the pinned magnetic layer are perpendicular to each other, the asymmetry is zero. When the asymmetry greatly deviates, information from a medium cannot be accurately read to cause an error. Therefore, with lower asymmetry, reproduced signal processing has improved reliability, thereby providing an excellent spin valve thin film magnetic element.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

The method of manufacturing the thin film magnetic element of this embodiment will be described below.

First, the second antiferromagnetic layer 12, the pinned magnetic layer 13, the nonmagnetic material layer 14, the free magnetic layer 15, and the other antiferromagnetic layer 17 are laminated in order on the substrate 11 to form the multilayer film A1.

The second antiferromagnetic layer 12, the pinned magnetic layer 13, the nonmagnetic material layer 14, the free magnetic layer 15, and the other antiferromagnetic layer 17 are formed by the thin film forming process such as sputtering, evaporation, or the like.

Next, first magnetic field annealing of the multilayer film A1 is preformed at a first heat treatment temperature in a magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A1, and thus the magnetization direction of the free magnetic layer 15 is not pinned in the Y direction.

In the first magnetic field annealing of the multilayer film A1, the other antiferromagnetic layer 17 is oxidized by a thickness of 10 to 20 Å from the surface thereof. Therefore, in the multilayer film A1, the surface of the other antiferromagnetic layer 17 is cut by 20 Å by ion milling to remove the oxidized portion. In this embodiment, the other antiferromagnetic layer 17 is deposited on the uppermost layer of the multilayer film A1, and thus oxidation of the free magnetic layer 15 can be prevented.

Next, the longitudinal bias layer 18 is deposited as a first antiferromagnetic layer on the multilayer film A1, and the electrode layer 19 is deposited on the longitudinal bias layer 18.

Next, a resist is deposited on the electrode layer 19 to mask the electrode layer 19 with a space corresponding to the track width Tw.

Furthermore, the portion of the longitudinal bias layer 18, which is not masked with the resist, is cut off by ion milling or reaction ion etching (RIE) perpendicularly to the surface 11a of the substrate 11 to form the recess 21. The side surfaces 21a of the recess 21 are perpendicular to the surface 11a of the substrate 11. In the thin film magnetic element shown in FIG. 19, the recess 21 is formed so that the bottom 21b thereof is located in the longitudinal bias layer 18.

In this case, the total t4 of the thickness of the region of the longitudinal bias layer 18, which is overlapped with the bottom 21b of the recess 21, and the thickness of the other antiferromagnetic layer 17 is more than 0 and 30 Å or less.

After the recess 21 is formed, the multilayer film B1 formed up to the electrode layer 19 is subjected to second magnetic field annealing at a second heat treatment temperature in a magnetic field of second magnitude in the X direction to produce an exchange anisotropic magnetic field in the longitudinal bias layer 18, to pin the magnetization direction of the free magnetic layer 15 in the X direction. In this embodiment, the second heat treatment temperature is 250° C., and the second magnitude of the magnetic field is 24 k (A/m).

After the second annealing, the resist layer is removed to obtain the thin film magnetic element shown in FIG. 19.

The exchange anisotropic magnetic field of the longitudinal bias layer 18 is not produced until the step of second magnetic field annealing. Therefore, in order to orient the exchange anisotropic magnetic field of the longitudinal bias layer 18 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer 12 is lost, and the second magnitude of the magnetic field is set to be lower than that of the exchange anisotropic magnetic field of the second antiferromagnetic layer 12. Also, even when the second antiferromagnetic layer 12 and the longitudinal bias layer 18 are formed by using antiferromagnetic materials having the same composition, the second magnetic annealing under these conditions can orient the magnetization direction of the longitudinal bias layer 18 in the X direction with the magnetization direction of the exchange anisotropic magnetic field of the second antiferromagnetic layer 12 being oriented in the Y direction. Namely, the magnetization direction of the free magnetic layer 15 can easily be pinned perpendicularly to the magnetization direction of the pinned magnetic layer 13.

Like in this embodiment, when the total t4 of the thickness of the region of the longitudinal bias layer 18, which is overlapped with the bottom 12b of the recess 21, and the thickness of the other antiferromagnetic layer 17 is more than 0 and 30 Å or less, in the regions of the longitudinal bias layer 18 and the other antiferromagnetic layer 17, which are overlapped with the bottom 21b of the recess 21, the disordered structure is not transformed to the ordered structure by second magnetic field annealing, thereby causing no exchange coupling magnetic field.

Namely, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed.

Therefore, the track width of the thin film magnetic element is determined by the width dimension Tw of the recess 21. As described above, in the present invention, the recess 21 can be formed only by cutting the longitudinal bias layer 18 having a uniform thickness with reactive ion etching (RIE) or ion milling perpendicularly to the surface 11a of the substrate 11. Therefore, the recess 21 with an accurate width dimension Tw can be formed. Namely, the track width Tw of the thin film magnetic element can be precisely defined.

In this embodiment, after the electrode layer 19 is deposited on the longitudinal bias layer 18, the resist is laminated on the electrode layer 19, and then the recess is formed in the longitudinal bias layer 18. However, a resist may be laminated on the longitudinal bias layer 18, and the electrode layer 19 may be deposited on the longitudinal bias layer 18 after the recess 21 is formed in the longitudinal bias layer 18.

Figure 20:
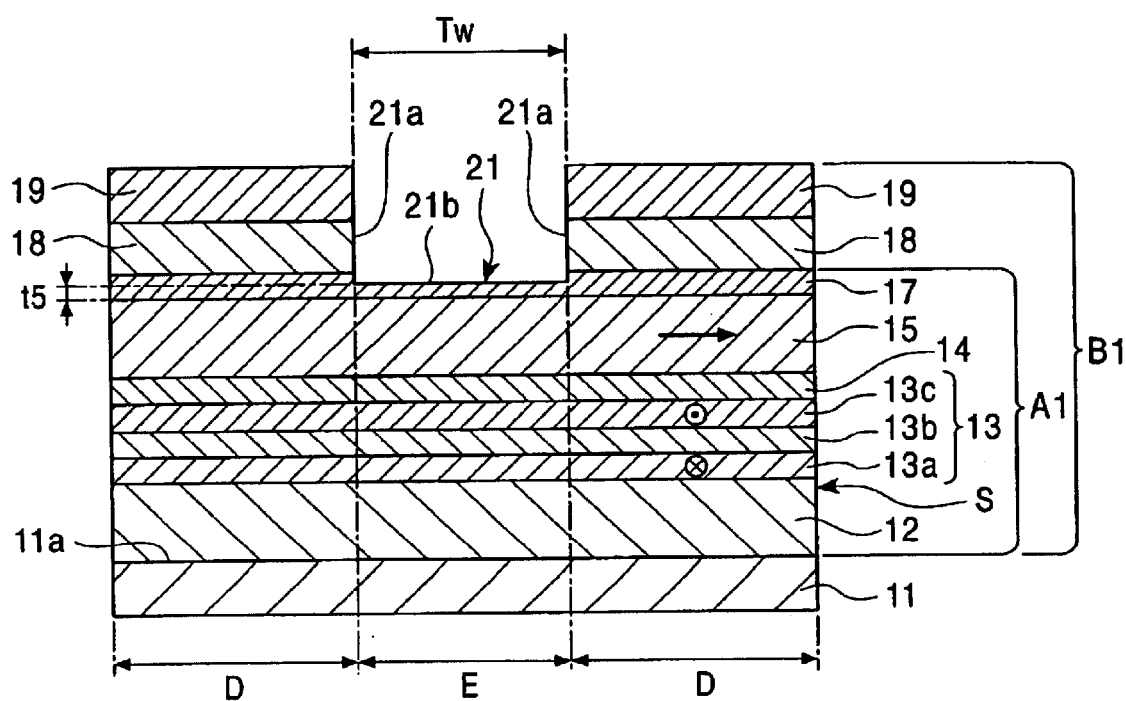
FIG. 20 is a sectional view of a thin film magnetic element according to a fourteenth embodiment of the present invention.

FIG. 20 is a sectional view of a thin film magnetic element according to a fourteenth embodiment of the present invention, as viewed from the ABS side.

The thin film magnetic element shown in FIG. 20 is substantially the same as the thirteenth embodiment shown in FIG. 19 except that the recess 21 is formed so that the bottom 21b of the recess 21 is located in the other antiferromagnetic layer 17.

In this embodiment, the thickness t5 of the region of the other antiferromagnetic layer 17, which is overlapped with the bottom 21b of the recess 21, is more than 0 and 30 Å or less so that transformation from the ordered structure to the ordered structure does not occur in the region of the other antiferromagnetic layer 17, which is overlapped with the bottom 21b of the recess 21, by magnetic field annealing, thereby causing no exchange coupling magnetic field.

Therefore, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed. Therefore, the track width of the thin film magnetic element is determined by the width dimension Tw of the recess 21.

In the thin film magnetic element of this embodiment in which the recess 21 is formed so that the bottom 21b of the recess 21 is located in the other antiferromagnetic layer 17, like in the thin film magnetic element shown in FIG. 1, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 20 can exhibit effects equivalent to the other effects of the thin film magnetic element of the thirteenth embodiment shown in FIG. 19.

Figure 21:
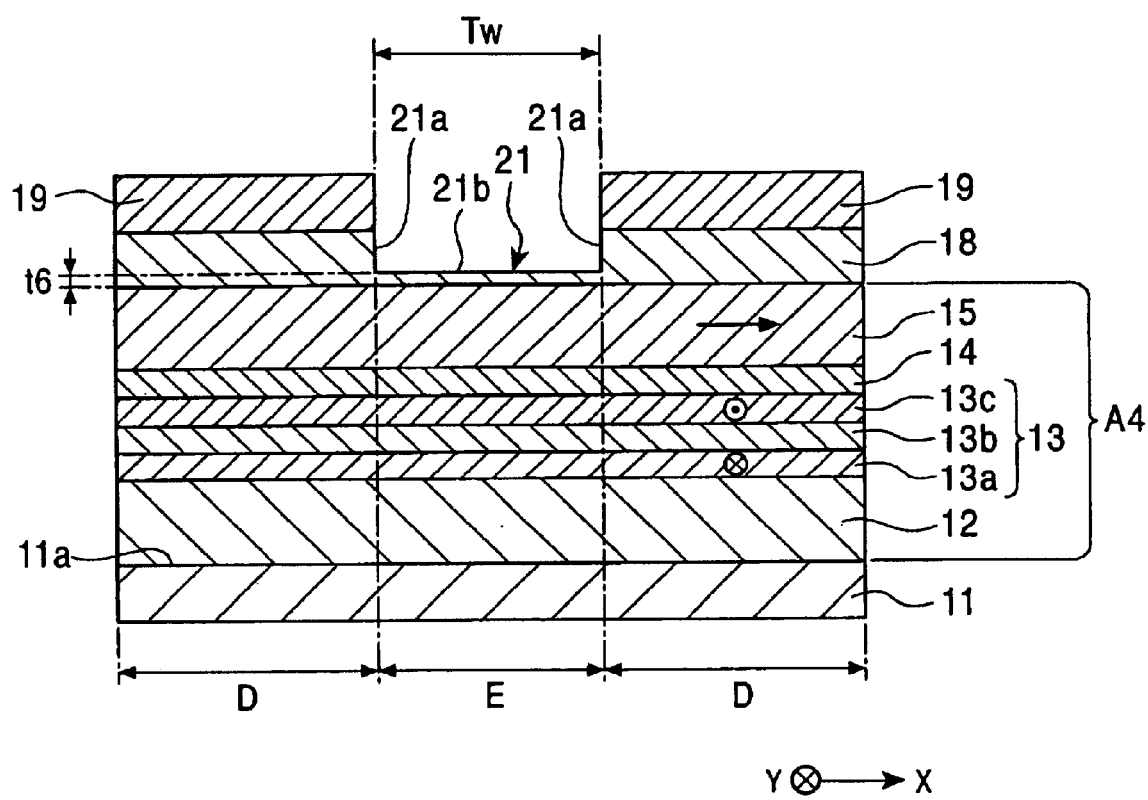
FIG. 21 is a sectional view of a thin film magnetic element according to a fifteenth embodiment of the present invention.

FIG. 21 is a sectional view of a thin film magnetic element according to a fifteenth embodiment of the present invention, as viewed from the ABS side.

The thin film magnetic element shown in FIG. 21 is different from the first embodiment in that the other antiferromagnetic layer 17 is not laminated on the free magnetic layer 15 to form a multilayer film A4 comprising the free magnetic layer 15 in the uppermost layer, and the longitudinal bias layer is deposited on the multilayer film A4.

In this embodiment, the thickness t6 of the region of the longitudinal bias layer 18, which is overlapped with the bottom 21b of the recess 21, is more than 0 and 30 Å or less so that transformation from the ordered structure to the ordered structure does not occur in the region of the longitudinal bias layer 18, which is overlapped with the bottom 21b of the recess 21, by magnetic field annealing, thereby causing no exchange coupling magnetic field.

Therefore, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed. Therefore, the track width of the thin film magnetic element is determined by the width dimension Tw of the recess 21.

The recess 21 can be formed only by cutting the longitudinal bias layer 18 having a uniform thickness by reactive ion etching (RIE) or ion milling perpendicularly to the surface 11a of the substrate 11. Therefore, the recess 21 having a precise width dimension Tw can be formed, i.e., the track width of the thin film magnetic element can be precisely defined.

In forming the thin film magnetic element of this embodiment, the multilayer film A4 is subjected to first magnetic field annealing to pin the magnetization direction of the pinned magnetic layer. However, the free magnetic layer 15 is the uppermost layer of the multilayer film A4, and thus the surface of the free magnetic layer 15 is oxidized in first magnetic field annealing of the multilayer film A4. Therefore, the surface of the free magnetic layer 15 is cut off by 20 Å by ion milling to remove the oxidized portion before the longitudinal bias layer 18 is deposited. The thickness of the free magnetic layer 15 greatly influences the magnetoresistive effect, and thus the free magnetic layer 15 is preferably deposited to a thickness larger than the thickness in a final product by a thickness to be cut off by ion milling, for example, a thickness of about 20 Å. Alternatively, the free magnetic layer 15 may be again deposited to a thickness corresponding to the thickness cut off by ion milling, and then longitudinal bias layer 18 may be deposited on the free magnetic layer.

The multilayer film A4 is then subjected to first magnetic field annealing to orient the exchange anisotropic magnetic field of the second antiferromagnetic layer 12 in the Y direction, and then the longitudinal bias layer 18 is deposited, followed by annealing in a second magnetic field in the X direction.

In the second magnetic field annealing, the second heat treatment temperature is set to a temperature lower than the block temperature at which the exchange anisotropic magnetic field of the second antiferromagnetic layer 12 is lost, and the second magnitude of the magnetic field is set to be lower than the exchange anisotropic magnetic field of the second antiferromagnetic layer 12. As a result, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 21 can exhibit effects the same effects as the thin film magnetic element of the thirteenth embodiment shown in FIG. 19.

Figure 22:
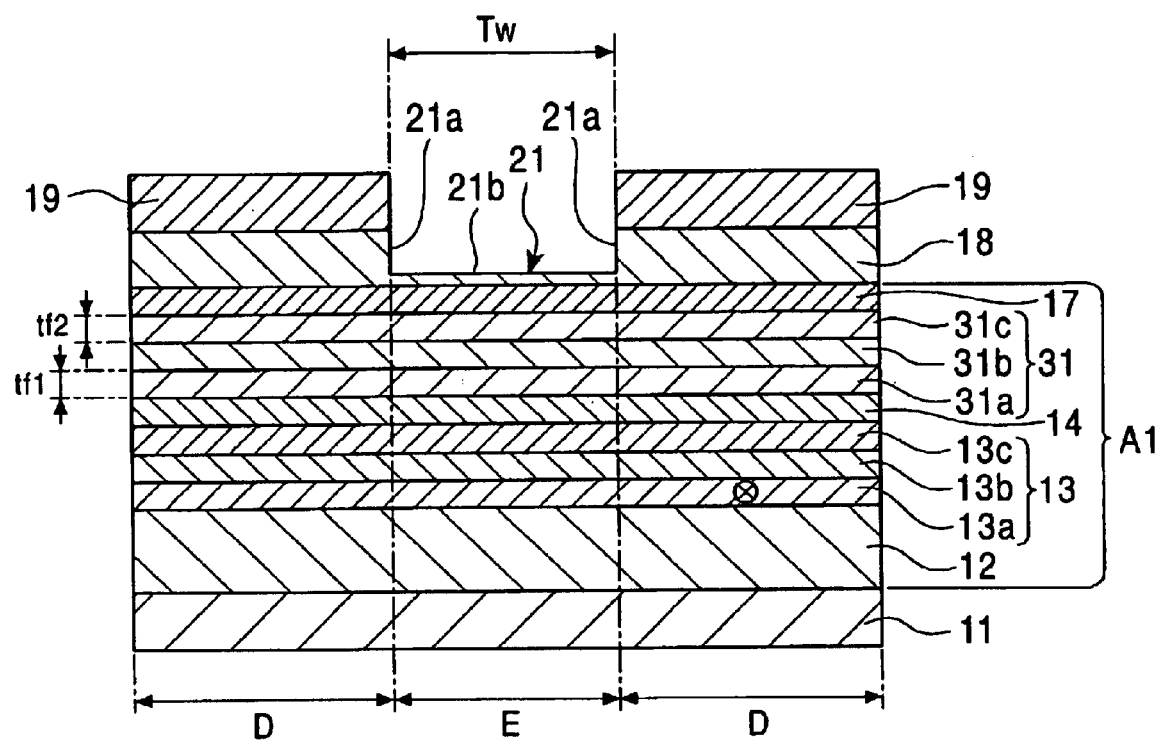
FIG. 22 is a sectional view of a thin film magnetic element according to a sixteenth embodiment of the present invention.

FIG. 22 is a sectional view of a thin film magnetic element according to a sixteenth embodiment of the present invention, as viewed from the ABS side.

The thin film magnetic element of this embodiment is substantially the same as the thirteenth embodiment shown in FIG. 19 except that the free magnetic layer is formed as a so-called synthetic ferrimagnetic free magnetic layer in which the free magnetic layer 31 comprises the first and second free magnetic layers 31a and 31c laminated with the nonmagnetic intermediate layer 31b provided therebetween.

The first and second free magnetic layers 31a and 31c are made of a ferromagnetic material, for example, a NiFe alloy, Co, a CoNiFe alloy, a CoFe alloy, a CoNi alloy, or the like. Particularly, the NiFe alloy is preferably used.

The nonmagnetic intermediate layer 31b is made of a nonmagnetic material, for example, an alloy of at least one element of Ru, Rh, Ir, Cr, Re, and Cu. Particularly, Ru is preferably used.

In this embodiment, an anti-diffusion layer made of Co or the like may be formed between the first free magnetic layer 31a and the nonmagnetic material layer 14. The anti-diffusion layer prevents mutual diffusion between the first free magnetic layer 31a and the nonmagnetic material layer 14.

The first and second free magnetic layers 31a and 31c are formed to have different magnetic moments per unit area. The magnetic moment per unit area is represented by the product of the saturation magnetization (Ms) and the thickness (t). Therefore, for example, when the first and second free magnetic layers 31a and 31c are formed by using the same material to have different thicknesses, the first and second free magnetic layers 31a and 31c have different magnetic moments per unit area.

When the anti-diffusion layer of Co or the like is formed between the first free magnetic layer 31a and the nonmagnetic material layer 14, the total magnetic moment per unit area of the first free magnetic layer 31a and the anti-diffusion layer is preferably different from the magnetic moment per unit area of the second free magnetic layer 31c.

The thickness tf2 of the second free magnetic layer 31c is preferably in the range of 0.5 to 2.5 nm. Also, the thickness tf1 of the first free magnetic layer 31a is preferably in the range of 2.5 to 4.5 nm, more preferably in the range of 3.0 to 4.0 nm, and most preferably in the range of 3.5 to 4.0 nm. With the thickness tf1 of the first free magnetic layer 31a out of the above range, the rate of magnetoresistance change of the spin valve thin film magnetic element cannot be increased.

In FIG. 22, the first free magnetic layer 31a and the second free magnetic layer 31c having different magnetic moments per unit area are laminated with the nonmagnetic intermediate layer 31b provided therebetween to form the single free magnetic layer 31.

The first and second free magnetic layers 31a and 31c are in the ferrimagnetic state in which the magnetization directions thereof are 180° different in an antiparallel state. In this case, the magnetization direction the free magnetic layer having a higher magnetic moment per unit area, for example, the first free magnetic layer 31a, is oriented in the direction of the magnetic field produced from the longitudinal bias layer 18, the magnetization direction of the second free magnetic layer 31c being oriented in the 180° opposite direction. When the first and second free magnetic layers 31a and 31c are in the ferrimagnetic state in which the magnetization directions thereof are 180° different in an antiparallel state, an effect equivalent to the effect of decreasing the thickness of the free magnetic layer 31 can be obtained to decrease saturation magnetization. Therefore, magnetization of the free magnetic layer 31 easily varies to improve the magnetic field sensitivity of a magnetoresistive element.

The direction of the synthetic magnetic moment per unit area corresponding to the total of the magnetic moments per unit area of the first and second free magnetic layers 31a and 31c coincides with the magnetization direction of the free magnetic layer 31.

However, only the magnetization direction of the first free magnetic layer 31a contributes to output based on the relation to the magnetization direction of the pinned magnetic layer 13.

When the first and second free magnetic layers have different magnetic thicknesses, the spin flop magnetic field of the free magnetic layer 31 can be increased.

The spin flop magnetic field represents the magnitude of the external magnetic field applied to two magnetic layers having antiparallel magnetization directions when the antiparallel state of the magnetization directions is broken.

FIG. 13 is a conceptual drawing of a hysteresis loop of the free magnetic layer 31. The M-H curve shown in FIG. 13 shows changes in magnetization M of the free magnetic layer having the construction shown in FIG. 22 with the external magnetic field applied in the track width direction.

In FIG. 13, arrow F1 represents the magnetization direction of the first free magnetic layer, and arrow F2 represents the magnetization direction of the second free magnetic layer.

As shown in FIG. 13, with the small external magnetic field applied, the first and second free magnetic layers are in the ferrimagnetic state in which the directions of the arrows F1 and F2 are antiparallel, while with the external magnetic field H of magnitude over a predetermined value, RKKY coupling between the first and second free magnetic layers is broken to fail to maintain the ferrimagnetic state. This is referred to as "spin flop transfer". The spin flop magnetic field represents the magnitude of the external magnetic field with which the spin flop transfer occurs, which is shown by Hsf in FIG. 13. In FIG. 13, HcF denotes the coercive force of magnetization of the free magnetic layer.

In the present invention, the free magnetic layer has a laminated ferrimagnetic structure in which a plurality of ferromagnetic material layers having magnetic moments of different magnitudes per unit area are laminated through nonmagnetic intermediate layers so that the adjacent ferromagnetic material layers with the nonmagnetic intermediate layer provided therebetween have antiparallel magnetization directions in the ferrimagnetic state.

In order to appropriately maintain the antiparallel magnetization state, the material of the free magnetic layer must be improved to increase the exchange coupling magnetic field by the RKKY interaction exerting between the plurality of ferromagnetic material layers.

As the magnetic material for forming the ferromagnetic material layers, a NiFe alloy is frequently used. Since the NiFe alloy has excellent soft magnetic properties, it is conventionally used for free magnetic layers. However, in the free magnetic layer having the laminated ferrimagnetic structure, the antiparallel coupling force between the ferromagnetic material layers made of the NiFe alloy is not so strong.

Therefore, in the present invention, the material of the ferromagnetic material layers is improved to strengthen antiparallel coupling force between the plurality of ferromagnetic material layers so that both end portions of the free magnetic layer positioned at both ends in the track width direction are not influenced by the external magnetic field. Therefore, in order to appropriately suppress the occurrence of side reading, a CoFeNi alloy is used for at least one of the plurality of ferromagnetic material layers, preferably all of the ferromagnetic material layers. By adding Co, the antiparallel coupling force can be strengthened.

FIG. 13 is a conceptual drawing of a hysteresis loop of the free magnetic layer having the laminated ferrimagnetic structure. For example, it is assumed that the magnetic moment (saturation magnetization Ms x thickness t) per unit area of the first free magnetic layer (F1) is larger than the magnetic moment per unit area of the second free magnetic layer (F2), and the external magnetic field is applied in the rightward direction shown in the drawing.

The synthetic magnetic moment per unit area determined by the vector sum ($|Ms·t(F1)+Ms·t(F2)|$) of the magnetic moment per unit area of the first free magnetic layer and the magnetic moment per unit area of the second free magnetic layer is constant in magnitude to a certain time point as the external magnetic field increases from zero. In the external magnetic field region A in which the synthetic magnetic moment per unit area is constant in magnitude, the antiparallel coupling force between the first and second free magnetic layers is stronger than the external magnetic field to appropriately put magnetizations of the first and second magnetic layers into the single magnetic domain state, thereby maintaining the antiparallel state.

However, the synthetic magnetic moment per unit area of the free magnetic layer increases with a slope angle as the external magnetic field increases in the rightward direction shown in FIG. 13. This is because the external magnetic field is stronger than the antiparallel coupling force exerting between the first and second free magnetic layers to disperse the magnetizations of the first and second free magnetic layers, to put the first and second magnetic layers into a multidomain state. As a result, the synthetic magnetic moment per unit area, which can be determined by the vector sum, increases. In the external magnetic field region B in which the synthetic magnetic moment per unit area increases, the antiparallel state of the free magnetic layer is broken. The external magnetic field at the starting point of increase in the synthetic magnetic moment per unit area is referred to as the "spin flop magnetic field (Hsf)".

The magnetizations of the first and second free magnetic layers are again put into the single magnetic domain state as the external magnetic field is further increased in the rightward direction shown in FIG. 13, to magnetize both free layers in the rightward direction shown in the drawing in the external magnetic field region C unlike in the external magnetic field region A. In this external magnetic field region C, the synthetic magnetic moment per unit area becomes a constant value. The magnitude of the external magnetic field at the time the synthetic magnetic moment becomes a constant value is referred to as a "saturation magnetic field (Hs)"

In the present invention, it was found that by using the CoFeNi alloy for the first and second free magnetic layers, the magnetic field with which the antiparallel state is broken, i.e., the spin flop magnetic field (Hsf), can be sufficiently increased, as compared with the use of a NiFe alloy.

In the present invention, in order to determine the magnitude of the spin flow magnetic field, experiment was carried out by using a NiFe alloy (comparative example) and a CoFeNi alloy (example) for the first and second magnetic layers in the following film structure.

Substrate/nonmagnetic material layer (Cu)/first free magnetic layer (2.4)/nonmagnetic intermediate layer (Ru)/second free magnetic layer (1.4)

Each numeric value in parenthesis represents the thickness by nm.

In the comparative example, the NiFe alloy having a Ni composition ratio of 80 atomic % and a Fe composition ratio of 20 atomic % was used for the first and second free magnetic layers. In this case, the spin flop magnetic field (Hsf) was about 59 (kA/m).

In the example, the CoFeNi alloy having a Co composition ratio of 87 atomic %, a Fe composition ratio of 11 atomic % and a Ni composition ratio of 2 atomic % was used for the first and second free magnetic layers. In this case, the spin flop magnetic field (Hsf) was about 293 (kA/m).

It was thus found that the spin flop magnetic field can be effectively improved by using the CoFeNi alloy rather than the NiFe alloy for the first and second free magnetic layers.

Next, the composition ratio of the CoFeNi alloy is described. It was also found that the magnetostriction of the CoFeNi alloy in contact with the Ru layer as the nonmagnetic intermediate layer is shifted to the positive side from the magnetostriction of the NiFe alloy by about $1 \times 10^{-6}$ to $6 \times 10^{-6}$.

The magnetostriction is preferably in the range of $-3 \times 10^{-6}$ to $3 \times 10^{-6}$, and coercive force is preferably 790 (A/m). With high magnetostriction, the free magnetic layer is easily affected by stress due to deposition distortion and a difference in the coefficient of thermal expansion from another layer. Therefore, magnetostriction is preferably as low as possible. The coercive force is preferably as low as possible because magnetic reversal of the free magnetic layer by the external magnetic field can be improved.

When the first and second free magnetic layers 31a and 31c are formed to have different magnetic moments per unit area, the spin flop magnetic field Hsf of the free magnetic layer 31 is increased to extend the range of a magnetic field in which the free magnetic layer 31 can maintain the ferrimagnetic state, thereby increasing stability of the ferrimagnetic state of the free magnetic layer 31.

In this embodiment, at least one of the first and second free magnetic layers 31a and 31c is preferably made of a magnetic material having the following composition.

The composition is represented by the formula CoFeNi in which the composition ratio of Fe is 9 atomic % to 17 atomic %, the composition ratio of Ni is 0.5 atomic % to 10 atomic %, and the balance is the composition ratio of Co.

As a result, the exchange coupling magnetic field produced between the first and second free magnetic layers 31a and 31c by RKKY interaction can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

Both the first and second free magnetic layers 31a and 31c are preferably made of the CoFeNi alloy. This is because a high spin flop magnetic field can be stably obtained, and the first and second free magnetic layers 31a and 31c can be appropriately magnetized in the antiparallel state.

In the above-described composition range, the magnetostriction of the first and second free magnetic layers 31a and 31c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 31, and appropriately suppress decreases in the amount of resistance change ($\Delta R$) and the rate of resistance change ($\Delta R/R$) due to Ni diffusion between the free magnetic layer 31 and the nonmagnetic material layer 14.

In this embodiment, the magnetization direction of the free magnetic layer 31 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 22 can exhibit effects equivalent to the other effects of the thin film magnetic element of the thirteenth embodiment shown in FIG. 19.

In the thin film magnetic elements shown in FIGS. 19 to 21, the free magnetic layer 15 may be formed as a synthetic ferrimagnetic free magnetic layer.

Figure 23:
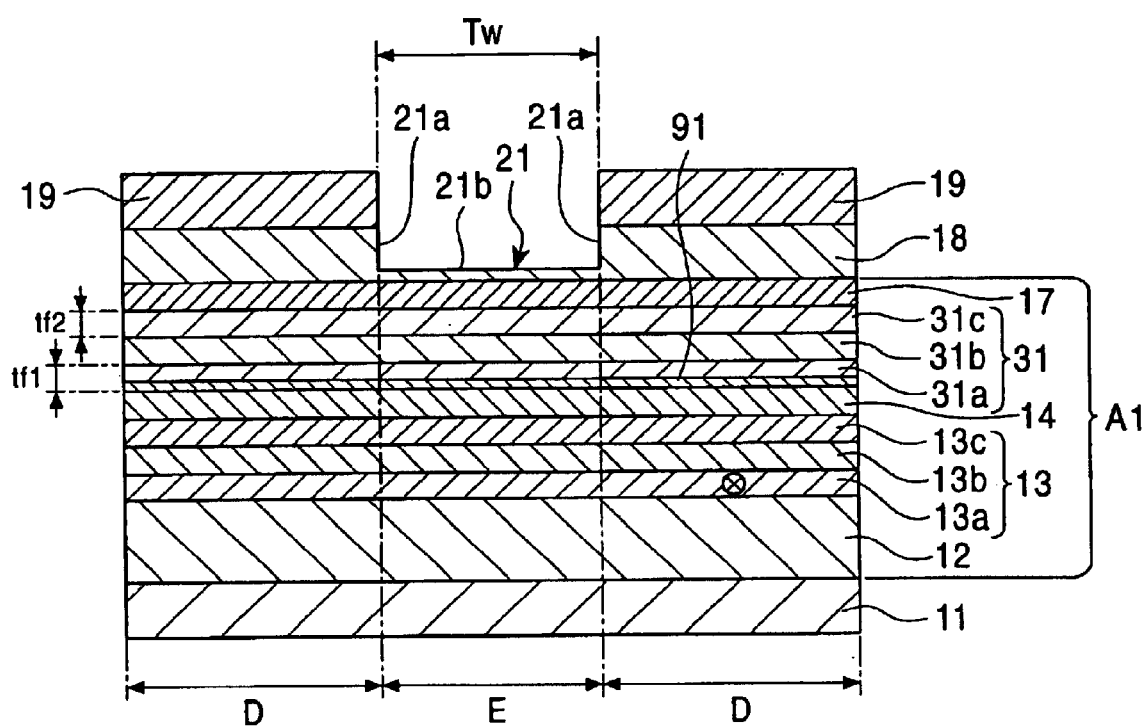
FIG. 23 is a sectional view of a thin film magnetic element according to a seventeenth embodiment of the present invention.

FIG. 23 is a sectional view of a thin film magnetic element according to a seventeenth embodiment of the present invention, as viewed from the ABS side.

The thin film magnetic element of this embodiment is different from the thin film magnetic element shown in FIG. 22 in that an intermediate layer 91 is provided between the first free magnetic layer 31a and the nonmagnetic material layer 14. The intermediate layer 91 is preferably made of a CoFe alloy or a Co alloy. Particularly, the CoFe alloy is preferably used.

By forming the intermediate layer 91, it is possible to prevent diffusion of metal elements at the interface with the nonmagnetic material layer 14, and improve the amount of resistance change ($\Delta R$) and the rate of resistance change ($\Delta R/R$). The intermediate layer 91 is formed to about 5 Å.

Particularly, when the first free magnetic layer 31a in contact with the nonmagnetic material layer 14 is made of the CoFeNi alloy having the above composition ratio, diffusion of metal elements between the first free magnetic layer 31a and the nonmagnetic material layer 14 can be appropriately suppressed. Therefore, the necessity for forming the intermediate layer 91 made of a CoFe alloy or Co between the first free magnetic layer 31a and the nonmagnetic material layer 14 is lower than the case in which the first free magnetic layer 31a is made of a magnetic material not containing Co, such as a NiFe alloy or the like.

However, even when the first free magnetic layer 31a is made of the CoFeNi alloy, the intermediate layer 91 made of a CoFe alloy or Co is preferably provided between the first free magnetic layer 31a and the nonmagnetic material layer 14 from the viewpoint that diffusion of metal elements between the first free magnetic layer 31a and the nonmagnetic material layer 14 can be securely prevented.

When the intermediate layer 91 is provided between the first free magnetic layer 31a and the nonmagnetic material layer 14, and at least one of the first and second free magnetic layers 31a and 31c is made of the CoFeNi alloy, the CoFeNi alloy preferably has a Fe composition ratio of 7 atomic % to 15 atomic %, a Ni composition ratio of 5 atomic % to 15 atomic %, and a Co composition ratio as the balance.

In this case, the exchange coupling magnetic field produced by RKKY interaction between the first and second free magnetic layers 31a and 31c can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

In the present invention, both the first and second free magnetic layers 31a and 31c are preferably made of the CoFeNi alloy. This is because a high spin flop magnetic field can be stably obtained.

In the above-described composition range, the magnetostriction of the first and second free magnetic layers 31a and 31c can be kept in the range of $-3 \times 10^{-6}$ to $\times 10^{-6}$, and the coercive force can be decreased to 790 (A/m) or less. Furthermore, the soft magnetic properties of the free magnetic layer 31 can be improved.

Figure 24:
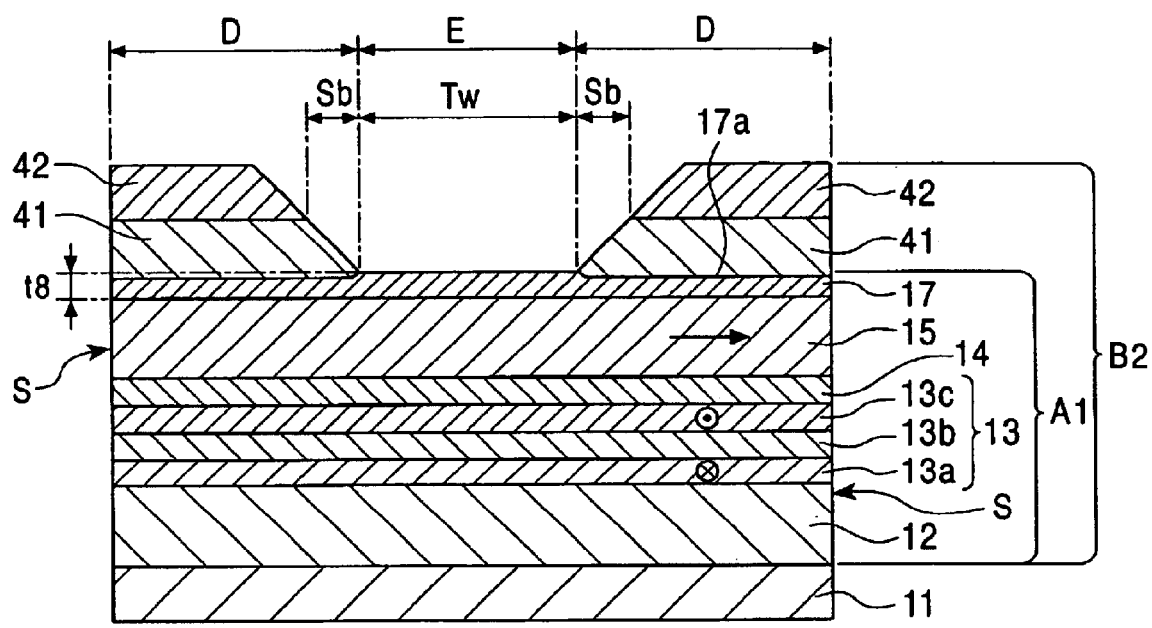
FIG. 24 is a sectional view of a thin film magnetic element according to an eighteenth embodiment of the present invention.

FIG. 24 is a sectional view of a thin film magnetic element according to an eighteenth embodiment of the present invention, as viewed from the ABS side.

In the thin film magnetic element of this embodiment, a pair of longitudinal bias layer 41 serving as a first antiferromagnetic layer is provided on the same multilayer film A1 as the thin film magnetic element shown in FIG. 19 so as to be arranged with a space therebetween corresponding to the track width Tw in the track width direction, and electrode layers 42 are deposited on the longitudinal bias layers 41. The materials and thicknesses of the second antiferromagnetic layer 12, the first pinned magnetic layer 13a, the nonmagnetic intermediate layer 13b, the second pinned magnetic layer 13c, the nonmagnetic material layer 14, the first free magnetic layer 31a, the nonmagnetic intermediate layer 31b, the second free magnetic layer 31c, and the other antiferromagnetic layer 17 are the same as the multilayer film A1 which constitutes the thin film magnetic element shown in FIG. 19.

Like the second antiferromagnetic layer 12 and the other antiferromagnetic layer 17, the longitudinal bias layers 41 comprise a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

The thickness of both ends of the longitudinal bias layers 41 is 80 to 300 Å, for example 200 Å.

The electrode layers 42 are formed by depositing, for example, Au, W, Cr, Ta, or the like.

When the longitudinal bias layers 41 are deposited on the multilayer film A1, the magnetization direction of the free magnetic layer 15 is oriented by exchange coupling with the longitudinal bias layers 41. The exchange coupling occurs only in the regions D of the magnetic layer, which are located directly below the antiferromagnetic layers (the longitudinal bias layers 41) having a thickness having antiferromagnetism, while it does occur in the region E deviating from the regions directly below the antiferromagnetic layers having a thickness having antiferromagnetism.

Therefore, the region of the track width (optical track width) Tw set as the space dimension between the longitudinal bias layers 41 substantially contributes to reproduction of a recording magnetic field, and functions as the sensitive zone exhibiting the magnetoresistive effect. Namely, in the thin film magnetic element of this embodiment, the optical track width is equal to the magnetic track width, and thus the thin film magnetic element can comply with the higher recording density of a recording medium in comparison to the hard bias system which causes difficulties in controlling the magnetic track width due to the presence of the dead zones.

Also, no dead zone occurs in the region of the track width (optical track width) Tw set at the time of formation of the thin film magnetic element to suppress a decrease in reproduced output when the optical track width Tw of the thin film magnetic element is decreased for complying with a higher recording density.

However, in this embodiment, the thickness dimension of the longitudinal bias layers 41 decreases in the portions Sb at both sides of the track. Therefore, in the portions Sb at both sides of the track, the effect of exchange coupling between the free magnetic layer 15 and the longitudinal bias layers 41 decreases. As a result, in the portions Sb at both sides of the track, the magnetization direction of the free magnetic layer 15 shown in FIG. 24 is not completely pinned in the X direction and is thus changed by applying the external magnetic field.

Particularly, when the track is narrowed for improving the recording density of the magnetic recording medium, not only information on a magnetic recording track to be read within the track width Tw but also information on the adjacent magnetic recording track are read by the portions Sb at both sides of the track, i.e., side reading possibly occurs.

In the thin film magnetic element of the present invention, the side end surfaces S of the multilayer film can be-formed perpendicularly to the surface of the substrate to suppress a variation in the length of the free magnetic layer 15 in the width direction.

In this embodiment, even when the second antiferromagnetic layer 12 and the longitudinal bias layer 18 are formed by using antiferromagnetic materials having the same composition, the exchange anisotropic magnetic field of the longitudinal bias layers 41 can be oriented in the X direction with the exchange anisotropic magnetic field of the second antiferromagnetic layer 12 being oriented in the Y direction.

In this embodiment, the other antiferromagnetic layer 17 comprise a single layer film or multilayer film made of, for example, a semi-metal Heusler alloy such as NiMnSb, PtMnSb, or the like so that the other antiferromagnetic layer 17 can be made to function as the specular reflection layer. The other antiferromagnetic layer 17 functioning as the specular reflection layer forms a potential barrier at the interface between the antiferromagnetic layer 17 and the free magnetic layer 15 so that the spin-up conduction electrons moving in the free magnetic layer 15 can be reflected while maintaining the spin state to further extend the mean free path of the spin-up conduction electrons. In other words, the so-called specular effect can be exhibited to further increase the difference between the mean free paths of the spin-up conduction electrons and the spin-down conduction electrons.

Namely, the mean free path of all conduction electrons can be greatly changed by the action of the external magnetic field to significantly increase the rate of change (ΔR/R) in magnetoresistance of the spin valve thin film magnetic element.

When the free magnetic layer 15 is relatively thin, the difference between the mean free paths of the spin-up and spin-down conduction electrons is more effectively increased by the specular reflection effect.

With the free magnetic layer 15 having a thickness of less than 15 Å, the free magnetic layer 15 cannot easily be formed to function as a ferromagnetic material layer, thereby failing to obtain the sufficient magnetoresistive effect.

With the free magnetic layer 15 having a thickness of over 45 Å, the number of the spin-up conduction electrons scattered before reaching the other antiferromagnetic layer 17 (the specular reflection layer) is increased to undesirably decrease the rate of change in the rate of resistance change with the specular effect.

In FIG. 24, the first pinned magnetic layer 13a and the second pinned magnetic layer 13c having different magnetic moments per unit area are laminated with the nonmagnetic intermediate layer 13b provided therebetween to form the single pinned magnetic layer 13.
The first pined magnetic layer 13a is formed in contact with the second antiferromagnetic layer 12, and annealing in a magnetic field produces an exchange anisotropic magnetic field by exchange coupling at the interface between the first pinned magnetic layer 13a and the second antiferromagnetic layer 12 to pin the magnetization direction of the first pined magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

In FIG. 24, the first and second pinned magnetic layers 13a and 13c are formed by using the same material to have different thicknesses so that both layers have different magnetic moments per unit area.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layers 41 in the track width direction to increase the longitudinal bias magnetic field of the longitudinal bias layers 41.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

The method of manufacturing the thin film magnetic element of this embodiment will be described below.

First, the second antiferromagnetic layer 12, the pinned magnetic layer 13, the nonmagnetic material layer 14, the free magnetic layer 15, and the other antiferromagnetic layer 17 are laminated in order on the substrate 11 to form the multilayer film A1.

The second antiferromagnetic layer 12, the pinned magnetic layer 13, the nonmagnetic material layer 14, the free magnetic layer 15, and the other antiferromagnetic layer 17 are formed by the thin film forming process such as sputtering, evaporation, or the like.

Next, a lift off resist layer is formed on the multilayer film A1 to completely cover the region of the track width Tw in the multilayer film A1.

Next, first magnetic field annealing of the multilayer film A1 is preformed at a first heat treatment temperature in a magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the region of the other antiferromagnetic layer 17, which is not masked with the resist layer, is oxidized by a thickness of 10 to 20 Å from the surface thereof. Therefore, the surface of the other antiferromagnetic layer 17 is cut by 20 Å by ion milling perpendicularly to the surface of the other antiferromagnetic layer 17 to remove the oxidized portion. In this embodiment, the other antiferromagnetic layer 17 is deposited on the uppermost layer of the multilayer film A, and thus oxidation of the free magnetic layer 15 can be prevented.

Furthermore, the longitudinal bias layers 41 as the first antiferromagnetic layers, and the electrode layers 42 are deposited on the multilayer film A1. In this embodiment, the longitudinal bias layers 41 and the electrode layers 42 are preferably deposited by a sputtering process such as an ion beam sputtering process, a long slow sputtering process, or a collimation sputtering process.

Sputtered particles are less deposited on the regions which are covered with both ends of the lift off resist layer. Therefore, the longitudinal bias layers 41 and the electrode layers 42 are deposited to a small thickness on the regions covered with both ends of the lift off resist layer, and thus the thickness dimensions of the longitudinal bias layers 41 and the electrode layers 42 decrease in the portions Sb on both sides of the track.

The multilayer film B2 formed up to the electrode layers 42 is subjected to second magnetic field annealing at a second heat treatment temperature in a magnetic field of second magnitude in the X direction to produce an exchange anisotropic magnetic field in the longitudinal bias layers 41, pinning the magnetization direction of the free magnetic layer 15 in the X direction. In this embodiment, the second heat treatment temperature is 250° C., and the second magnitude of the magnetic field is 24 k (A/m).

In the present invention, the magnetization direction of the free magnetic layer 15 is oriented in the X direction by exchange coupling with the longitudinal bias layers 41.

After the second annealing, the resist layer is removed to obtain the thin film magnetic element shown in FIG. 24.

The exchange anisotropic magnetic field of the longitudinal bias layers 41 is not produced until the step of second magnetic field annealing. Therefore, in order to orient the exchange anisotropic magnetic field of the longitudinal bias layers 41 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer is lost, and the second magnitude of the magnetic field is set to be lower than that of the exchange anisotropic magnetic field of the second antiferromagnetic layer. Also, even when the second antiferromagnetic layer 12 and the longitudinal bias layers 41 are formed by using antiferromagnetic materials having the same composition, the second magnetic field annealing under these conditions can orient the magnetization direction of the longitudinal bias layers 41 in the X direction with the magnetization direction of the exchange anisotropic magnetic field of the second antiferromagnetic layer 12 being oriented in the Y direction.

Namely, in the present invention, the magnetization direction of the free magnetic layer 15 can easily be pinned perpendicularly to the magnetization direction of the pinned magnetic layer 13.

Like in this embodiment, when the thickness t8 of the other antiferromagnetic layer 17 is more than 0 and 30 Å or less, in the region E in which the longitudinal bias layers 41 are not formed, the disordered structure is not transformed to the ordered structure by second magnetic field annealing, thereby causing no exchange coupling magnetic field.

Namely, only in both end portions D in the track width direction, which are overlapped with the longitudinal bias layers 41, the magnetization direction of the free magnetic layer 15 is pinned by exchange coupling with the longitudinal bias layers 41.

In the portion E of the free magnetic layer 15, which is not overlapped with the longitudinal bias layers 41, with no external magnetic field applied, the magnetization direction is oriented in the X direction, following both end portions D in which the magnetization direction is pinned by an exchange coupling magnetic field with the longitudinal bias layers 41. While with the external magnetic field applied, the magnetization direction is changed. Therefore, the distance between the longitudinal bias layers 41 in the track width direction corresponds to the track width Tw of the thin film magnetic element.

Figure 25:
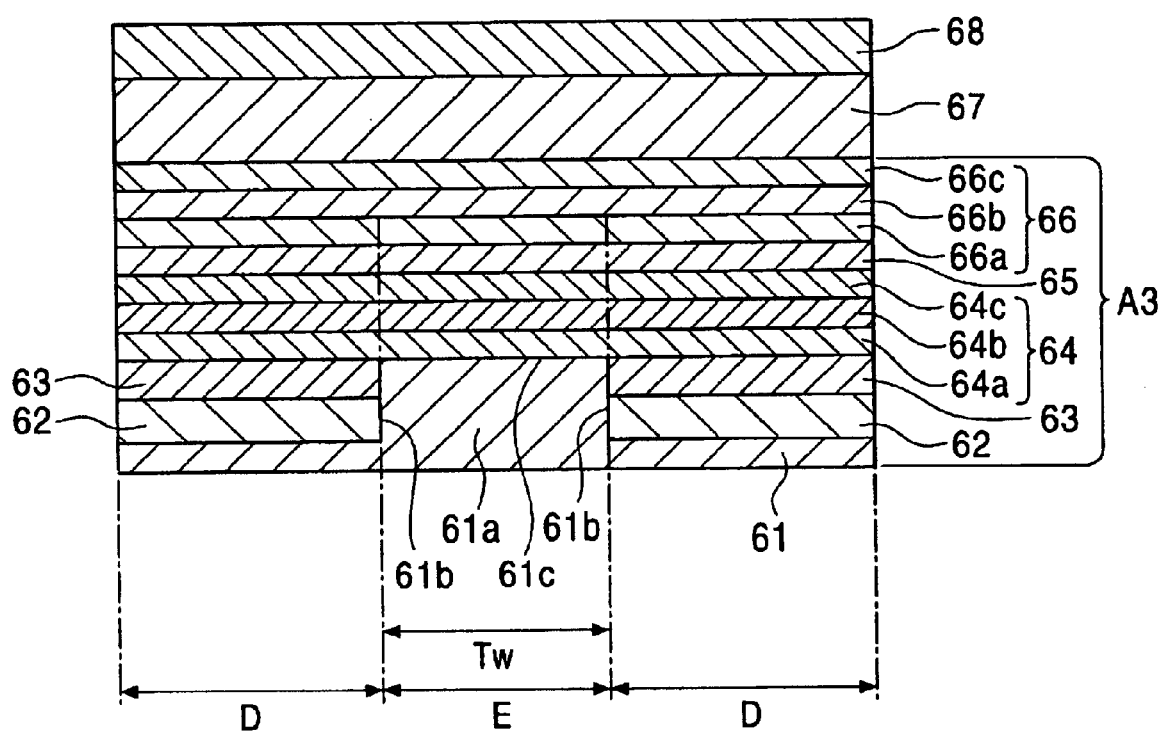
FIG. 25 is a sectional view of a thin film magnetic element according to a nineteenth embodiment of the present invention.

FIG. 25 is a sectional view of a thin film magnetic element according to a nineteenth embodiment of the present invention, as viewed from the ABS side.

In the thin film magnetic element shown in FIG. 25, electrode layers 62 and longitudinal bias layers 63 as first antiferromagnetic layers are formed on a substrate 61 to be arranged on both sides of a protrusion 61*a* formed on the substrate 61. Furthermore, a free magnetic layer 64 comprising a first free magnetic layer 64*a*, a nonmagnetic intermediate layer 64*b* and a second free magnetic layer 64*c*, a nonmagnetic material layer 65, a synthetic ferrimagnetic pinned magnetic layer 66 comprising a first pinned magnetic layer 66*a*, a nonmagnetic intermediate layer 66*b* and a second pinned magnetic layer 66*c*, a second antiferromagnetic layer 67 and a protecting layer 68 are deposited. The thin film magnetic element shown in FIG. 25 is a so-called top-spin spin-valve thin film magnetic element.

The electrode layers 62, the longitudinal bias layers 63 as the first antiferromagnetic layers, the free magnetic layer 64 comprising the first free magnetic layer 64*a*, the nonmagnetic intermediate layer 64*b* and the second free magnetic layer 64*c*, the nonmagnetic material layer 65, the synthetic ferrimagnetic pinned magnetic layer 66 comprising the first pinned magnetic layer 66*a*, the nonmagnetic intermediate layer 66*b* and the second pinned magnetic layer 66*c*, the second antiferromagnetic layer 67 and the protecting layer 68 are formed by the thin film forming process such as the sputtering process, the evaporation process, or the like. The material of each of the layers is the same as the material used for forming the thin film magnetic element shown in FIG. 19.

The thin film magnetic element shown in FIG. 25 can be formed by, for example, the following method.

First, the substrate 61 is cut by ion milling or reactive ion etching (RIE) to form the protrusion 61*a*, and the electrode layers 62 and the longitudinal bias layers 63 are deposited on both sides of the protrusion 61*a*. The side surfaces 61*b* of the protrusion 61*a* are perpendicular to the surface of the substrate 61.

Furthermore, the free magnetic layer 64 comprising the first free magnetic layer 64a, the nonmagnetic intermediate layer 64b and the second free magnetic layer 64c, the nonmagnetic material layer 65, and the synthetic ferrimagnetic pinned magnetic layer 66 comprising the first pinned magnetic layer 66a, the nonmagnetic intermediate layer 66b and the second pinned magnetic layer 66c are laminated to form a multilayer film A3.

Next, first magnetic field annealing of the multilayer film A3 is performed at a first heat treatment temperature in a magnetic field of first magnitude to produce an exchange anisotropic magnetic field in the longitudinal bias layers 63, pinning the magnetization direction of the free magnetic layer 64 in the X direction shown in FIG. 25.

Furthermore, the second antiferromagnetic layer 67 and the protecting layer 68 made of Ta are deposited, and second magnetic field annealing is performed at a second heat treatment temperature in a magnetic field of second magnitude in the Y direction to produce an exchange anisotropic magnetic field in the second antiferromagnetic layer 67, pinning the magnetization direction of the pinned magnetic layer 66 in the Y direction shown in FIG. 25.

The exchange anisotropic magnetic field between the second antiferromagnetic layer 67 and the pinned magnetic layer 66 is not produced until the step of second magnetic field annealing. Therefore, in order to orient the exchange anisotropic magnetic field of the second antiferromagnetic layer 67 in the Y direction with the exchange anisotropic magnetic field of longitudinal bias layers 63 being oriented in the X direction, the second heat treatment temperature is set to a temperature lower than the blocking temperature at which the exchange coupling magnetic field of the longitudinal bias layers 63 is lost, and the second magnitude of the magnetic field is set to be lower than that of the exchange anisotropic magnetic field of the longitudinal bias layers 63. Also, even when the longitudinal bias layers 63 and the second antiferromagnetic layer 67 are formed by using antiferromagnetic materials having the same composition, the second magnetic field annealing under these conditions can orient the exchange anisotropic magnetic field of the second antiferromagnetic layer 67 in the Y direction with the magnetization direction of the exchange anisotropic magnetic field of the longitudinal bias layers 63 being oriented in the X direction.

Namely, in the present invention, the magnetization direction of the free magnetic layer 64 can easily be pinned perpendicularly to the magnetization direction of the pinned magnetic layer 66.

In this embodiment, the magnetization direction of the free magnetic layer 64 is pinned by exchange coupling with the longitudinal bias layers 63 only in both end portions D in the track width direction.

In the region E of the free magnetic layer 64 overlapped with the top 61c of the protrusion 61a, with no external magnetic field applied, the magnetization direction is oriented in the X direction, following both end portions D in which the magnetization direction is pinned by exchange coupling with the longitudinal bias layers 63, while with the external magnetic field, the magnetization direction is changed.

Therefore, the track width of the thin film magnetic element is determined by the width dimension Tw of the protrusion. As described above, in this embodiment, the protrusion 61a can be formed only by cutting the substrate 61 having a uniform thickness by reactive ion etching (RIE) or ion milling perpendicularly to the surface of the substrate 61. Therefore, the protrusion 61a having a precise width dimension Tw can be formed, i.e., the track width of the thin film magnetic element can be precisely defined.

Figure 26:
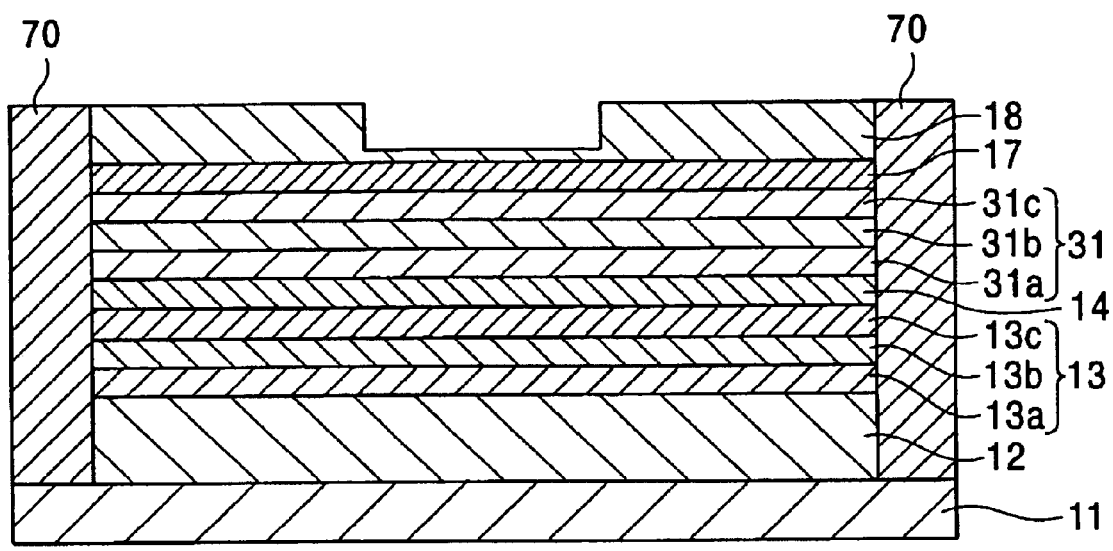
FIG. 26 is a sectional view of a thin film magnetic element according to a twentieth embodiment of the present invention.

FIG. 26 is a sectional view of a thin film magnetic element according to a twentieth embodiment of the present invention, as viewed from the ABS side.

The thin film magnetic element shown in FIG. 26 is substantially the same as the thin film magnetic element shown in FIG. 22 except that electrode layers 70 are connected to both sides of a laminate formed by laminating from the second antiferromagnetic layer 12 to the longitudinal bias layer 18.

The thin film magnetic element of this embodiment can improve the ratio of the sensing current supplied to the vicinities of the nonmagnetic material layer 14 and the free magnetic layer 31 from the electrode layers 70 without passing through the longitudinal bias layer 18 having a higher resistance value than the nonmagnetic material layer 14 and the free magnetic layer 31. Also, the connection resistance between the laminate and the electrode layers 70, which contributes to the rate of magnetoresistance change, can be decreased to increase the rate of magnetoresistance change ($\Delta R/R$) of the spin-valve thin film magnetic element.

Furthermore, the sensing current can be supplied directly to the vicinities of the free magnetic layer from the electrode layers 70 with the free magnetic layer 31 being put into the single magnetic domain state, thereby preventing side reading and complying with a further increase in the recording density.

A pair of the electrode layers 70 may be arranged on both sides of at least the free magnetic layer 31, the nonmagnetic material layer 14 and the pinned magnetic layer 13 in the planar direction.

Figure 27:
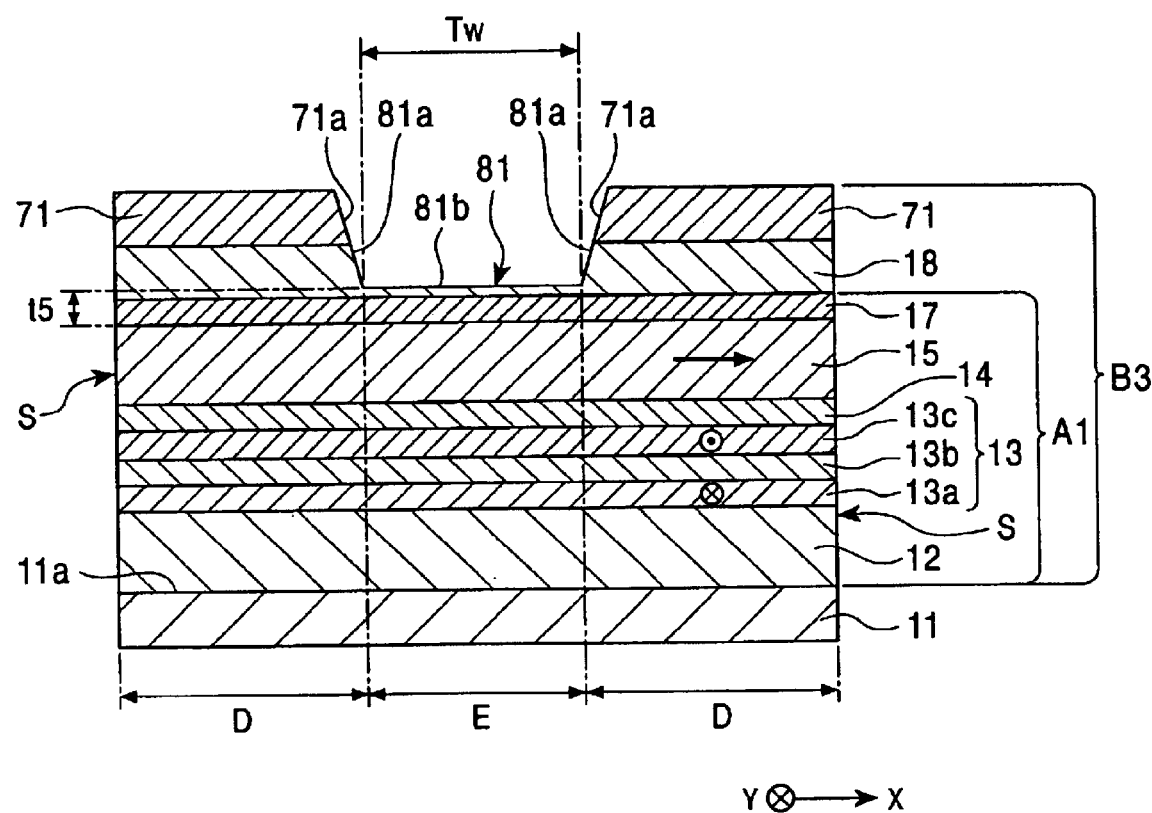
FIG. 27 is a sectional view of a thin film magnetic element according to a twenty-first embodiment of the present invention.

FIG. 27 is a sectional view of a thin film magnetic element according to a twenty-first embodiment of the present invention, as viewed from the ABS side.

The thin film magnetic element of this embodiment is substantially the same as the thirteenth embodiment shown in FIG. 19 except that the side surfaces 81a of a recess 81 are inclined from the direction perpendicular to the surface 11a of the substrate 11.

In this embodiment, the total thickness t5 of the region of the longitudinal bias layer 18, which is overlapped with the bottom 81b of the recess 81, and the other antiferromagnetic layer 17 is more than 0 and 30 Å or less so that transformation from the ordered structure to the ordered structure does not occur in the regions of the longitudinal base layer 18 and the other antiferromagnetic layer 17, which are overlapped with the bottom 81b of the recess 81, by magnetic field annealing, thereby causing no exchange coupling magnetic field.

Therefore, only in both end portions D in the track width direction, except in the portion overlapped with the bottom 81b of the recess 81, the magnetization direction of the free magnetic layer 15 is pinned by exchange coupling with the longitudinal bias layer 18.

In the portion E of the free magnetic layer 15, which is overlapped with the bottom 81b of the recess 81, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed. Therefore, the track width of the thin film magnetic element is determined by the width dimension Tw of the bottom 81b of the recess 81.

In the thin film magnetic element of this embodiment, like in the thin film magnetic element shown in FIG. 19, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 27 can be manufactured by, for example, the following manufacturing method.

First, the second antiferromagnetic layer 12, the pinned magnetic layer 13, the nonmagnetic material layer 14, the free magnetic layer 15, and the other antiferromagnetic layer 17 are laminated on the substrate 11 to form a multilayer film A1.

The second antiferromagnetic layer 12, the pinned magnetic layer 13, the nonmagnetic material layer 14, the free magnetic layer 15, and the other antiferromagnetic layer 17 are formed by the thin film forming process such as the sputtering process, the evaporation process, or the like.

Next, first magnetic field annealing of the multilayer film A1 is performed at a first heat treatment temperature in a magnetic field of first magnitude to produce an exchange anisotropic magnetic field in the second antiferromagnetic layer 12, pinning the magnetization direction of the pinned magnetic layer 13 in the Y direction shown in FIG. 12. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A1, and thus the magnetization direction of the free magnetic layer 15 is not pinned in the Y direction.

In the first magnetic field annealing of the multilayer film A1, the other antiferromagnetic layer 17 is oxidized by a thickness of 10 to 20 Å from the surface thereof. Therefore, in the multilayer film A1, the surface of the other antiferromagnetic layer 17 is cut by 20 Å by ion milling to remove the oxidized portion. In this embodiment, the other antiferromagnetic layer 17 is deposited on the uppermost layer of the multilayer film A, and thus oxidation of the free magnetic layer 15 can be prevented. Next, the longitudinal bias layer 18 is deposited as the first antiferromagnetic layer on the multilayer film A1.

Next, a lift off resist is deposited on the surface of the longitudinal bias layer 18 to cover a region slightly wider than the track width, and then a pair of electrode layers 71 is deposited on the surface of the longitudinal bias layer 18 so as to be arranged on both sides of the lift off resist with a space therebetween in the track width direction. Then, the lift off resist is removed. Furthermore, the region of the longitudinal bias layer 18, which is held between the pair of the electrode layers 71 is cut off by reactive ion etching (RIE) or ion milling by using the pair of the electrode layers 71 as a mask to form the recess 81 in the longitudinal bias layer 18.

The electrode layers 71 formed by using the lift off resist have inclined surfaces 71a. Therefore, when the region of the longitudinal bias layer 18, which is held between the pair of the electrode layers 71 is cut off by reactive ion etching (RIE) or ion milling by using the pair of the electrode layers 71 as a mask, the side surfaces 81a of the recess 81 formed in the longitudinal bias layer 18 are slightly inclined from the direction perpendicular to the surface 11a of the substrate 11.

In the thin film magnetic element shown in FIG. 27, the recess 81 is formed so that the bottom 81b of the recess 81 is located in the longitudinal bias layer 18.

In this case, the total t5 of the thickness of the region of the longitudinal bias layer 18, which is overlapped with the bottom 81b of the recess 81, and the thickness of the other antiferromagnetic layer 17 is more than 0 and 30 Å or less.

After the recess 81 is formed, the multilayer film B3 formed up to the electrode layer 71 is subjected to second magnetic field annealing at a second heat treatment temperature in a magnetic field of second magnitude in the X direction to produce an exchange anisotropic magnetic field in the longitudinal bias layer 18, pinning the magnetization direction of the free magnetic layer 15 in the X direction. As a result the thin film magnetic element shown in FIG. 27 is obtained. In this embodiment, the second heat treatment temperature is 250° C., and the second magnitude of the magnetic field is 24 k (A/m).

The exchange anisotropic magnetic field of the longitudinal bias layer 18 is not produced until the step of second magnetic field annealing. Therefore, in order to orient the exchange anisotropic magnetic field of the longitudinal bias layer 18 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer 12 is lost, and the second magnitude of the magnetic field is set to be lower than that of the exchange anisotropic magnetic field of the antiferromagnetic layer 12. Also, even when the second antiferromagnetic layer 12 and the longitudinal bias layer 18 and are formed by using antiferromagnetic materials having the same composition, the second magnetic field annealing under these conditions can orient the exchange anisotropic magnetic field of the longitudinal bias layer 18 in the X direction with the direction of the exchange anisotropic magnetic field of the second antiferromagnetic layer 12 being oriented in the Y direction.

Namely, in the present invention, the magnetization direction of the free magnetic layer 15 can easily be pinned in the direction perpendicular to the magnetization direction of the pinned magnetic layer 13.

In this embodiment, the track width Tw is defined by the width dimension of the bottom 81b of the recess 81. The width dimension of the bottom 81b of the recess 81 can be defined by controlling the dimension of the resist and the depth dimension of the recess 81.

The recess 81 may be formed so that the bottom 81b of the recess 81 is located either in the other antiferromagnetic layer 17.

Alternatively, the multilayer film A4 shown in FIG. 21 or the multilayer film A3 shown in FIG. 25 may be formed in place of the multilayer film A1. After first magnetic field annealing, the recess 81 may be formed after the longitudinal bias layer 18, the resist layer and the electrode layers 71 are deposited, and then second magnetic field annealing may be performed. In this case, the bottom 81b of the recess 81 may be located in any one of the longitudinal bias layer 18 and the other antiferromagnetic layer 17.

In the thin film magnetic elements of the thirteenth to twentieth embodiments, the pinned magnetic layer 13 may be formed as a single ferromagnetic material layer.

In the thin film magnetic element shown in FIG. 25 or 26, at least one of the first and second free magnetic layers 64a and 64c or at least one of the first and second free magnetic layers 31a and 31c is preferably made of a magnetic material having the following composition.

The composition is represented by the formula CoFeNi wherein the Fe composition ratio is 9 atomic % to 17 atomic %, the Ni composition ratio is 0.5 atomic % to 10 atomic %, and the balance is the Co composition ratio.

As a result, the exchange coupling magnetic field produced between the first and second free magnetic layers 64a and 64c or between the first and second free magnetic layers 31a and 31c by RKKY interaction can be strengthened. Specifically, the magnetic field with which the antiparallel state is broken, i.e., the spin flop magnetic field (Hsf), can be increased to about 293 (kA/m).

In the above-described composition range, the magnetostriction of the first and second free magnetic layers 64a and 64c or the first and second free magnetic layers 31a and 31c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 64 or 31, and appropriately suppress decreases in the amount of resistance change ($\Delta R$) and the rate of resistance change ($\Delta R/R$) due to Ni diffusion between the free magnetic layer 64 or 31 and the nonmagnetic material layer 14 or 66.

Also, an intermediate layer 91 made of a CoFe alloy or Co may be provided between the first free magnetic layer 64a or 31a and the nonmagnetic material layer 14.

When the intermediate layer 91 made of a CoFe alloy or CO alloy is provided between the first free magnetic layer and the nonmagnetic material layer 14, the CoFeNi alloy preferably has a Fe composition ratio of 7 atomic % to 15 atomic %, a Ni composition ratio of 5 atomic % to 15 atomic %, and a Co composition ratio as the balance.

In the thin film magnetic elements shown in FIGS. 19 to 21, and 24 to 27, the free magnetic layer 15 may be formed as a synthetic ferrimagnetic free magnetic layer in which at least one of the first and second free magnetic layers is made of a magnetic material represented by the composition formula CoFeNi wherein the Fe composition ratio is 9 atomic % to 17 atomic %, the Ni composition ratio is 0.5 atomic % to 10 atomic %, and the balance is the Co composition ratio.

When an intermediate layer made of a CoFe alloy or CO alloy is provided between the first free magnetic layer and the nonmagnetic material layer 14, the CoFeNi alloy preferably has a Fe composition ratio of 7 atomic % to 15 atomic %, a Ni composition ratio of 5 atomic % to 15 atomic %, and a Co composition ratio as the balance.

In manufacturing a thin film magnetic head by using any one of the thin film magnetic elements shown in FIGS. 19 to 24 and FIGS. 26 and 27, an underlying layer made of an insulating material such as alumina is formed between the substrate 11 and the second antiferromagnetic layer 12, a lower shield made of a magnetic material is deposited on the underlying layer, and a lower gap layer made of an insulating material is deposited on the lower shield layer. The thin film magnetic element is laminated on the lower gap layer. Furthermore, an upper gap layer made of an insulating material is formed on the thin film magnetic element, and an upper shield layer made of a magnetic alloy is deposited on the upper gap layer. A writing inductive element may be laminated on the upper shield layer.

In manufacturing the magnetic head using the thin film magnetic element shown in FIG. 25, the thin film magnetic element is provided between the upper shield layer and the lower shield layer with the upper gap layer and the lower gap layer respectively provided therebetween. In this case, the same protrusion as the substrate 61 shown in FIG. 25 is formed on the upper surface of the lower gap layer, and the thin film magnetic element shown in FIG. 25 is laminated above the lower gap layer.

FIGS. 28 to 31 are sectional views illustrating the method of manufacturing the thin film magnetic element according to the first embodiment of the present invention.

Figure 28:
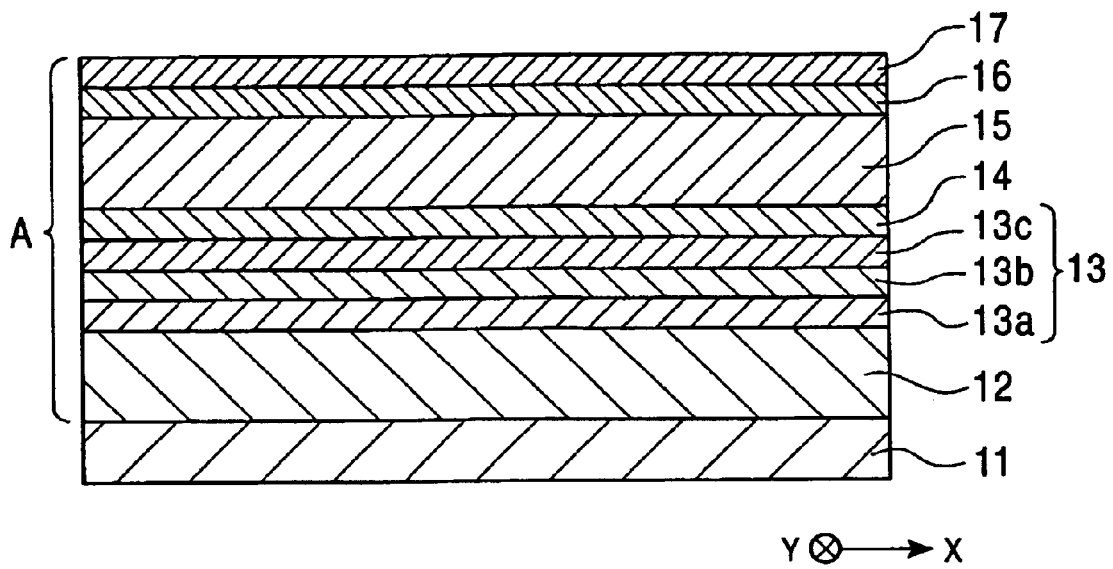
FIG. 28 is a sectional view illustrating a step of a method of manufacturing the thin film magnetic element of the first embodiment of the present invention.

First, the second antiferromagnetic layer 12 is deposited on the substrate 11. Furthermore, the synthetic ferrimagnetic pinned magnetic layer 13 comprising the first pinned magnetic layer 13a, the nonmagnetic intermediate layer 13b and the second pinned magnetic layer 13c is laminated, and the nonmagnetic material layer 14, the free magnetic layer 15, the nonmagnetic layer 16 and the other antiferromagnetic layer 17 are laminated on the pinned magnetic layer 13 to form the multilayer film A. FIG. 28 is a sectional view showing the thus-formed multilayer film A.

The second antiferromagnetic layer 12, the pinned magnetic layer 13, the nonmagnetic material layer 14, the free magnetic layer 15, the nonmagnetic layer 16, and the other antiferromagnetic layer 17 are formed by the thin film forming process such as sputtering, vaporization, or the like. The second antiferromagnetic layer 12 and the other antiferromagnetic layer 17 are made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

By using such an alloy for the second antiferromagnetic layer 12 and the other antiferromagnetic layer 17, the second antiferromagnetic layer 12 and the other antiferromagnetic layer 17 each of which produces a large exchange coupling magnetic field can be obtained by annealing the alloy. Particularly, by using the PtMn alloy, the excellent second antiferromagnetic layer 12 and other antiferromagnetic layer 17 can be obtained, in which the exchange coupling magnetic field is 48 kA/m or more, for example, over 64 kA/m, and the blocking temperature at which the exchange coupling magnetic field is lost is as high as 380° C.

The above-described alloys have a disordered face-centered cubic structure (fcc) in a state immediately after deposition, but the fcc structure is transformed to a CuAuI-type ordered face-centered tetragonal structure (fct) by heat treatment.

The thickness of the second antiferromagnetic layer 12 is 80 to 300 Å near the center in the track width direction. The thickness of the other antiferromagnetic layer 17 is about 30 Å.

The first and second pinned magnetic layers 13a and 13c are made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

The nonmagnetic material layer 14 is a layer for preventing magnetic coupling between the pinned magnetic layer 13 and the free magnetic layer 15, and a sensing current mainly flows through the nonmagnetic material layer 14. The nonmagnetic material layer 14 is preferably made of a nonmagnetic material having conductivity, such as Cu, Cr, Au, Ag or the like, and particularly, Cu is preferably used.

The free magnetic layer 15 is made of a ferromagnetic material, for example, a NiFe alloy, Co, a CoNiFe alloy, a CoFe alloy, a CoNi alloy, or the like. Particularly, the NiFe alloy or Co is preferably used.

Next, first magnetic field annealing of the multilayer film A shown in FIG. 28 is performed at the first heat treatment temperature in the magnetic field of first magnitude to produce an exchange anisotropic magnetic field in the second antiferromagnetic layer 12, pinning the magnetization direction of the pinned magnetic layer 13 in the Y direction shown in FIG. 12. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the other antiferromagnetic layer 17 is oxidized by a thickness of about 10 to 20 Å from the surface thereof. Therefore, in the multilayer film A, the surface of the other antiferromagnetic layer 17 is cut by about 20 Å by ion milling to remove the oxidized portion. In this embodiment, the other antiferromagnetic layer 17 is deposited on the uppermost layer of the multilayer film A, and thus oxidation of the nonmagnetic layer 16 and the free magnetic layer 15 can be prevented.

Figure 29:
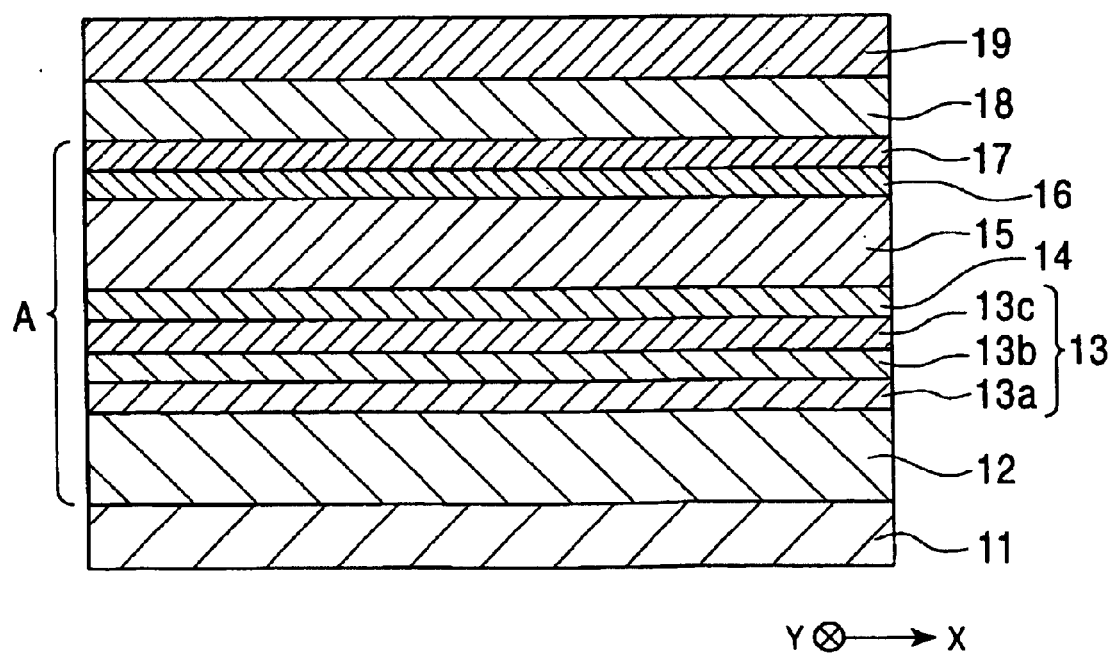
FIG. 29 is a sectional view illustrating the step next to the step shown in FIG. 28 in the method of manufacturing the thin film magnetic element of the present invention.

Next, as shown in FIG. 29, the longitudinal bias layer 18 is deposited as the first antiferromagnetic layer on the multilayer film A, and the electrode layer 19 is deposited on the longitudinal bias layer 18.

Like the second antiferromagnetic layer 12 and the other antiferromagnetic layer 17, the longitudinal bias layer 18 is made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

The thickness of the longitudinal bias layer 18 is 80 to 300 Å, for example 200 Å, near the center thereof in the track width direction.

In order to form the second antiferromagnetic layer 12, the other antiferromagnetic layer 17 and the longitudinal bias layer 18, the content of Pt or X in the PtMn alloy or the alloy represented by the formula X—Mn is preferably in the range of 37 to 63 at %, and more preferably in the range of 47 to 57 at %. The upper and lower limits of the numerical range represent "not more than" and "not less than", respectively, unless otherwise specified.

In the alloy represented by the formula Pt—Mn—X', the total of X'+Pt is preferably in the range of 37 to 63 at %, and more preferably 47 to 57 at %, and X' is preferably in the range of 0.2 to 10 at %. However, when X' is at least one element of Pd, Ir, Rh, Ru, Os, Ni, and Fe, X' is preferably in the range of 0.2 to 40 at %.

By using such an alloy for the first antiferromagnetic layer and the second antiferromagnetic layer, the first and second antiferromagnetic layers each of which produces a large exchange coupling magnetic field can be obtained by annealing the alloy. Particularly, by using the PtMn alloy, the excellent first and second antiferromagnetic layers can be obtained, in which the exchange coupling magnetic field is 48 kA/m or more, for example, over 64 kA/m, and the blocking temperature at which the exchange coupling magnetic field is lost is as high as 380° C.

The above-described alloys have a disordered face-centered cubic structure (fcc) in a state immediately after deposition, but the fcc structure is transformed to a CuAuI-type ordered face-centered tetragonal structure (fct) by heat treatment.

In the thin film magnetic element of this embodiment, the second antiferromagnetic layer 12 and the longitudinal bias layer 18 can be formed by using antiferromagnetic materials having the same composition.

The electrode layer 19 is formed by depositing, for example, Au, W, Cr, Ta, or the like.

Figure 30:
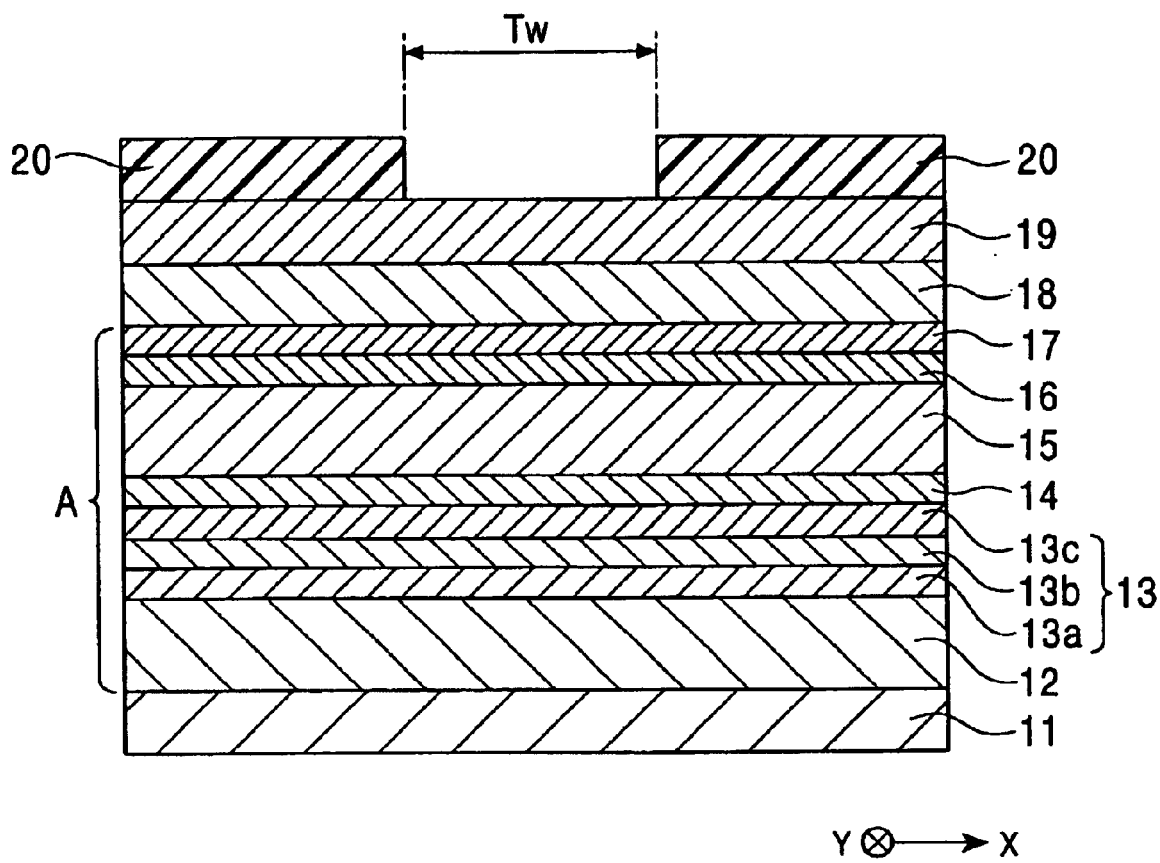
FIG. 30 is a sectional view illustrating the step next to the step shown in FIG. 29 in the method of manufacturing the thin film magnetic element of the present invention.

Next, as shown in FIG. 30, a resist 20 is deposited on the electrode layer 19 to mask the electrode layer 19 with a space corresponding to the track width Tw.

Figure 31:
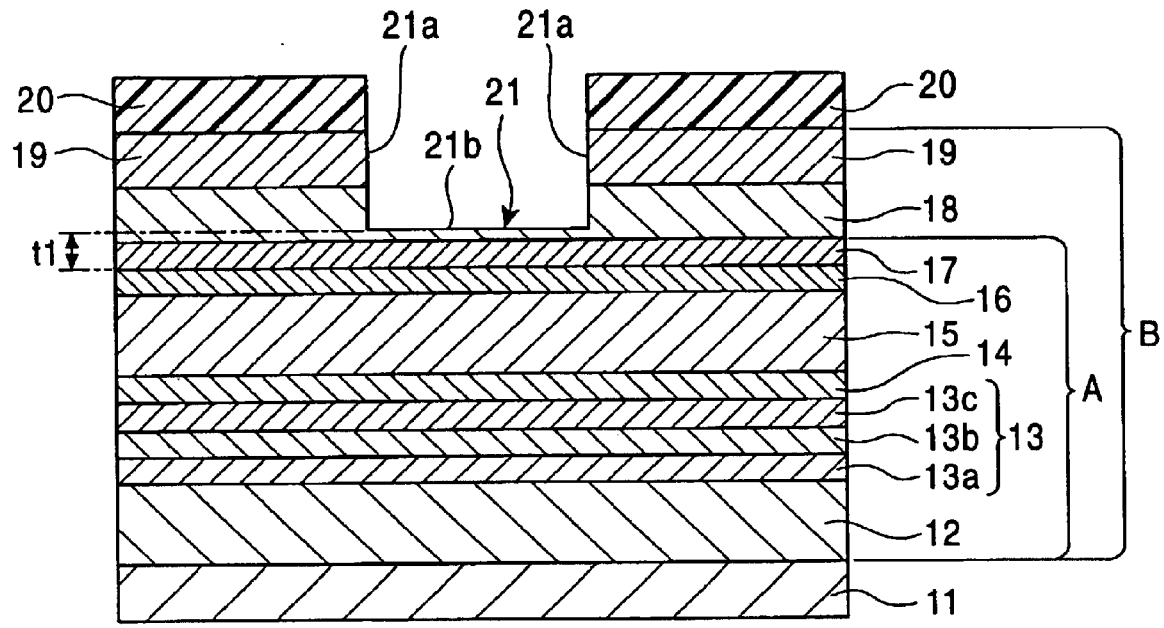
FIG. 31 is a sectional view illustrating the step next to the step shown in FIG. 30 in the method of manufacturing the thin film magnetic element of the present invention.

Furthermore, as shown in FIG. 31, the portion of the longitudinal bias layer 18, which is not masked with the resist 20, is cut off by ion milling or reaction ion etching (RIE) perpendicularly to the surface 11a of the substrate 11 to form the recess 21. The side surfaces 21a of the recess 21 are perpendicular to the surface 11a of the substrate 11. In FIG. 31, the recess 21 is formed so that the bottom 21b thereof is located in the longitudinal bias layer 18.

In this case, the total t1 of the thickness of the region of the longitudinal bias layer 18, which is overlapped with the bottom 21b of the recess 21, and the thickness of the other antiferromagnetic layer 17 is more than 0 and 30 Å or less.

After the recess 21 is formed, the multilayer film B formed up to the electrode layer 19 is subjected to second magnetic field annealing at the second heat treatment temperature in the magnetic field of second magnitude in the X direction to produce an exchange anisotropic magnetic field in the longitudinal bias layer 18, to pin the magnetization direction of the free magnetic layer 15 in the X direction. In this embodiment, the second heat treatment temperature is 250° C., and the second magnitude of the magnetic field is 24 k (A/m).

After the second annealing, the resist layer 20 is removed to obtain the thin film magnetic element shown in FIG. 1.

The exchange anisotropic magnetic field of the longitudinal bias layer 18 is not produced until the step of second magnetic field annealing. Therefore, in order to orient the exchange anisotropic magnetic field of the longitudinal bias layer 18 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer 12 is lost, and the second magnitude of the magnetic field is set to be lower than that of the exchange anisotropic magnetic field of the second antiferromagnetic layer 12. Also, even when the second antiferromagnetic layer 12 and the longitudinal bias layer 18 are formed by using antiferromagnetic materials having the same composition, the second magnetic annealing under these conditions can orient the magnetization direction of the longitudinal bias layer 18 in the X direction with the magnetization direction of the exchange anisotropic magnetic field of the second antiferromagnetic layer 12 being oriented in the Y direction. Namely, the magnetization direction of the free magnetic layer 15 can easily be pinned perpendicularly to the magnetization direction of the pinned magnetic layer 13.

Like in this embodiment, when the total t1 of the thickness of the region of the longitudinal bias layer 18, which is overlapped with the bottom 12b of the recess 21, and the thickness of the other antiferromagnetic layer 17 is more than 0 and 30 Å or less, in the regions of the longitudinal bias layer 18 and the other antiferromagnetic layer 17, which are overlapped with the bottom 21b of the recess 21, the disordered structure is not transformed to the ordered structure by second magnetic field annealing, thereby causing no exchange coupling magnetic field.

Namely, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed.

Therefore, the track width of the thin film magnetic element is determined by the width dimension Tw of the recess 21. As described above, in the present invention, the recess 21 can be formed only by cutting the longitudinal bias layer 18 having a uniform thickness with reactive ion etching (RIE) or ion milling perpendicularly to the surface 11a of the substrate 11. Therefore, the recess 21 with an accurate width dimension Tw can be formed. Namely, the track width Tw of the thin film magnetic element can be precisely defined.

In the above description, after the electrode layer 19 is deposited on the longitudinal bias layer 18, the resist is laminated on the electrode layer 19, and then the recess is formed in the longitudinal bias layer 18. However, a resist may be laminated on the longitudinal bias layer 18, and the electrode layer 19 may be deposited on the longitudinal bias layer 18 after the recess 21 is formed in the longitudinal bias layer 18.

Although, in this embodiment, the second antiferromagnetic layer 12 is laminated directly on the substrate 11, the second antiferromagnetic layer 12 may be laminated on the substrate 11 with an underlying layer provided therebetween and comprising an alumina layer, Ta, or the like.

The thin film magnetic element manufactured by the above-described manufacturing method will be described below.

When the longitudinal bias layer 18 is laminated above the multilayer film A with the nonmagnetic layer 16 provided therebetween, the magnetization direction of the free magnetic layer 15 is oriented by RKKY interaction with the longitudinal bias layer 18. The RKKY interaction exerts only between the antiferromagnetic layer (longitudinal bias layer 18) having a thickness with antiferromagnetism and the region of a magnetic layer located directly below the antiferromagnetic layer, but does not exert on the region out of the region directly below the antiferromagnetic layer having a thickness with antiferromagnetism. Namely, the RKKY interaction exerts only on the regions D at both ends in the track width direction, which are not overlapped with the bottom 21b of the recess 21, but does no exert on the region E overlapped with the bottom 21b of the recess 21.

Therefore, the region of the track width (optical track width) Tw set as the width dimension of thee recess 21 formed in the longitudinal bias layer 18 is the sensitive zone substantially contributing reproduction of a recording medium and exhibiting the magnetoresistive effect. Namely, in the thin film magnetic element of the present invention, the optical track width of the thin film magnetic element is equal to the magnetic track width, and thus the thin film magnetic element can easily comply with the higher recording density of a recording medium, as compared with a hard bias system which causes difficulties in controlling the magnetic track width because of the presence of dead zones.

Also, no dead zone occurs in the region of the track width (optical track width) Tw set at the time of formation of the thin film magnetic element, and when the optical track width Tw of the thin film magnetic element is decreased for complying with a higher recording density, a decrease in the reproduced output can thus be suppressed.

Furthermore, in this embodiment, the side end surfaces S of the thin film magnetic element can be formed perpendicularly to the surface 11a of the substrate 11, thereby suppressing a variation in the length of the free magnetic layer 15 in the width direction.

Like in this embodiment, when the magnetization direction of the free magnetic layer 15 is oriented by the RKKY interaction with the longitudinal bias layer 18, exchange coupling force can be strengthened as compared with the case of direct contact between the longitudinal bias layer 18 and the free magnetic layer 15.

Like in this embodiment, when the nonmagnetic layer 16 is made of a conductive material, the nonmagnetic layer 16 can be caused to function as a backed layer having a spin filter effect.

When the backed layer having the spin filter effect is provided in contact with the free magnetic layer 15, the center height of the laminate at which a sensing current flows can be shifted to the backed layer Side as compared with a case without the backed layer. Namely, the center height of the sensing current flow deviates from the free magnetic layer 15 to decrease the strength of a sensing current magnetic field at the position of the free magnetic layer 15, thereby decreasing the influence of the sensing current magnetic field on variable magnetization of the free magnetic layer 15. Therefore, asymmetry can be decreased.

The "asymmetry" means the degree of asymmetry of a reproduced output waveform, and the obtained reproduced output having a symmetry waveform has low asymmetry. Therefore, the reproduced output waveform having asymmetry close to zero has excellent symmetry.

The asymmetry is zero when the magnetization directions of the free magnetic layer and the pinned magnetic layer are perpendicular to each other. When the asymmetry greatly 1 deviates, information from a medium cannot be accurately read to cause an error. Therefore, with lower asymmetry, reproduced signal processing has improved reliability, thereby providing an excellent spin valve thin film magnetic element.

The spin filter effect is described below. FIGS. 14 and 15 are schematic drawings illustrating the spin filter effect of the backed layer in the spin valve thin film magnetic element. FIG. 14 is a schematic drawing illustrating an example of a structure without the backed layer, and FIG. 15 is a schematic drawing illustrating an example of a structure comprising the backed layer.

The giant magnetoresistive (GMR) effect is mainly due to "spin-dependent scattering" of electrons. Namely, the GMR effect utilizes the difference between the mean free path $\lambda^+$ of conduction electrons having spin (for example, spin-up) parallel to the magnetization direction of a magnetic material, i.e., the free magnetic layer, and the mean free path $\lambda^-$ of conduction electrons having a spin (for example, spin-down) antiparallel to the magnetization direction. In FIGS. 14 and 15, the conduction electrons having the spin-up are shown by an upward arrow, and the conduction electrons having the spin-down are shown by a downward arrow. When electrons pass through the free magnetic layer, the electrons having the spin-up parallel to the magnetization direction of the free magnetic layer can freely move, while the electrons having the spin-down are immediately scattered.

This is because the mean free path $\lambda^+$ of the electrons having the spin-up is, for example, about 50 angstroms, while the mean free path $\lambda^-$ of the electrons having the spin-down is about 6 angstroms, and is as small as about one tenth of that of the spin-up electrons. The thickness of the free magnetic layer 115 is set to be larger than the mean free path $\lambda^-$ of about 6 angstroms of the electrons having the spin-down, and smaller than that mean free path $\lambda^+$ of about 50 angstroms of the electrons having the spin-up.

Therefore, when the electrons pass through the free magnetic layer 115, the electrons having the spin-up parallel to the magnetization direction of the free magnetic layer 115 can freely move, while the electrons having the spin-down are immediately scattered (filtered out).

The spin-down electrons produced in a pinned magnetic layer 113 and pass through a nonmagnetic material layer 114 are scattered near the interface between the free magnetic layer 115 and the nonmagnetic material layer 114, and less reach the free magnetic layer 115. Namely, even when the magnetization direction of the free magnetic layer 115 is rotated, the mean free path of the spin-down electrons is not changed to cause no influence on the rate of resistance change by the GMR effect. Therefore, only the behavior of the spin-up electrons may be considered for the GMR effect.

The spin-up electrons produced in the pinned magnetic layer 113 move through the nonmagnetic material layer 114 having a thickness smaller than the mean free path of the spin-up electrons, and reach the free magnetic layer 115. The spin-up electrons can freely pass through the free magnetic layer 115 because the spin-up electrons have spin parallel to the magnetization direction of the free magnetic layer 115.

In the state in which the magnetization directions of the pinned magnetic layer and the free magnetic layer are antiparallel to each other, the spin-up electrons are not electrons having spin parallel to the magnetization direction of the free magnetic layer 115. Therefore, the spin-up electrons are scattered near the interface between the free magnetic layer 115 and the nonmagnetic material layer 114 to rapidly decrease the effective mean free path of the spin-up electrons. Namely, the resistance value is increased. The rate of resistance change has a positive correlation with the amount of change in the effective mean free pat of the spin-up electrons.

As shown in FIG. 15, when the backed layer B1 is provided, the spin-up electrons passing through the free magnetic layer 115 move through the additional mean free path $\lambda^+ b$ in the backed layer B1, which is determined by the material of the backed layer B1, and are then scattered. In other words, by providing the backed layer B1, the mean free path $\lambda^+$ of the spin-up electrons is lengthened by the additional mean free path $\lambda^+ b$.

In this embodiment comprising the nonmagnetic layer 16 functioning as the backed layer, the mean free path of the spin-up conduction electrons can be lengthened. Therefore, the amount of change in the mean free path of the spin-up electrons with application of the external magnetic field can be increased to improve the rate of magnetoresistance change ($\Delta R/R$) of the spin valve thin film magnetic element.

In this embodiment, the other antiferromagnetic layer 17 may be formed as a specular reflection layer. In order to form the other antiferromagnetic layer 17 as the specular reflection layer, the other antiferromagnetic layer 17 may comprise a single layer film or multilayer film of a semi-metal Heusler alloy, for example, NiMnSb, PtMnSb, or the like.

By using such a material, a sufficient potential barrier can be formed between the other antiferromagnetic layer 17 and the adjacent layer to obtain the sufficient specular effect.

The specular reflection effect will be described. FIGS. 16 and 17 are schematic drawings illustrating the specular reflection effect of a specular reflection layer S1 in a spin valve thin film magnetic element. As described above in the description of the spin filter effect, only the behavior of the spin-up electrons which is defined by the pinned magnetization direction of the pinned magnetic layer 113 may be considered for the GMR effect.

In the state in which the magnetization directions of the pinned magnetic layer and the free magnetic layer are parallel to each other, the spin-up electrons pass through the nonmagnetic material layer 114 to reach the free magnetic layer 115, as shown in FIGS. 16 and 17. Then, the spin-up electrons move through the free magnetic layer 115 to reach the vicinity of the interface between the free magnetic layer 115 and the specular reflection layer S1.

As shown in FIG. 16, when the specular reflection layer is not provided, the spin-up electrons move through the free magnetic layer 115, and are scattered by the upper surface of the free magnetic layer 115. Therefore, the mean free path is shown by $\lambda^+$ in the drawing.

On the other hand, as shown in FIG. 17, when the specular reflection layer S1 is provided, the potential barrier is formed near the interface between the free magnetic layer 115 and the specular reflection layer S1, and thus the spin-up electrons are specularly reflected (specular scattering) near the interface between the free magnetic layer 115 and the specular reflection layer S1.

In general, the spin state (energy, quantum state, etc.) of conduction electrons is changed by scattering. However, in specular scattering, the spin-up electrons are likely to be reflected while maintaining the spin state, and again move through the free magnetic layer 115. Namely, the spin state of the spin-up conduction electrons is maintained in specular reflection, and thus the spin-up electrons move through the free magnetic layer as if they were not scattered.

This means that the mean free path is lengthened by specular reflection of the spin-up electrons by a reflection mean free path $\lambda^+ s$.

In the state in which the magnetization directions of the pinned magnetic layer and the free magnetic layer are antiparallel to each other, the spin-up electrons are not electrons having spin parallel to the magnetization direction of the free magnetic layer 115. Therefore, the spin-up electrons are scattered near the interface between the free magnetic layer 115 and the nonmagnetic material layer 114 to rapidly decrease the effective mean free path of the spin-up electrons. Namely, the resistance value is increased. The rate of resistance change has a positive correlation with the amount of change in the effective mean free pat of the spin-up electrons.

In this embodiment comprising the other antiferromagnetic layer 17 functioning as the specular reflection layer, the mean free path of the spin-up conduction electrons can be lengthened. Therefore, the amount of change in the mean free path of the spin-up electrons with application of the external magnetic field can be increased to improve the rate of magnetoresistance change (ΔR/R) of the spin valve thin film magnetic element.

When the free magnetic layer is relatively thin, the difference between the mean free paths of the spin-up and spin-down conduction electrons is more effectively increased by the spin filter effect and the specular reflection effect.

With the free magnetic layer 15 having a thickness of less than 15 Å, the free magnetic layer 15 cannot easily be formed to function as a ferromagnetic material layer, thereby failing to obtain the sufficient magnetoresistive effect.

With the free magnetic layer 15 having a thickness of over 45 Å, the number of the spin-up conduction electrons scattered before reaching the specular reflection layer is increased to undesirably decrease the rate of change in the rate of resistance change with the specular effect.

In FIG. 1, the first pinned magnetic layer 13a and the second pinned magnetic layer 13c having different magnetic moments per unit area are laminated with the nonmagnetic intermediate layer 13b provided therebetween to form the single pinned magnetic layer 13.
The first pined magnetic layer 13a is formed in contact with the second antiferromagnetic layer 12, and annealing in a magnetic field produces an exchange anisotropic magnetic field by exchange coupling at the interface between the first pinned magnetic layer 13a and the second antiferromagnetic layer 12 to pin the magnetization direction of the first pined magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

In FIG. 1, the first and second pinned magnetic layers 13a and 13c are formed by using the same material to have different thicknesses so that both layers have different magnetic moments per unit area.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layer 18 in the track width direction to increase the longitudinal bias magnetic field of the longitudinal bias layer 18.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

FIG. 2 is a sectional view of the thin film magnetic element according to the second embodiment of the present invention, as viewed from the ABS side.

The method of manufacturing the thin film magnetic element shown in FIG. 2 is substantially the same as the first embodiment shown in FIGS. 28 to 31 except that the recess 21 is formed by cutting off the portion of the longitudinal layer 18, which is held between the resist layers 20 shown in FIG. 31, by ion milling or reactive ion etching (RIE) perpendicularly to the surface 11a of the substrate 11 so that the bottom 21b of the recess 21 is located in the other antiferromagnetic layer 17.

In the second embodiment, the thickness t2 of the region of the other antiferromagnetic layer 17, which is overlapped with the bottom 21b of the recess 21, is more than 0 and 30 Å or less so that transformation from the ordered structure to the ordered structure does not occur in the region of the other antiferromagnetic layer 17, which is overlapped with the bottom 21b of the recess 21, by magnetic field annealing, thereby causing no exchange coupling magnetic field.

Therefore, only in both end portions D in the track width direction, except in the portion overlapped with the bottom 21b of the recess 21, the magnetization direction of free magnetic layer 15 is pinned by RKKY coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed. Therefore, the track width of the thin film magnetic element is determined by the width dimension Tw of the recess 21.

In the manufacturing method in which the recess 21 is formed so that the bottom 21b of the recess 21 is located in the other antiferromagnetic layer 17, like in the first embodiment, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 2 can exhibit effects equivalent to the other effects of the thin film magnetic element of the first embodiment shown in FIG. 1.

FIG. 3 is a sectional view of the thin film magnetic element according to the third embodiment of the present invention, as viewed from the ABS side.

The method of manufacturing the thin film magnetic element shown in FIG. 3 is substantially the same as the first embodiment shown in FIGS. 28 to 31 except that the recess 21 is formed by cutting off the portion of the longitudinal layer 18, which is held between the resist layers 20 shown in FIG. 31, by ion milling or reactive ion etching (RIE) perpendicularly to the surface 11a of the substrate 11 so that the bottom 21b of the recess 21 is located in the nonmagnetic layer 16.

In the third embodiment, only in both end portions D in the track width direction, except in the portion overlapped with the bottom 21b of the recess 21, the magnetization direction of the free magnetic layer 15 is pinned by RKKY coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by RKKY coupling with the longitudinal bias layer 18. While with the external magnetic field applied, the magnetization direction is changed. Therefore, the track width of the thin film magnetic element is determined by the width dimension Tw of the recess 21.

In the manufacturing method in which the recess 21 is formed so that the bottom 21b of the recess 21 is located in the nonmagnetic layer 16, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 3 can exhibit effects equivalent to the other effects of the thin film magnetic element of the first embodiment shown in FIG. 1.

FIG. 19 is a sectional view of the thin film magnetic element according to the thirteenth embodiment of the present invention, as viewed from the ABS side. The method of manufacturing the thin film magnetic element is substantially the same as the first embodiment shown in FIGS. 28 to 31.

The manufacturing method is different from the first embodiment in that after the free magnetic layer 15 is deposited, the other antiferromagnetic layer 17 is laminated directly on the free magnetic layer 15 without the non magnetic layer 16 to form the multilayer film A1, the multilayer film A1 is annealed in the first magnetic field, and then the longitudinal bias layer 18 is deposited on the multilayer film A1. In the thin film magnetic element shown in FIG. 19, the other antiferromagnetic layer 17 and the longitudinal bias layer 18 serving as the first antiferromagnetic layer are laminated on the free magnetic layer 15, and thus the magnetization direction of the free magnetic layer 15 is oriented in the X direction by exchange coupling with the other antiferromagnetic layer 17 and the longitudinal bias layer 18.

In this embodiment, the total thickness t4 of the region of the longitudinal bias layer 18, which is overlapped with the bottom 21b of the recess 21, and the other antiferromagnetic layer 17 is more than 0 and 30 Å or less so that transformation from the ordered structure to the ordered structure does not occur in the regions of the longitudinal base layer 18 and the other antiferromagnetic layer 17, which are located below the bottom 21b of the recess 21, by the second magnetic field annealing, thereby causing no exchange coupling magnetic field.

Therefore, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is overlapped with the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed.

Therefore, the track width of the thin film magnetic element is determined by the width dimension Tw of the bottom 21b of the recess 21. In the present invention, the recess 21 can be formed only by cutting the longitudinal bias layer 18 having a uniform thickness with reactive ion etching (RIE) or ion milling perpendicularly to the surface 11a of the substrate 11. Therefore, the recess 21 with an accurate width dimension Tw can be formed. Namely, the track width Tw of the thin film magnetic element can be precisely defined.

In manufacturing method in which after the free magnetic layer 15 is deposited, the other antiferromagnetic layer 17 is laminated without the nonmagnetic layer 16, the magnetization direction of the free magnetic layer 15 can easily be pinned perpendicularly to the magnetization direction of the pinned magnetic layer 13.

Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 19 can exhibit the same effect as the thin film magnetic element shown in FIG. 1 except the spin filter effect exhibited by the thin film magnetic element of the first embodiment shown in FIG. 1.

FIG. 20 is a sectional view of the thin film magnetic element according to the fourteenth embodiment of the present invention, as viewed from the ABS side.

The method of manufacturing the thin film magnetic element shown in FIG. 20 is substantially the same as the thirteenth embodiment except that the recess 21 is formed by cutting off the portion of the longitudinal layer 18, which is held between the resist layers 20, by ion milling or reactive ion etching (RIE) perpendicularly to the surface 11a of the substrate 11 so that the bottom 21b of the recess 21 is located in the other antiferromagnetic layer 17.

In this embodiment, the thickness t5 of the region of the other antiferromagnetic layer 17, which is located below the bottom 21b of the recess 21, is more than 0 and 30 Å or less so that transformation from the ordered structure to the ordered structure does not occur in the region of the other antiferromagnetic layer 17, which is located below the bottom 21b of the recess 21, by magnetic field annealing, thereby causing no exchange coupling magnetic field.

Therefore, only in both end portions D in the track width direction, except in the portion overlapped with the bottom 21b of the recess 21, the magnetization direction of the free magnetic layer 15 is pinned by exchange coupling with the longitudinal bias layer 18.

In the portion E of the free magnetic layer 15, which is located below the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed. Therefore, the track width of the thin film magnetic element is determined by the width dimension Tw of the recess 21.

The recess 21 can be formed only by cutting the longitudinal bias layer 18 having a uniform thickness with reactive ion etching (RIE) or ion milling perpendicularly to the surface 11a of the substrate 11. Therefore, the recess 21 with an accurate width dimension Tw can be formed. Namely, the track width Tw of the thin film magnetic element can be precisely defined.

In the manufacturing method in which the recess 21 is formed so that the bottom 21b of the recess 21 is located in the other antiferromagnetic layer 17, like in the fourth embodiment, the magnetization direction of the free magnetic layer 15 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 20 can exhibit effects equivalent to the other effects of the thin film magnetic element of the thirteenth embodiment shown in FIG. 19.

FIG. 4 is a sectional view of the thin film magnetic element according to the fourth embodiment of the present invention, as viewed from the ABS side.

The method of manufacturing the thin film magnetic element is substantially the same as the first embodiment shown in FIGS. 28 to 31 except that the free magnetic layer 31 is formed as a so-called synthetic ferrimagnetic free magnetic layer comprising the first and second free magnetic layers 31a and 31c which have magnetic movements of different magnitudes per unit area and which are laminated with the nonmagnetic intermediate layer 31b provided therebetween.

The first and second free magnetic layers 31a and 31c are made of a ferromagnetic material, for example, a NiFe alloy, Co, a CoNiFe alloy, a CoFe alloy, a CoNi alloy, or the like. Particularly, the NiFe alloy is preferably used.

The nonmagnetic intermediate layer 31b is made of a nonmagnetic material, for example, an alloy of at least one element of Ru, Rh, Ir, Cr, Re, and Cu. Particularly, Ru is preferably used.

In this embodiment, an anti-diffusion layer made of Co or the like may be formed between the first free magnetic layer 31a and the nonmagnetic material layer 14. The anti-diffusion layer prevents mutual diffusion between the first free magnetic layer 31a and the nonmagnetic material layer 14.

The first and second free magnetic layers 31a and 31c are formed to have different magnetic moments per unit area. The magnetic moment per unit area is represented by the product of the saturation magnetization (Ms) and the thickness (t). Therefore, for example, when the first and second free magnetic layers 31a and 31c are formed by using the same material to have different thicknesses, the first and second free magnetic layers 31a and 31c have different magnetic moments per unit area.

When the anti-diffusion layer of Co or the like is formed between the first free magnetic layer 31a and the nonmagnetic material layer 14, the total magnetic moment per unit area of the first free magnetic layer 31a and the anti-diffusion layer is preferably different from the magnetic moment per unit area of the second free magnetic layer 31c.

The thickness tf2 of the second free magnetic layer 31c is preferably in the range of 0.5 to 2.5 nm. Also, the thickness tf1 of the first free magnetic layer 31a is preferably in the range of 2.5 to 4.5 nm, more preferably in the range of 3.0 to 4.0 nm, and most preferably in the range of 3.5 to 4.0 nm. With the thickness tf1 of the first free magnetic layer 31a out of the above range, the rate of magnetoresistance change of the spin valve thin film magnetic element cannot be increased.

In FIG. 4, the first free magnetic layer 31a and the second free magnetic layer 31c having different magnetic moments per unit area are laminated with the nonmagnetic intermediate layer 31b provided therebetween to form the single free magnetic layer 31. The first and second free magnetic layers 31a and 31c are in the ferrimagnetic state in which the magnetization directions thereof are 180° different in an antiparallel state. In this case, the magnetization direction the free magnetic layer having a higher magnetic moment per unit area, for example, the first free magnetic layer 31a, is oriented in the direction of the magnetic field produced from the longitudinal bias layer 18, the magnetization direction of the second free magnetic layer 31c being oriented in the 180° opposite direction.

When the first and second free magnetic layers 31a and 31c are in the ferrimagnetic state in which the magnetization directions thereof are 180° different in an antiparallel state, an effect equivalent to the effect of decreasing the thickness of the free magnetic layer 31 can be obtained to decrease saturation magnetization. Therefore, magnetization of the free magnetic layer 31 easily varies to improve the magnetic field sensitivity of a magnetoresistive element.

The direction of the synthetic magnetic moment per unit area corresponding to the total of the magnetic moments per unit area of the first and second free magnetic layers 31a and 31c coincides with the magnetization direction of the free magnetic layer 31.

However, only the magnetization direction of the first free magnetic layer 31a contributes to output based on the relation to the magnetization direction of the pinned magnetic layer 13.

When the first and second free magnetic layers have different magnetic thicknesses, the spin flop magnetic field of the free magnetic layer 31 can be increased.

The spin flop magnetic field represents the magnitude of the external magnetic field applied to two magnetic layers having antiparallel magnetization directions when the antiparallel state of the magnetization directions is broken.

FIG. 13 is a conceptual drawing of a hysteresis loop of the free magnetic layer 31. The M-H curve shown in FIG. 13 shows changes in magnetization M of the free magnetic layer having the construction shown in FIG. 4 with the external magnetic field applied in the track width direction.

In FIG. 13, arrow F1 represents the magnetization direction of the first free magnetic layer, and arrow F2 represents the magnetization direction of the second free magnetic layer.

As shown in FIG. 13, with the small external magnetic field applied, the first and second free magnetic layers are in the ferrimagnetic state in which the directions of the arrows F1 and F2 are antiparallel, while with the external magnetic field H of magnitude over a predetermined value, RKKY coupling between the first and second free magnetic layers is broken to fail to maintain the ferrimagnetic state. This is referred to as "spin flop transfer". The spin flop magnetic field represents the magnitude of the external magnetic field with which the spin flop transfer occurs, which is shown by Hsf in FIG. 13. In FIG. 13, HcF denotes the coercive force of magnetization of the free magnetic layer.

When the first and second free magnetic layers 31a and 31c are formed to have different magnetic moments per unit area, the spin flop magnetic field Hsf of the free magnetic layer 31 is increased to extend the range of a magnetic field in which the free magnetic layer 31 can maintain the ferrimagnetic state, thereby increasing stability of the ferrimagnetic state of the free magnetic layer 31.

In this embodiment, at least one of the first and second free magnetic layers 31a and 31c is preferably made of a magnetic material having the following composition.

The composition is represented by the formula CoFeNi in which the composition ratio of Fe is 9 atomic % to 17 atomic %, the composition ratio of Ni is 0.5 atomic % to 10 atomic %, and the balance is the composition ratio of Co.

As a result, the exchange coupling magnetic field produced between the first and second free magnetic layers 31a and 31c by RKKY interaction can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

Both the first and second free magnetic layers 31a and 31c are preferably made of the CoFeNi alloy. This is because a high spin flop magnetic field can be stably obtained, and the first and second free magnetic layers 31a and 31c can be appropriately magnetized in the antiparallel state.

In the above-described composition range, the magnetostriction of the first and second free magnetic layers 31a and 31c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 31, and appropriately suppress decreases in the amount of resistance change ($\Delta R$) and the rate of resistance change ($\Delta R/R$) due to Ni diffusion between the free magnetic layer 31 and the nonmagnetic material layer 14.

In this embodiment, the magnetization direction of the free magnetic layer 31 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 4 can exhibit effects equivalent to the other effects of the thin film magnetic element of the first embodiment shown in FIG. 1.

FIG. 5 is a sectional view of the thin film magnetic element according to the fifth embodiment of the present invention, as viewed from the ABS side.

The method of manufacturing the thin film magnetic element is substantially the same as the method of manufacturing the thin film magnetic element shown in FIG. 4 except that when the free magnetic layer 31 is formed as a so-called synthetic ferrimagnetic free magnetic layer comprising the first and second free magnetic layers 31a and 31c which have magnetic movements of different magnitudes per unit area which are laminated with the nonmagnetic intermediate layer 31b provided therebetween, the intermediate layer 91 is provided between the first free magnetic layer 31a and the nonmagnetic material layer 14. The intermediate layer 91 is preferably made of a CoFe alloy or a Co alloy. Particularly, the CoFe alloy is preferably used.

By forming the intermediate layer 91, it is possible to prevent diffusion of metal elements at the interface with the nonmagnetic material layer 14, and improve the amount of resistance change ($\Delta R$) and the rate of resistance change ($\Delta R/R$). The intermediate layer 91 is formed to about 5 Å.

Particularly, when the first free magnetic layer 31a in contact with the nonmagnetic material layer 14 is made of the CoFeNi alloy having the above composition ratio, diffusion of metal elements between the first free magnetic layer 31a and the nonmagnetic material layer 14 can be appropriately suppressed. Therefore, the necessity for forming the intermediate layer 91 made of a CoFe alloy or Co between the first free magnetic layer 31a and the nonmagnetic material layer 14 is lower than the case in which the first free magnetic layer 31a is made of a magnetic material not containing Co, such as a NiFe alloy or the like.

However, even when the first free magnetic layer 31a is made of the CoFeNi alloy, the intermediate layer 91 made of a CoFe alloy or Co is preferably provided between the first free magnetic layer 31a and the nonmagnetic material layer 14 from the viewpoint that diffusion of metal elements between the first free magnetic layer 31a and the nonmagnetic material layer 14 can be securely prevented.

When the intermediate layer 91 is provided between the first free magnetic layer 31a and the nonmagnetic material layer 14, and at least one of the first and second free magnetic layers 31a and 31c is made of the CoFeNi alloy, the CoFeNi alloy preferably has a Fe composition ratio of 7 atomic % to 15 atomic %, a Ni composition ratio of 5 atomic % to 15 atomic %, and a Co composition ratio as the balance.

In this case, the exchange coupling magnetic field produced by RKKY interaction between the first and second free magnetic layers 31a and 31c can be strengthened. Specifically, the magnetic field with which the antiparallel state is broken, i.e., the spin flop magnetic field (Hsf), can be increased to about 293 (kA/m).

Therefore, magnetizations in both side portions of the first and second free magnetic layers 31a and 31c located below the longitudinal bias layer 18 can be pinned in the antiparallel state to suppress the occurrence of side reading.

In the present invention, both the first and second free magnetic layers 31a and 31c are preferably made of the CoFeNi alloy. This is because a high spin flop magnetic field can be stably obtained.

In the above-described composition range, the magnetostriction of the first and second free magnetic layers 31a and 31c can be kept in the range of $-3 \times 10^{-6}$ to $x\ 10^{-6}$, and the coercive force can be decreased to 790 (A/m) or less. Furthermore, the soft magnetic properties of the free magnetic layer 31 can be improved.

FIG. 6 is a sectional view of the thin film magnetic element according to the sixth embodiment of the present invention, as viewed from the ABS side.

The method of manufacturing the thin film magnetic element is substantially the same as the fourth embodiment except that the multilayer film 3A does not include the other antiferromagnetic layer.

In this embodiment, the nonmagnetic layer 16 is the uppermost layer of the multilayer film A3, and thus the surface of the nonmagnetic layer 16 is oxidized in first magnetic field annealing of the multilayer film A3. Therefore, the surface of the nonmagnetic layer 16 is cut off by 20 Å by ion milling to remove the oxidized portion before the longitudinal bias layer 18 is deposited.

In this embodiment, the magnetization direction of the free magnetic layer 31 can easily be pinned perpendicularly to the magnetization direction of the pinned magnetic layer 13, and thus the track width Tw of the thin film magnetic element can be precisely defined. Also, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 6 can exhibit effects equivalent to the other effects of the thin film magnetic element of the fourth embodiment shown in FIG. 4.

In the thin film magnetic elements of the second, third, thirteenth and fourteenth embodiments, the free magnetic layer 15 may be formed as a synthetic ferrimagnetic free magnetic layer.

FIG. 21 is a sectional view of the thin film magnetic element according to the fifteenth embodiment of the present invention, as viewed from the ABS side.

This embodiment is different from the first embodiment in that the nonmagnetic layer 16 and the other antiferromagnetic layer 17 are not laminated on the free magnetic layer 15 to form a multilayer film A4 comprising the free magnetic layer 15 in the uppermost layer, the multilayer film A4 is annealed in the first magnetic field, and then the longitudinal bias layer is deposited on the multilayer film A4.

In this embodiment, the free magnetic layer 15 is the uppermost layer of the multilayer film A4, and thus the surface of the free magnetic layer 15 is oxidized in first magnetic field annealing of the multilayer film A4. Therefore, the surface of the free magnetic layer 15 is cut off by 20 Å by ion milling to remove the oxidized portion before the longitudinal bias layer 18 is deposited. The thickness of the free magnetic layer 15 greatly influences the magnetoresistive effect, and thus the free magnetic layer 15 is preferably deposited to a thickness larger than the thickness in a final product by a thickness to be cut off by ion milling, for example, a thickness of about 20 Å. Alternatively, the free magnetic layer 15 may be again deposited to a thickness corresponding to the thickness cut off by ion milling, and then longitudinal bias layer 18 may be deposited on the free magnetic layer.

In the thin film magnetic element shown in FIG. 21, the longitudinal bias layer 18 serving as the first antiferromagnetic layer is laminated on the free magnetic layer 15, and thus the magnetization direction of the free magnetic layer 15 is oriented in the X direction by exchange coupling with the longitudinal bias layer 18.

In this embodiment, the thickness t6 of the region E of the longitudinal bias layer 18, which is located below the bottom 21b of the recess 21, is more than 0 and 30 Å or less so that transformation from the ordered structure to the ordered structure does not occur in the region E of the longitudinal bias layer 18, which is located below the bottom 21b of the recess 21, by magnetic field annealing, thereby causing no exchange coupling magnetic field.

Therefore, only in both end portions D in the track width direction except the portion located below the bottom 21b of the recess 21, the magnetization direction of the free magnetic layer 15 is pinned by exchange coupling with the longitudinal bias layer 18.

In the portion E of the free magnetic layer 15, which is located below the bottom 21b of the recess 21, with no external magnetic field applied, the magnetization direction is oriented in the X direction, following both end portions D in which the magnetization direction is pinned by exchange coupling with the longitudinal bias layer 18. While with the external magnetic field applied, the magnetization direction is changed.

Therefore, the track width of the thin film magnetic element is determined by the width dimension Tw of the recess 21. The recess 21 can be formed only by cutting the longitudinal bias layer 18 having a uniform thickness by reactive ion etching (RIE) or ion milling perpendicularly to the surface 11a of the substrate 11. Therefore, the recess 21 having a precise width dimension Tw can be formed, i.e., the track width of the thin film magnetic element can be precisely defined.

In this embodiment, the multilayer film A4 is subjected to first magnetic field annealing to orient the exchange anisotropic magnetic field of the second antiferromagnetic layer 12 in the Y direction, and then the longitudinal bias layer 18 is deposited, followed by annealing in the second magnetic field in the X direction.

In the second magnetic field annealing, the second heat treatment temperature is set to a temperature lower than the block temperature at which the exchange anisotropic magnetic field of the second antiferromagnetic layer 12 is lost, and the second magnitude of the magnetic field is set to be lower than the exchange anisotropic magnetic field of the second antiferromagnetic layer 12. As a result, even when the second antiferromagnetic layer 12 and the longitudinal bias layer 18 are formed by using antiferromagnetic materials having the same composition, the exchange anisotropic magnetic field of the longitudinal bias layer 18 can be oriented in the X direction with the exchange anisotropic magnetic field of the second antiferromagnetic layer 12 being oriented in the Y direction.

The thin film magnetic element shown in FIG. 21 can exhibit effects the same effects as the thin film magnetic element of the thin film magnetic element shown in FIG. 1 except the spin filter effect exhibited by the thin film magnetic element of the first embodiment shown in FIG. 1.

In the thin film magnetic element of this embodiment, the free magnetic layer 15 may be formed as a synthetic ferrimagnetic free magnetic layer.

FIGS. 32 to 37 are sectional views illustrating the method of manufacturing the thin film magnetic element of the seventh embodiment of the present invention shown in FIG. 7.

Figure 32:
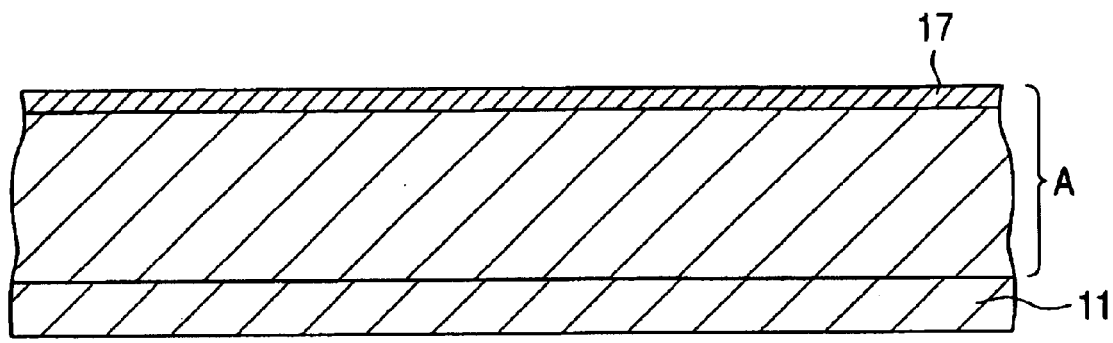
FIG. 32 is a sectional view illustrating a step of a method of manufacturing a thin film magnetic element according to a twenty-second embodiment of the present invention.

First, as shown in FIG. 32, the same multilayer film A as FIG. 28 is deposited on the substrate 11. Although FIGS. 32 to 37 show only the other antiferromagnetic layer 17 in the uppermost layer of the multilayer film A for the sake of ease of seeing, the second antiferromagnetic layer 12, the pinned magnetic layer 13, the nonmagnetic material layer 14, the free magnetic layer 15 and the nonmagnetic layer 16 are laminated in turn from the substrate side below the other antiferromagnetic layer 17 like in FIG. 28.

The second antiferromagnetic layer 12, the pinned magnetic layer 13, the nonmagnetic material layer 14, the free magnetic layer 15, the nonmagnetic layer 16 and the other antiferromagnetic layer 17 are formed by the thin film forming process such as the sputtering process, vaporization process, or the like.

Figure 33:
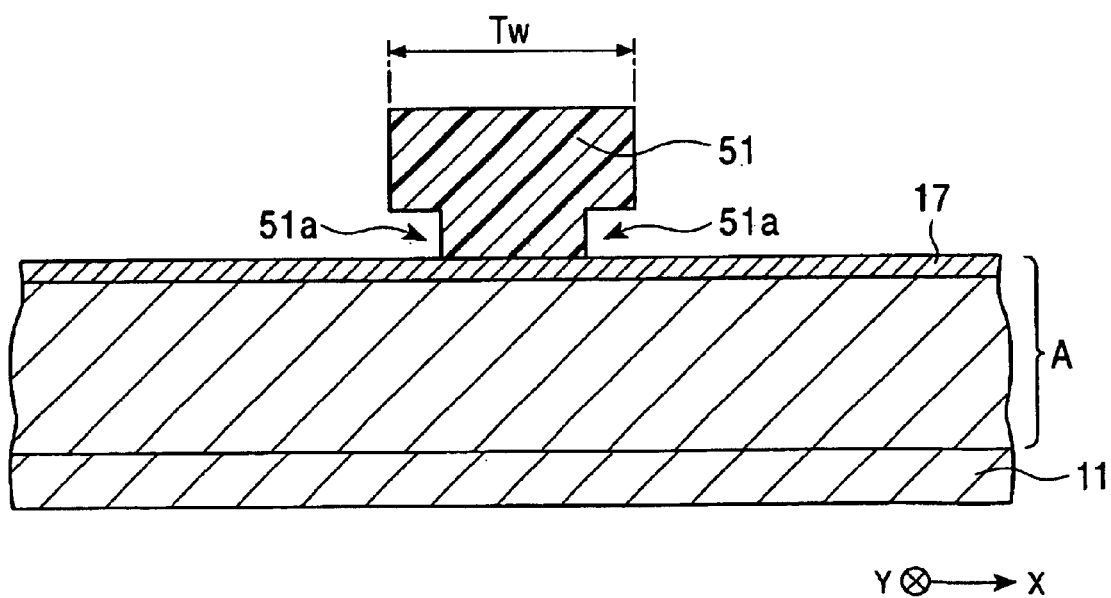
FIG. 33 is a sectional view illustrating the step next to the step shown in FIG. 32 in the method of manufacturing the thin film magnetic element of the present invention.

Next, a lift off resist layer 51 is formed on the multilayer film A. As shown in FIG. 33, the resist layer 51 has undercuts 51*a* formed on the lower side thereof. In the multilayer film A, the region of the track width Tw is completely covered with the resist layer 51.

Next, first magnetic field annealing of the multilayer film A is preformed at the first heat treatment temperature in the magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

Figure 34:
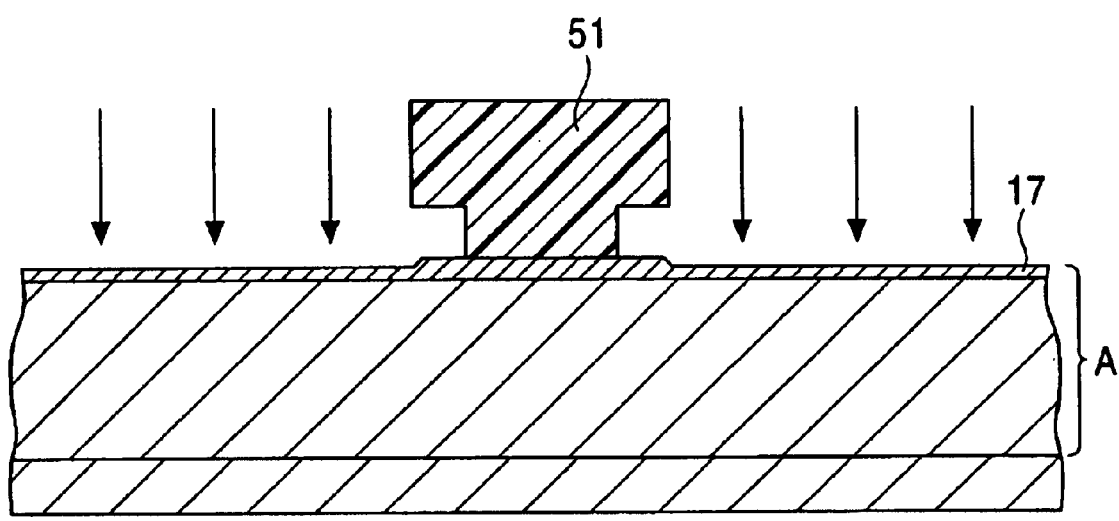
FIG. 34 is a sectional view illustrating the step next to the step shown in FIG. 33 in the method of manufacturing the thin film magnetic element of the present invention.

In the first magnetic field annealing of the multilayer film A, the region of the other antiferromagnetic layer 17, which is not masked with the resist layer 51, is oxidized by a thickness of 10 to 20 Å from the surface thereof. Therefore, as shown in FIG. 34, the surface of the other antiferromagnetic layer 17 is cut by 20 Å by ion milling perpendicularly to the surface of the other antiferromagnetic layer 17 to remove the oxidized portion. In this embodiment, the other antiferromagnetic layer 17 is deposited on the uppermost layer of the multilayer film A, and thus oxidation of the nonmagnetic layer 16 and the free magnetic layer 15 can be prevented.

Figure 35:
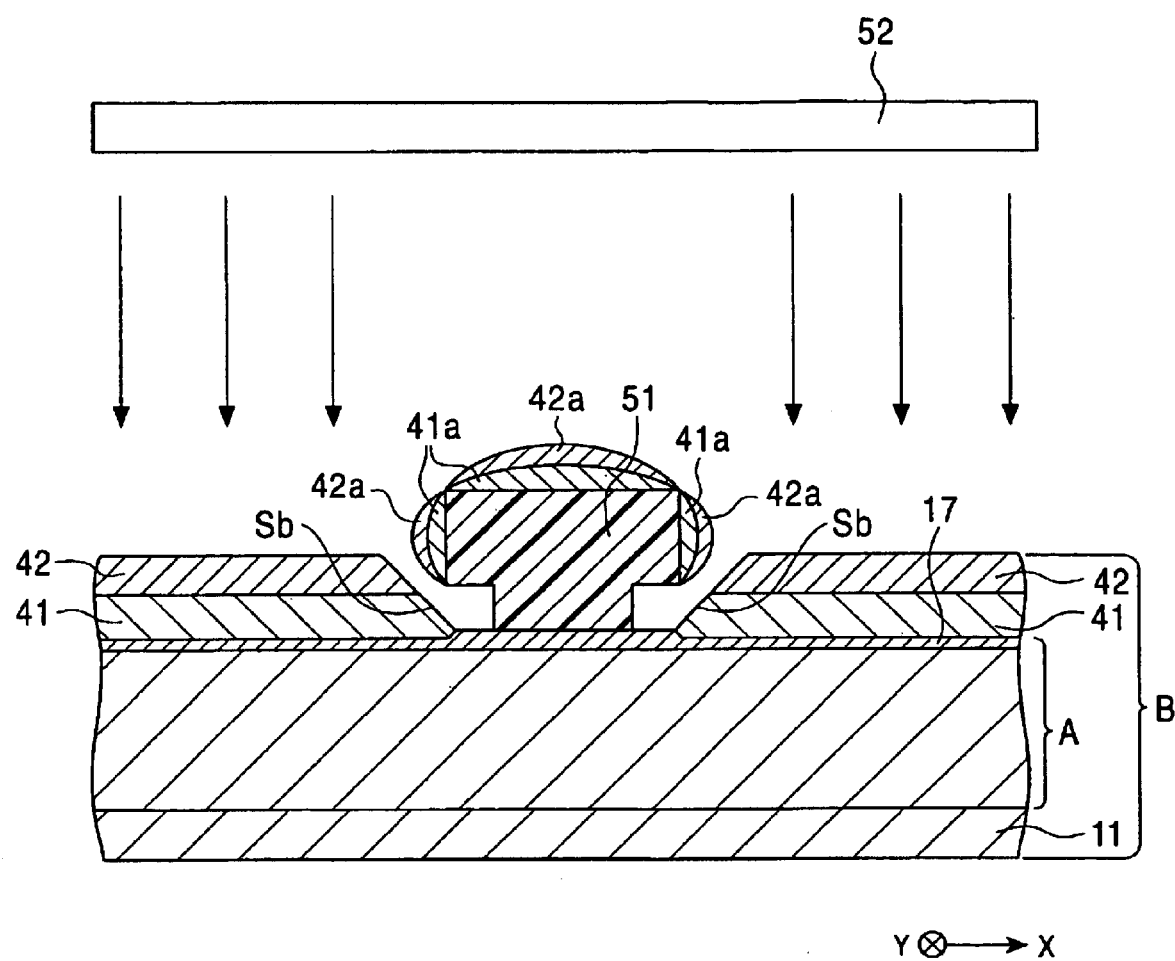
FIG. 35 is a sectional view illustrating the step next to the step shown in FIG. 34 in the method of manufacturing the thin film magnetic element of the present invention.

Furthermore, in the step shown in FIG. 35, the longitudinal bias layers 41 as the first antiferromagnetic layers, and the electrode layers 42 are deposited on the multilayer film A. In this embodiment, the longitudinal bias layers 41 and the electrode layers 42 are preferably deposited by a sputtering process such as an ion beam sputtering process, a long slow sputtering process, or a collimation sputtering process.

As shown in FIG. 35, in this embodiment, the substrate on which the multilayer film A is formed is placed perpendicularly to a target 52 having the same composition as the longitudinal bias layers 41 so that the longitudinal bias layers 41 are formed perpendicularly to the multilayer film A by, for example, an ion beam sputtering process.

Sputtered particles are less deposited on the regions which are covered with both ends of the lift off resist layer 51. Therefore, the longitudinal bias layers 41 and the electrode layers 42 are deposited to a small thickness on the regions covered with both ends of the lift off resist layer 51, and thus the thickness dimensions of the longitudinal bias layers 41 and the electrode layers 42 decrease in the portions Sb on both sides of the track.

As shown in FIG. 35, a layer 41*a* having the same composition as the longitudinal bias layers 41, and layers 42*a* having the same composition as the electrode layers 42 are also formed on the resist layer 51. Like the second antiferromagnetic layer 12 and the other antiferromagnetic layer 17, the longitudinal bias layers 41 comprise a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

The thickness of both ends of the longitudinal bias layers 41 is 80 to 300 Å, for example 200 Å.

The electrode layers 42 are formed by depositing, for example, Au, W, Cr, Ta, or the like.

The multilayer film B1 formed up to the electrode layers 42 is subjected to second magnetic field annealing at the second heat treatment temperature in the magnetic field of second magnitude in the X direction to produce an exchange anisotropic magnetic field in the longitudinal bias layers 41, pinning the magnetization direction of the free magnetic layer 15 in the X direction. In this embodiment, the second heat treatment temperature is 250° C., and the second magnitude of the magnetic field is 24 k (A/m).

In this embodiment, the nonmagnetic layer 16 is deposited in contact with the upper surface of the free magnetic layer 15. In this case, the magnetization direction of the free magnetic layer 15 is oriented in the X direction by RKKY coupling with the longitudinal bias layers 41 through the nonmagnetic layer 16.

After the second annealing, the resist layer is removed to obtain the thin film magnetic element shown in FIG. 7.

The exchange anisotropic magnetic field of the longitudinal bias layers 41 is not produced until the step of second magnetic field annealing. Therefore, in order to orient the exchange anisotropic magnetic field of the longitudinal bias layers 41 in the X direction with the exchange anisotropic magnetic field of the second antiferromagnetic layer 12 being oriented in the Y direction, the second heat treatment temperature is set to a temperature lower than the blocking temperature at which the exchange coupling magnetic field of the second antiferromagnetic layer is lost, and the second magnitude of the magnetic field is set to be lower than that of the exchange anisotropic magnetic field of the second antiferromagnetic layer. Also, even when the second antiferromagnetic layer 12 and the longitudinal bias layers 41 are formed by using antiferromagnetic materials having the same composition, the second magnetic field annealing under these conditions can orient the magnetization direction of the longitudinal bias layers 41 in the X direction with the magnetization direction of the exchange anisotropic magnetic field of the second antiferromagnetic layer 12 being oriented in the Y direction.

Namely, in the present invention, the magnetization direction of the free magnetic layer 15 can easily be pinned perpendicularly to the magnetization direction of the pinned magnetic layer 13.

Like in this embodiment, when the thickness t7 of the other antiferromagnetic layer 17 is more than 0 and 30 Å or less, in the region in which the longitudinal bias layers 41 are not formed, the disordered structure is not transformed to the ordered structure by second magnetic field annealing, thereby causing no exchange coupling magnetic field.

Namely, only in both end portions D in the track width direction, which are overlapped with the longitudinal bias layers 41, the magnetization direction of the free magnetic layer 15 is pinned by RKKY coupling with the longitudinal bias layers 41.

In the portion E of the free magnetic layer 15, which is not overlapped with the longitudinal bias layers 41, with no external magnetic field applied, the magnetization direction is oriented in the X direction, following both end portions D in which the magnetization direction is pinned by RKKY coupling with the longitudinal bias layers 41. While with the external magnetic field applied, the magnetization direction is changed. Therefore, the distance between the longitudinal bias layers 41 in the track width direction corresponds to the track width Tw of the thin film magnetic element.

Although, in this embodiment, the second magnetic field annealing is performed after the electrode layers 42 are deposited on the longitudinal bias layers 41, the second magnetic field annealing may be performed after the longitudinal bias layers 41 are laminated, and then the electrode layers 42 may be laminated on the longitudinal bias layers 41.

Although, in this embodiment, the second antiferromagnetic layer 12 is laminated directly on the substrate 11, the antiferromagnetic layer 12 may be laminated on the substrate 11 with an underlying layer provided therebetween and made of Ta or the like.

The thin film magnetic element shown in FIG. 7 is described below.

When the longitudinal bias layers 41 are deposited on the multilayer film A through the nonmagnetic layer 16, the magnetization direction of the free magnetic layer 15 is oriented by RKKY interaction with the longitudinal bias layers 41. The RKKY interaction exerts only on the regions D of the magnetic layer, which are located directly below the antiferromagnetic layer (the longitudinal bias layers 41) having a thickness having antiferromagnetism, while it does not exert on the region E deviating from the regions D directly below the antiferromagnetic layers having a thickness having antiferromagnetism.

Therefore, the region of the track width (optical track width) Tw set as the space dimension between the longitudinal bias layers 41 substantially contributes to reproduction of a recording magnetic field, and functions as the sensitive zone exhibiting the magnetoresistive effect. Namely, in the thin film magnetic element of this embodiment, the optical track width is equal to the magnetic track width, and thus the thin film magnetic element can comply with the higher recording density of a recording medium in comparison to the hard bias system which causes difficulties in controlling the magnetic track width due to the presence of the dead zones.

Also, no dead zone occurs in the region of the track width (optical track width) Tw set at the time of formation of the thin film magnetic element to suppress a decrease in reproduced output when the optical track width Tw of the thin film magnetic element is decreased for complying with a higher recording density.

However, in this embodiment, the thickness dimension of the longitudinal bias layers 41 decreases in the portions Sb at both sides of the track. Therefore, in the portions Sb at both sides of the track, the effect of exchange coupling between the free magnetic layer 15 and the longitudinal bias layers 41 decreases. As a result, in the portions Sb at both sides of the track, the magnetization direction of the free magnetic layer 15 shown in FIG. 7 is not completely pinned in the X direction and is thus changed by applying the external magnetic field.

Particularly, when the track is narrowed for improving the recording density of the magnetic recording medium, not only information on a magnetic recording track to be read within the track width Tw but also information on the adjacent magnetic recording track are read by the portions Sb at both sides of the track, i.e., side reading possibly occurs.

In the present invention, in the thin film magnetic element, the side end surfaces S of the multilayer film can be formed perpendicularly to the surface of the substrate to suppress a variation in the length of the free magnetic layer 15 in the width direction.

Also, like in this embodiment, when the magnetization direction of the free magnetic layer 15 is oriented by RKKY interaction with the longitudinal bias layers 41, the exchange coupling force can be strengthened as compared with the case of direct contact between the longitudinal bias layers 41 and the free magnetic layer 15.

In this embodiment, when the nonmagnetic layer 16 is made of a conductive material, the nonmagnetic layer 16 can be caused to function as the backed layer having the spin filter effect.

When the backed layer (the nonmagnetic layer 16) having the spin filter effect is provided in contact with the free magnetic layer 15, the position at the center height of a sensing current flowing through the laminate can be moved to the backed layer Side in comparison to a case in which the backed layer is not provided. Namely, the position at the center height of the sensing current deviates from the free magnetic layer 15 to decrease the intensity of the sensing current magnetic field at the position of the free magnetic layer 15, thereby decreasing the influence of the sensing current magnetic field on variable magnetization of the free magnetic layer 15. Therefore, asymmetry can be decreased.

In this embodiment, the other antiferromagnetic layer 17 comprises a single layer film or multilayer film made of, for example, a semi-metal Heusler alloy such as NiMnSb, PtMnSb, or the like so that the other antiferromagnetic layer 17 can be made to function as the specular reflection layer. The other antiferromagnetic layer 17 functioning as the specular reflection layer forms a potential barrier at the interface between the antiferromagnetic layer 17 and the nonmagnetic layer 16 so that the spin-up conduction electrons moving in the free magnetic layer 15 and the nonmagnetic layer 16 can be reflected while maintaining the spin state to further extend the mean free path of the spin-up conduction electrons. In other words, the so-called specular effect can be exhibited to further increase the difference between the mean free paths of the spin-up conduction electrons and the spin-down conduction electrons.

Namely, the mean free path of all conduction electrons can be greatly changed by the action of the external magnetic field to significantly increase the rate of change ($\Delta R/R$) in magnetoresistance of the spin valve thin film magnetic element.

When the free magnetic layer 15 is relatively thin, the difference between the mean free paths of the spin-up and spin-down conduction electrons is more effectively increased by the spin filter effect and the specular reflection effect.

With the free magnetic layer 15 having a thickness of less than 15 Å, the free magnetic layer 15 cannot be easily formed to function as a ferromagnetic material layer, thereby failing to obtain the sufficient magnetoresistive effect.

With the free magnetic layer 15 having a thickness of over 45 Å, the number of the spin-up conduction electrons scattered before reaching the other antiferromagnetic layer 17 (the specular reflection layer) is increased to undesirably decrease the rate of change in the rate of resistance change with the specular effect.

In FIG. 7, the first pinned magnetic layer 13a and the second pinned magnetic layer 13c having different magnetic moments per unit area are laminated with the nonmagnetic intermediate layer 13b provided therebetween to form the single pinned magnetic layer 13.

The first pinned magnetic layer 13a is formed in contact with the antiferromagnetic layer 12, and annealing in a magnetic field produces an exchange anisotropic magnetic field by exchange coupling at the interface between the first pinned magnetic layer 13a and the antiferromagnetic layer 12 to pin the magnetization direction of the first pined magnetic layer 13a in the Y direction shown in the drawing. When the magnetization direction of the first pinned magnetic layer 13a is pinned in the Y direction, the magnetization direction of the second pinned magnetic layer 13c opposed to the first pinned magnetic layer 13a with the nonmagnetic intermediate layer 13b is pinned in antiparallel with the magnetization direction of the first pinned magnetic layer 13a.

The direction of the synthetic magnetic moment per unit area corresponding to the total of the magnetic moments per unit area of the first and second pinned magnetic layers 13a and 13c coincides with the magnetization direction of the pinned magnetic layer 13.

In this way, the first and second pinned magnetic layers 13a and 13c are in the ferrimagnetic state in which the magnetization directions thereof are antiparallel to each other. Therefore, the magnetization directions of the first and second pinned magnetic layers 13a and 13c are pinned by each other to stably pin the magnetization direction of the whole pinned magnetic layer 13 in a predetermined direction.

In FIG. 7, the first and second pinned magnetic layers 13a and 13c are formed by using the same material to have different thicknesses so that both layers have different magnetic moments per unit area.

Each of the first and second pinned magnetic layers 13a and 13c is made of a ferromagnetic material, for example, a NiFe alloy, Co, a CoNiFe alloy, a CoFe alloy, a CoNi alloy, or the like. Particularly, the NiFe alloy or Co is preferably used. The first and second pinned magnetic layers 13a and 13c are preferably made of the same material.

The nonmagnetic intermediate layer 13b is made of a nonmagnetic material, for example, an alloy of at least one element of Ru, Rh, Ir, Cr, Re, and Cu. Particularly, Ru is preferably used.

When the pinned magnetic layer 13 comprises the first and second pinned magnetic layers 13a and 13c which are laminated with the nonmagnetic intermediate layer 13b provided therebetween in the thickness direction, the magnetization directions of the first and second pinned magnetic layers 13a and 13c are pinned by each other to strongly pin the magnetization direction of the whole pinned magnetic layer 13 in a predetermined direction. Namely, the obtained exchange coupling magnetic field Hex between the second antiferromagnetic layer 12 and the pinned magnetic layer 13 is a high value of, for example, 80 to 160 kA/m. Therefore, after first magnetic field annealing for orienting the magnetization direction of the second antiferromagnetic layer 12 in the height direction, the magnetization direction of the pinned magnetic layer 13 can be prevented from being inclined in the track width direction and pinned by second magnetic field annealing for orienting the magnetization direction of the longitudinal bias layers 41 in the track width direction to increase the longitudinal bias magnetic field of the longitudinal bias layers 41.

In this embodiment, a demagnetizing field (dipole magnetic field) due to pinned magnetization of the pinned magnetic layer 13 can be canceled by canceling the static magnetic field coupling between the first and second pinned magnetic layers 13a and 13c. Therefore, contribution to variable magnetization of the free magnetic layer 15 from the demagnetizing field (bipolar magnetic field) due to pinned magnetization of the pinned magnetic layer 13 can be decreased.

Therefore, the direction of variable magnetization of the free magnetic layer 15 can be easily corrected in the desired direction, thereby obtaining the thin film magnetic element having excellent symmetry with low asymmetry.

Also, the demagnetizing field (bipolar magnetic field) Hd due to pinned magnetization of the pinned magnetic layer 13 has a nonuniform distribution in which the demagnetizing field is high at the ends, and low at the center in the direction of the element height. Therefore, in some cases, the free magnetic layer 15 is inhibited from being put into the single magnetic domain state. However, by using the above laminated structure for the pinned magnetic layer 13, the demagnetizing field Hd can be made substantially zero Hd=0, thereby preventing the occurrence of Barkhausen noise due to the nonuniformity in magnetization which is caused by a magnetic domain wall formed in the free magnetic layer.

FIG. 24 is a sectional view of the thin film magnetic element according to the eighteenth embodiment of the present invention, as viewed from the ABS side.

The method of manufacturing the thin film magnetic element is substantially the same as the seventh embodiment shown in FIGS. 32 to 35.

This embodiment is different from the seventh embodiment in that after the free magnetic layer 15 is deposited, the other antiferromagnetic layer 17 is laminated directly on the free magnetic layer 15 without the non magnetic layer 16 to form the multilayer film A1, the multilayer film A1 is annealed in the first magnetic field, and then the longitudinal bias layers 41 are deposited on the multilayer film A1.

In the thin film magnetic element shown in FIG. 24, the other antiferromagnetic layer 17 and the longitudinal bias layers 41 serving as the first antiferromagnetic layer are laminated on the free magnetic layer 15, and thus the magnetization direction of the free magnetic layer 15 is oriented in the X direction by exchange coupling with the other antiferromagnetic layer 17 and the longitudinal bias layers 41.

In this embodiment, the thickness t8 of the other antiferromagnetic layer 17 is more than 0 and 30 Å or less so that transformation from the ordered structure to the ordered structure does not occur in the region E which is not overlapped with the longitudinal bias layers 41, by the second magnetic field annealing, thereby causing no exchange coupling magnetic field.

Therefore, only in both end portions D in the track width direction, which are overlapped with the longitudinal bias layers 41, the magnetization direction of the free magnetic layer 15 is pinned by exchange coupling with the longitudinal bias layers 41.

In the portion E of the free magnetic layer 15, which is not overlapped with the longitudinal bias layers 41, with no external magnetic field applied, the magnetization direction is oriented in the X direction, following both end portions D in which the magnetization direction is pinned by exchange coupling with the longitudinal bias layers 41. While with the external magnetic field applied, the magnetization direction is changed. Therefore, the distance between the longitudinal bias layers 41 in the track width direction corresponds to the track width Tw of the thin film magnetic element.

In the manufacturing method in which after the free magnetic layer 15 is deposited, the other antiferromagnetic layer 17 is laminated without the nonmagnetic layer 16, the magnetization direction of the free magnetic layer 15 can easily be pinned perpendicularly to the magnetization direction of the pinned magnetic layer 13.

However, in this embodiment, the thickness dimension of the longitudinal bias layers 41 decreases in the portions Sb at both sides of the track. Therefore, in the portions Sb at both sides of the track, the effect of exchange coupling between the free magnetic layer 15 and the longitudinal bias layers 41 decreases. As a result, in the portions Sb at both sides of the track, the magnetization direction of the free magnetic layer 15 shown in FIG. 24 is not completely pinned in the X direction and is thus changed by applying the external magnetic field.

Particularly, when the track is narrowed for improving the recording density of the magnetic recording medium, not only information on a magnetic recording track to be read within the track width Tw but also information on the adjacent magnetic recording track are read by the portions Sb at both sides of the track, i.e., side reading possibly occurs.

Also, even when the second antiferromagnetic layer 12 and the longitudinal bias layers 41 are formed by using antiferromagnetic materials having the same composition, the exchange anisotropic magnetic field of the longitudinal bias layers 41 can be oriented in the X direction with the exchange anisotropic magnetic field of the second antiferromagnetic layer 12 being oriented in the Y direction.

The thin film magnetic element shown in FIG. 24 can exhibit the same effect as the thin film magnetic element shown in FIG. 7 except the spin filter effect exhibited by the thin film magnetic element of the seventh embodiment shown in FIG. 7.

FIG. 8 is a sectional view of the thin film magnetic element according to the eighth embodiment of the present invention, as viewed from the ABS side.

The method of manufacturing the thin film magnetic element of this embodiment is substantially the same as the seventh embodiment shown in FIGS. 32 to 35 except that the free magnetic layer 31 is formed as a so-called synthetic ferrimagnetic free magnetic layer comprising the first and second free magnetic layers 31a and 31c which have magnetic movements of different magnitudes per unit area and which are laminated with the nonmagnetic intermediate layer 31b provided therebetween, and that the other antiferromagnetic layer is not deposited in the multilayer film A3. In this embodiment, the nonmagnetic layer 16 is the uppermost layer of the multilayer film A3, and thus the surface of the nonmagnetic layer 16 is oxidized in first magnetic field annealing of the multilayer film A3. Therefore, the surface of the nonmagnetic layer 16 is cut off by 20 Å by ion milling to remove the oxidized portion before the longitudinal bias layers 41 are deposited.

Each of the first and second free magnetic layers 31a and 31c is made of a ferromagnetic material, for example, a NiFe alloy, Co, a CoNiFe alloy, a CoFe alloy, a CoNi alloy, or the like. Particularly, the NiFe alloy is preferably used.

The nonmagnetic intermediate layer 31b is made of a nonmagnetic material, for example, an alloy of at least one element of Ru, Rh, Ir, Cr, Re, and Cu. Particularly, Ru is preferably used.

In this embodiment, the anti-diffusion layer made of Co or the like may be formed between the first free magnetic layer 31a and the nonmagnetic material layer 14. The anti-diffusion layer prevents mutual diffusion between the first free magnetic layer 31a and the nonmagnetic material layer 14.

The first and second free magnetic layers 31a and 31c are formed to have different magnetic moments per unit area. The magnetic moment per unit area is represented by the product of the saturation magnetization (Ms) and the thickness (t). Therefore, for example, when the first and second free magnetic layers 31a and 31c are formed by using the same material to have different thicknesses, the first and second free magnetic layers 31a and 31c have different magnetic moments per unit area.

When the anti-diffusion layer of Co or the like is formed between the first free magnetic layer 31a and the nonmagnetic material layer 14, the total magnetic moment per unit area of the first free magnetic layer 31a and the anti-diffusion layer is preferably different from the magnetic moment per unit area of the second free magnetic layer 31c.

The thickness tf2 of the second free magnetic layer 31c is preferably in the range of 0.5 to 2.5 nm. Also, the thickness tf1 of the first free magnetic layer 31a is preferably in the range of 2.5 to 4.5 nm, more preferably in the range of 3.0 to 4.0 nm, and most preferably in the range of 3.5 to 4.0 nm. With the thickness tf1 of the first free magnetic layer 31a out of the above range, the rate of magnetoresistance change of the spin valve thin film magnetic element cannot be increased.

In FIG. 8, the first free magnetic layer 31a and the second free magnetic layer 31c having different magnetic moments per unit area are laminated with the nonmagnetic intermediate layer 31b provided therebetween to form the single free magnetic layer 31.

The first and second free magnetic layers 31a and 31c are in the ferrimagnetic state in which the magnetization directions thereof are 180° different in an antiparallel state. In this case, the magnetization direction the free magnetic layer having a higher magnetic moment per unit area, for example, the first free magnetic layer 31a, is oriented in the direction of the magnetic field produced from the longitudinal bias layers 41, the magnetization direction of the second free magnetic layer 31c being oriented in the 180° opposite direction.

When the first and second free magnetic layers 31a and 31c are in the ferrimagnetic state in which the magnetization directions thereof are 180° different in an antiparallel state, an effect equivalent to the effect of decreasing the thickness of the free magnetic layer 31 can be obtained to decrease saturation magnetization. Therefore, magnetization of the free magnetic layer 31 easily varies to improve the magnetic field sensitivity of a magnetoresistive element.

The direction of the synthetic magnetic moment per unit area corresponding to the total of the magnetic moments per unit area of the first and second free magnetic layers 31a and 31c coincides with the magnetization direction of the free magnetic layer 31.

However, only the magnetization direction of the first free magnetic layer 31a contributes to output based on the relation to the magnetization direction of the pinned magnetic layer 13.

When the first and second free magnetic layers 31a and 31c have different magnetic thicknesses, the spin flop magnetic field of the free magnetic layer 31 can be increased.

In this embodiment, like in the seventh embodiment, the track width Tw of the thin film magnetic element can be precisely defined. Also, even when the second antiferromagnetic layer 12 and the longitudinal bias layers 41 are formed by using antiferromagnetic materials having the same composition, the exchange anisotropic magnetic field of the longitudinal bias layers 41 can be oriented in the X direction with the exchange anisotropic magnetic field of the second antiferromagnetic layer 12 being oriented in the Y direction.

The thin film magnetic element shown in FIG. 8 can exhibit effects equivalent to the other effects of the thin film magnetic element of the seventh embodiment shown in FIG. 7.

In the thin film magnetic elements of the seventh and eighteenth embodiments, the free magnetic layer 15 may be formed as a synthetic ferrimagnetic free magnetic layer.

Figure 36:
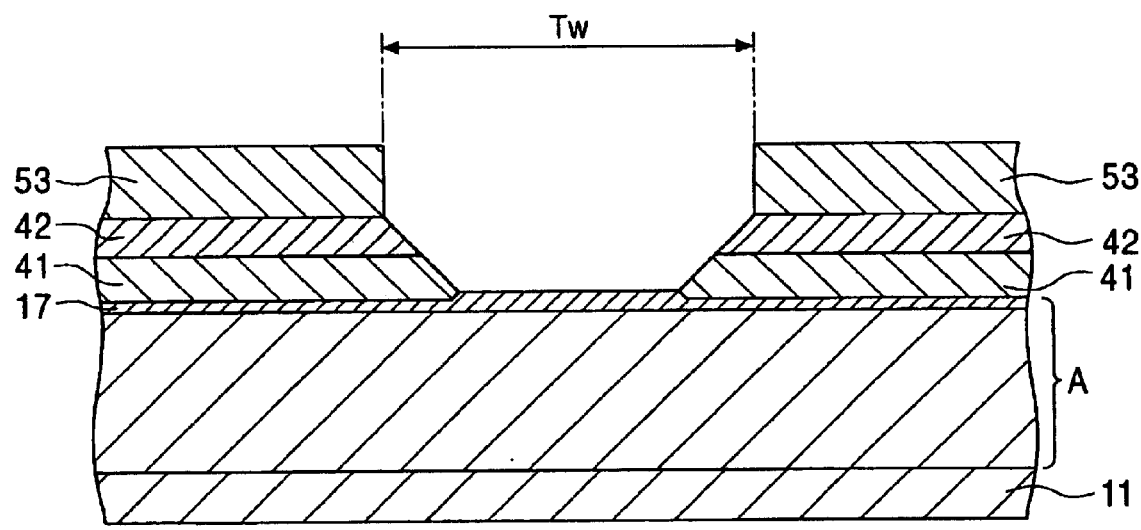
FIG. 36 is a sectional view illustrating a step of a method of manufacturing a thin film magnetic element according to a twenty-third embodiment of the present invention.
Figure 37:
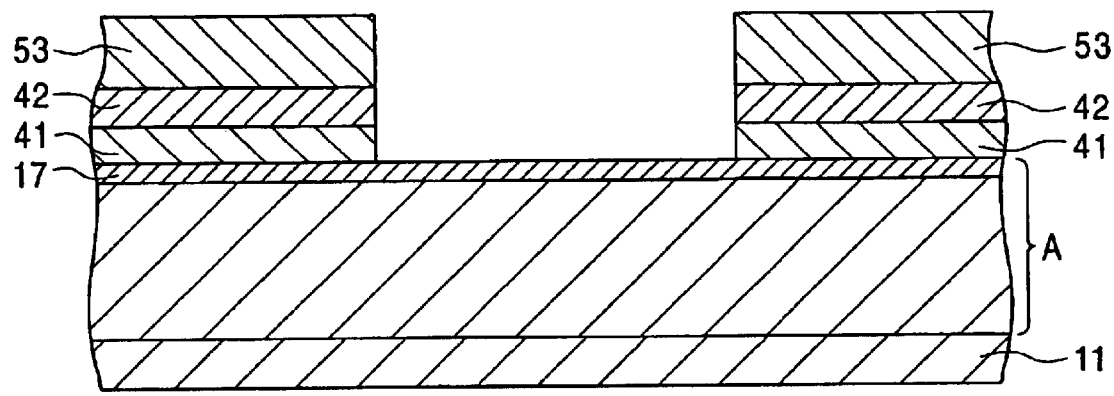
FIG. 37 is a sectional view illustrating the step next to the step shown in FIG. 36 in the method of manufacturing the thin film magnetic element of the present invention.
Figure 38:
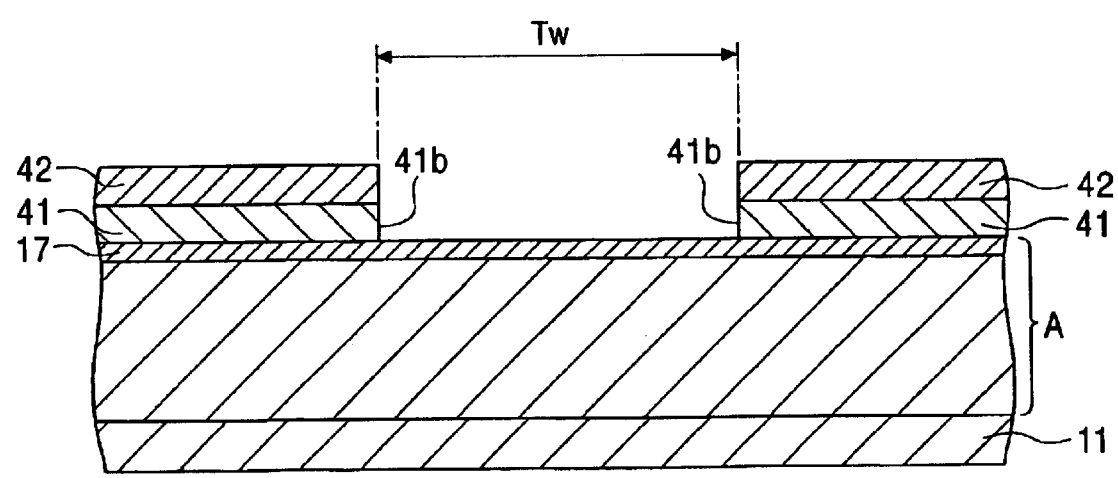
FIG. 38 is a sectional view illustrating the step next to the step shown in FIG. 37 in the method of manufacturing the thin film magnetic element of the present invention.

For example, in the thin film magnetic element shown in FIG. 7, resist layers 53 are deposited on the electrode layers 42 as shown in FIG. 36, and the region between the resist layers 53 is cut off by ion milling or RIE up to the other antiferromagnetic layer 17 as shown in FIG. 37, and the resist layers are then removed. In this case, the side surfaces 41b of the longitudinal bias layers 41, which are located on both sides of the track, are perpendicular to the surface 11a of the substrate 11, as shown in FIG. 38. Therefore, the effect of exchange coupling between the free magnetic layer 15 and the longitudinal bias layers 41 is uniform in the regions where the free magnetic layer 15 is overlapped with the longitudinal bias layers 41. Namely, the track width Tw of the thin film magnetic element can be precisely defined.

Figure 39:
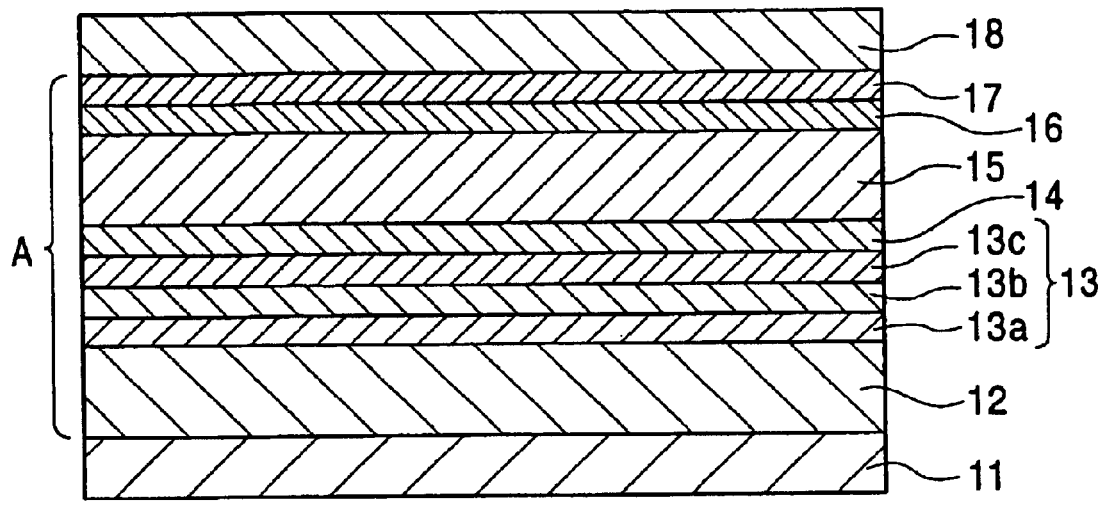
FIG. 39 is a sectional view illustrating a step of a method of manufacturing a thin film magnetic element according to a twenty-fourth embodiment of the present invention.

FIGS. 39 to 43 are sectional views showing a twenty-fourth embodiment of the present invention. FIG. 39 shows the state in which the longitudinal bias layer 18 serving as the first antiferromagnetic layer is laminated on the multilayer film A shown in FIG. 1, the multilayer film A being formed by laminating, on the substrate, the second antiferromagnetic layer 12, the synthetic ferrimagnetic pinned magnetic layer 13 comprising the first pinned magnetic layer 13a, the nonmagnetic intermediate layer 13b and the second pinned magnetic layer 13c, the nonmagnetic material layer 14, the free magnetic layer 15, the nonmagnetic layer 16, and the other antiferromagnetic layer 17.

After the multilayer film A is formed, first magnetic field annealing of the multilayer film is performed at a first heat treatment temperature in a magnetic field of first magnitude in the Y direction to produce an exchange anisotropic magnetic field in the second antiferromagnetic layer 12, pinning the magnetization direction of the pinned magnetic layer 13 in the Y direction. In this embodiment, the first heat treatment temperature is 270° C., and the first magnitude of the magnetic field is 800 k (A/m).

In this embodiment, the thickness of the other antiferromagnetic layer 17 is 30 Å. With the other antiferromagnetic layer 17 having a thickness of 30 Å or less, a disordered structure is not transformed to an ordered structure even by magnetic field annealing of the other antiferromagnetic layer 17, thereby causing no exchange anisotropic magnetic field. Therefore, no exchange anisotropic magnetic field is produced in the other antiferromagnetic layer 17 in the first magnetic field annealing of the multilayer film A, and thus the magnetization direction of the free magnetic layer 15 is not pinned in the Y direction.

In the first magnetic field annealing of the multilayer film A, the other antiferromagnetic layer 17 is oxidized by a thickness of about 10 to 20 Å from the surface thereof. Therefore, in the multilayer film A, the surface of the other antiferromagnetic layer 17 is cut by about 20 Å by ion milling to remove the oxidized portion. After the surface of the other antiferromagnetic layer 17 is cur off, the longitudinal bias layer 18 is deposited.

Figure 40:
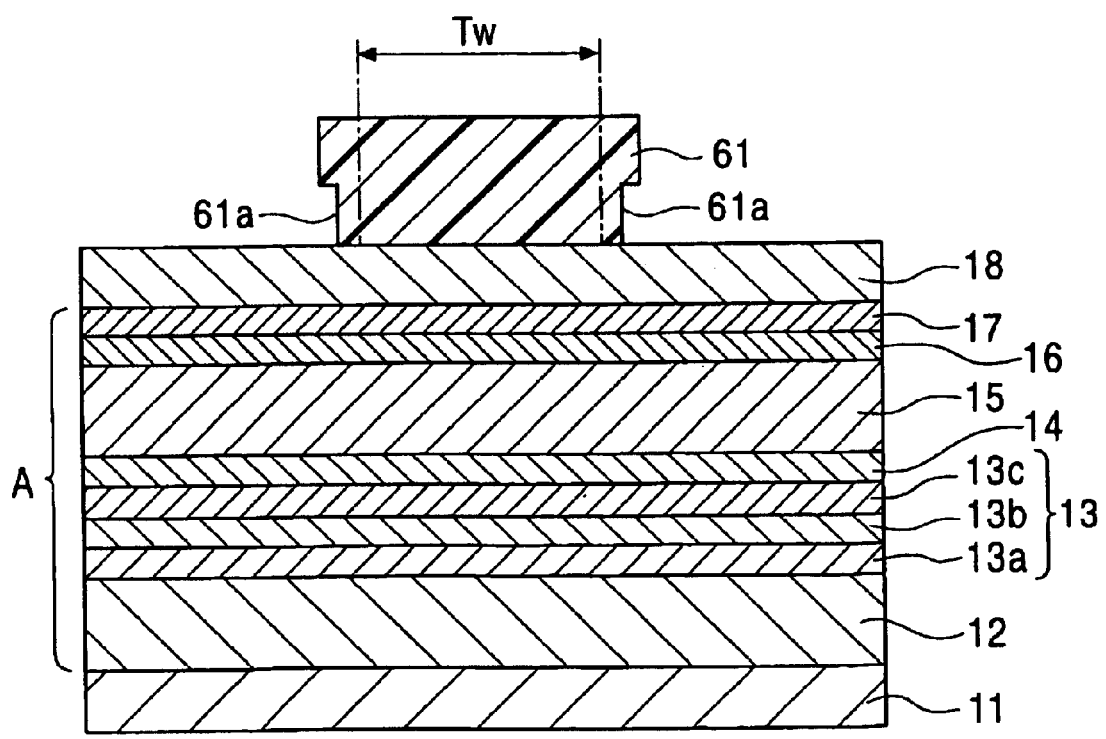
FIG. 40 is a sectional view illustrating the step next to the step shown in FIG. 39 in the method of manufacturing the thin film magnetic element of the present invention.

Next, as shown in FIG. 40, a lift off resist 61 is deposited on the surface of the longitudinal bias layer 18 to cover a region slightly wider than the track width. The resist layer 61 has undercuts 61a formed on the lower side thereof.

Figure 41:
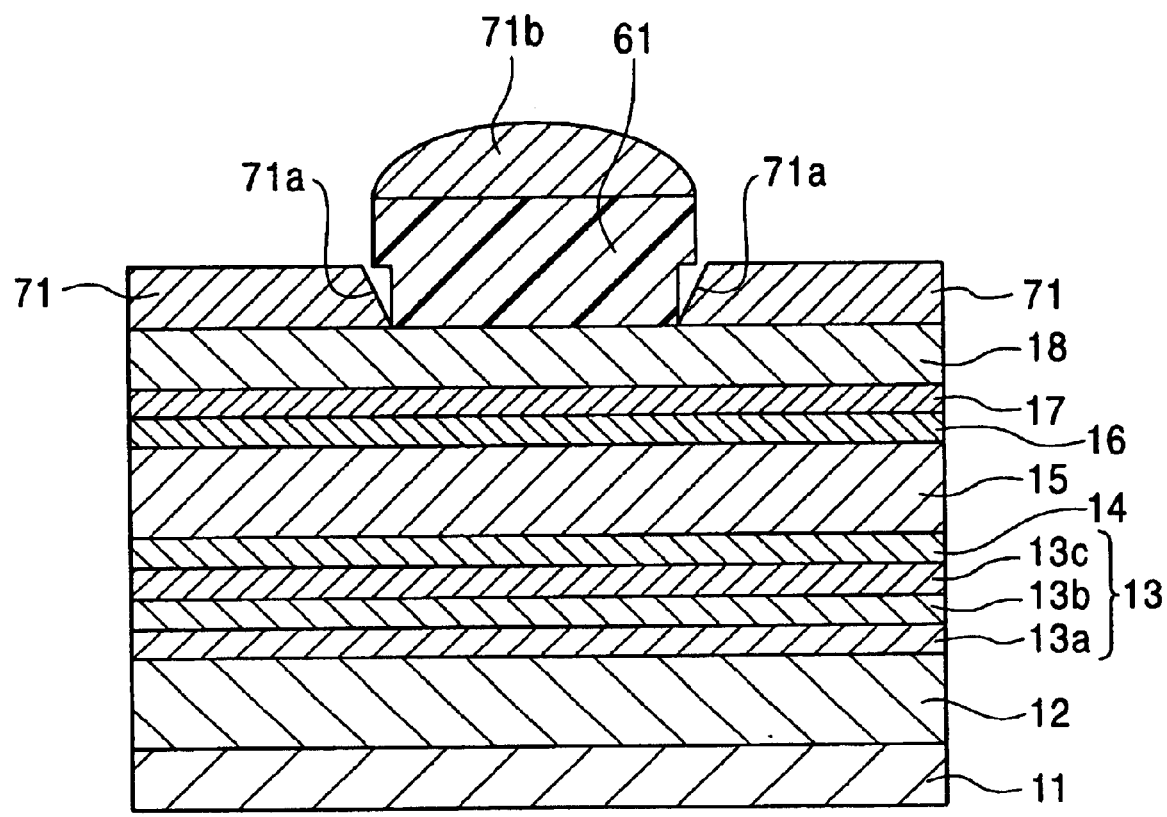
FIG. 41 is a sectional view illustrating the step next to the step shown in FIG. 40 in the method of manufacturing the thin film magnetic element of the present invention.
Figure 42:
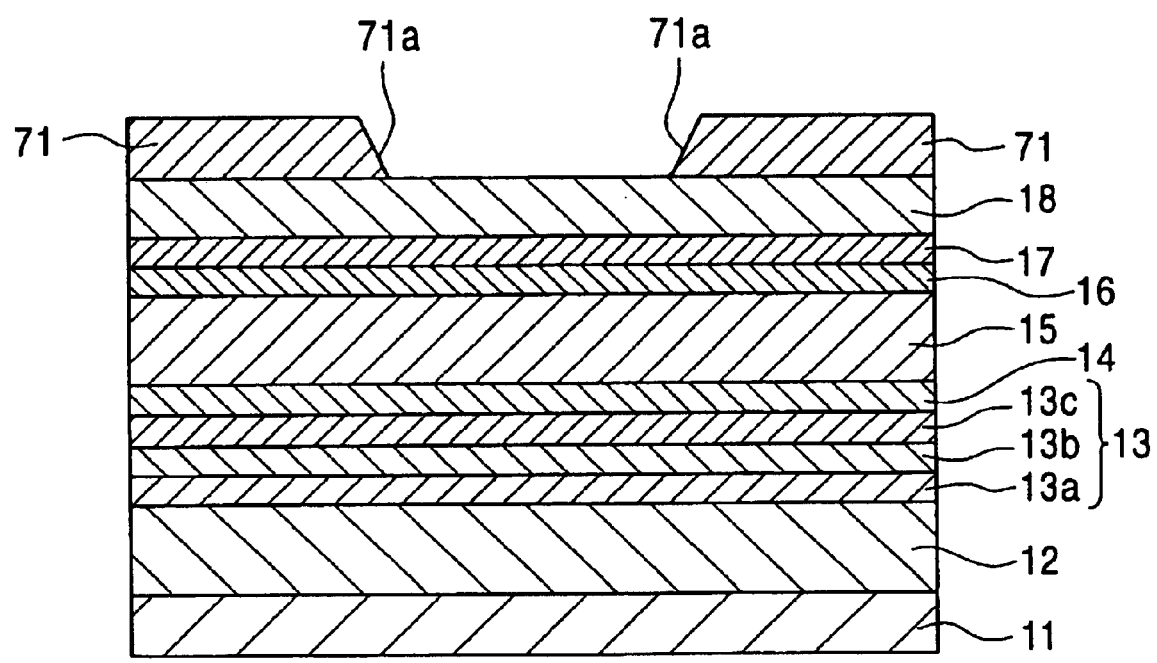
FIG. 42 is a sectional view illustrating the step next to the step shown in FIG. 41 in the method of manufacturing the thin film magnetic element of the present invention.

Furthermore, in the step shown in FIG. 41, electrode layers 71 are deposited on the longitudinal bias layer 18. In this embodiment, the electrode layers 71 are preferably deposited by any one of sputtering methods such as an ion beam sputtering method, a long slow sputtering method, and a collimation sputtering method.

In this embodiment, the substrate 11 on which the multilayer film A is formed is placed perpendicularly to a target having the same composition as the electrode layers 71 so that the electrode layers 71 are formed perpendicularly to the multilayer film A by using, for example, the ion beam sputtering process.

Sputtered particles are less deposited on the regions which are covered with both ends of the lift off resist layer 61. Therefore, the electrode layers 71 are deposited to a small thickness on the regions near the regions covered with both ends of the lift off resist layer 61, and thus the electrode layers 71 have inclined surfaces 71a. In this step, a layer 71b having the same composition as the electrodes layers 71 is also formed on the resist layer 61. After the electrode layers 71 are deposited, the resist layer 61 is removed to obtain the laminate shown in FIG. 42.

Figure 43:
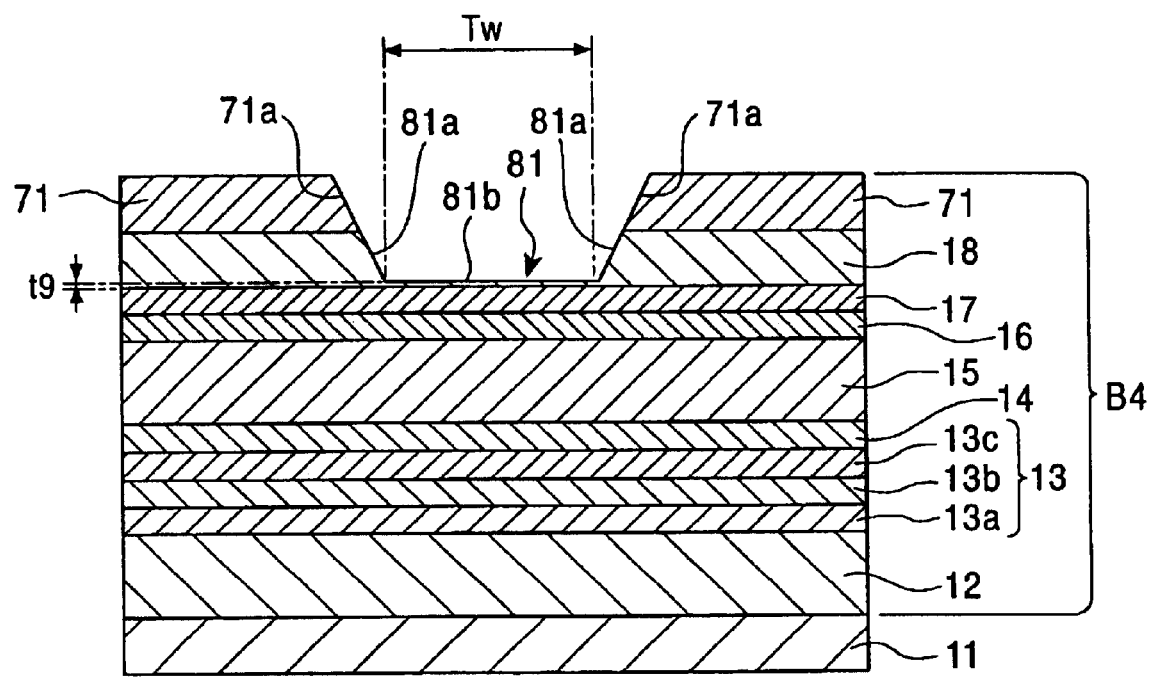
FIG. 43 is a sectional view illustrating the step next to the step shown in FIG. 42 in the method of manufacturing the thin film magnetic element of the present invention.

Furthermore, as shown in FIG. 43, the region of the longitudinal bias layer 18, which is not covered with the electrode layers 71, is cut off by reactive ion etching (RIE) or ion milling by using the electrode layers 71 as a mask to form the recess 81. The side surfaces 81a of the recess 81 are respectively inclined surfaces including the inclined surfaces 71a of the electrode layers 71. In FIG. 43, the recess 81 is formed so that the bottom 81b of the recess 81 is located in the longitudinal bias layer 18.

In this case, the total t9 of the thickness of the region of the longitudinal bias layer 18, which is located below the bottom 81b of the recess 81, and the thickness of the other antiferromagnetic layer 17 is more than 0 and 30 Å or less.

After the recess 81 is formed, the multilayer film B4 formed up to the electrode layers 71 is subjected to second magnetic field annealing at a second heat treatment temperature in a magnetic field of second magnitude in the X direction to produce an exchange anisotropic magnetic field in the longitudinal bias layer 18, pinning the magnetization direction of the free magnetic layer 15 in the X direction. In this embodiment, the second heat treatment temperature is 250° C., and the second magnitude of the magnetic field is 24 k (A/m).

In this embodiment, the track width Tw is defined by the width dimension of the bottom 81b of the recess 81. The width dimension of the bottom 81b of the recess 81 can be defined by controlling the dimension of the resist 61 in the step shown in FIG. 40 and the depth dimension of the recess 81 in the step shown in FIG. 43.

In the step shown in FIG. 43, the recess 81 may be formed so that the bottom 81b of the recess 81 is located either in the other antiferromagnetic layer 17 or in the nonmagnetic layer 16.

In the step shown in FIG. 39, the longitudinal bias layer 18 may be laminated on any one of the multilayer film A1 shown in FIGS. 19 and 20, the multilayer film A2 shown in FIG. 4, the multilayer film A3 shown in FIG. 6 and the multilayer film A4 shown in FIG. 21 in place of the multilayer film A. In these cases, the bottom 81b of the recess 81 can be located in any one of the longitudinal bias layer 18, the other antiferromagnetic layer 17, the nonmagnetic layer 16.

In the first, second, third, thirteenth, fourteenth, fourth, fifth, sixth, fifteenth, twenty-second, seventh, eighth, eighteenth, twenty-third, and twenty-fourth, the pinned magnetic layer 13 may comprise a single ferromagnetic material layer.

In the method of manufacturing the thin film magnetic element shown in FIG. 6 or 8, at least one of the first and second free magnetic layers 31a and 31c is preferably made of a magnetic material represented by the composition formula CoFeNi wherein the composition ratio of Fe is 9 atomic % to 17 atomic 1, the composition ratio of Ni is 0.5 atomic % to 10 atomic %, and the balance is the composition ratio of Co.

As a result, the exchange coupling magnetic field produced between the first and second free magnetic layers 31a and 31c by RKKY interaction can be strengthened. Specifically, the magnetic field with which the antiparallel state is broken, i.e., the spin flop magnetic field (Hsf), can be increased to about 293 (kA/m).

In the above-described composition range, the magnetostriction of the first and second free magnetic layers 31a and 31c can be kept in the range of $-3 \times 10^{-6}$ to $3 \times 10^{-6}$, and the coercive force can be decreased to 790 (A/m) or less.

Furthermore, it is possible to improve the soft magnetic properties of the free magnetic layer 31, and appropriately suppress decreases in the amount of resistance change ($\Delta R$) and the rate of resistance change ($\Delta R/R$) due to Ni diffusion between the free magnetic layer 31 and the nonmagnetic material layer 14.

Also, the intermediate layer 91 made of a CoFe alloy or Co may be provided between the first free magnetic layer 31a and the nonmagnetic material layer 14. In this case, the CoFeNi alloy preferably has a Fe composition ratio of 7 atomic % to 15 atomic %, a Ni composition ratio of 5 atomic % to 15 atomic %, and a Co composition ratio as the balance.

In manufacturing a magnetic head by using any one of the thin film magnetic elements shown in FIGS. 1, 2, 3, 19, 20, 4, 5, 6, 21, 7 and 8, and the thin film magnetic element shown in FIG. 43, an underlying layer made of an insulating material such as alumina is formed between the substrate 11 and the second antiferromagnetic layer 12, a lower shield made of a magnetic material is deposited on the underlying layer, and a lower gap layer made of an insulating material is deposited on the lower shield layer. The thin film magnetic element is laminated on the lower gap layer. Furthermore, an upper gap layer made of an insulating material is formed on the thin film magnetic element, and an upper shield layer made of a magnetic alloy is deposited on the upper gap layer. A writing inductive element may be laminated on the upper shield layer.

As described in detail above, according to the present invention, a magnetoresistive element comprises a multilayer film exhibiting the magnetoresistive effect, and a first antiferromagnetic layer provided for orienting the magnetization direction of at least one magnetic layer which constitutes the multilayer film. In the magnetoresistive element, the first antiferromagnetic layer is laminated above or below the multilayer film with a nonmagnetic layer provided therebetween, and thus the magnetization direction of the magnetic layer is oriented by RKKY interaction with the first antiferromagnetic layer. The RKKY interaction exerts only on the region of the magnetic layer which is located immediately above or below the antiferromagnetic layer having a thickness with antiferromagnetism, but it does not exert on the region out of the region immediately above or below the antiferromagnetic layer having a thickness with antiferromagnetism.

Therefore, the region of the track width (optical track width) Tw set at the time of formation of the multilayer film substantially contributes to reproduction of a recording magnetic field, and functions as a sensitive zone exhibiting the magnetoresistive effect. Namely, in the thin film magnetic element of this embodiment, the optical track width is equal to the magnetic track width, and thus the thin film magnetic element can comply with the higher recording density of a recording medium in comparison to the hard bias system which causes difficulties in controlling the magnetic track width due to the presence of the dead zones.

Also, no dead zone occurs in the region of the track width (optical track width) Tw set at the time of formation of the multilayer film to suppress a decrease in reproduced output when the optical track width Tw of the thin film magnetic element is decreased for complying with a higher recording density.

Furthermore, in the thin film magnetic element of the present invention, the side surfaces of the multilayer film can be formed perpendicularly to the substrate surface, thereby suppressing a variation in the length of the free magnetic layer in the width direction thereof.

In the present invention, the magnetization direction of the magnetic layer is oriented by RKKY interaction with the first antiferromagnetic layer, and thus exchange coupling force can be strengthened as compared with the case of direct contact between the first antiferromagnetic layer and the magnetic layer.

In the present invention, a second antiferromagnetic layer is laminated above or below a free magnetic layer, and thus the magnetization direction of the free magnetic layer is oriented by an exchange coupling magnetic field with the second antiferromagnetic layer. The exchange coupling magnetic field exerts only on the region of the magnetic layer immediately above or below the antiferromagnetic layer having a thickness with antiferromagnetism, but it does not exert on the region out of the region immediately above or below the antiferromagnetic layer having a thickness with antiferromagnetism.

Therefore, the region of the track width (optical track width) Tw set at the time of formation of the thin film magnetic element substantially contributes to reproduction of a recording magnetic field, and functions as the sensitive zone exhibiting the magnetoresistive effect. Namely, in the thin film magnetic element of this embodiment, the optical track width is equal to the magnetic track width, and thus the thin film magnetic element can comply with the higher recording density of a recording medium in comparison to the hard bias system which causes difficulties in controlling the magnetic track width due to the presence of the dead zones.

In the thin film magnetic element of the present invention, even when the first and second antiferromagnetic layers are formed by using antiferromagnetic materials having the same composition, the second antiferromagnetic layer is deposited after magnetic field annealing for pinning the magnetization direction of the first antiferromagnetic layer so that with no external magnetic field applied, the magnetization directions of the free magnetic layer and the pinned magnetic layer can be made perpendicular to each other.

Particularly, the present invention further comprises another antiferromagnetic layer having the function to prevent oxidation of the free magnetic layer during magnetic field annealing before the second antiferromagnetic layer is deposited.

In the present invention, the multilayer film comprising the first antiferromagnetic layer and the pinned magnetic layer is subjected to first magnetic field annealing to pin the magnetization direction of the pinned magnetic layer in a predetermined direction before the second antiferromagnetic layer is deposited. Then, the second antiferromagnetic layer is laminated on the multilayer film, and thus no exchange anisotropic magnetic field occurs in the second antiferromagnetic layer immediately after deposition.

The exchange anisotropic magnetic field of the second antiferromagnetic layer is not produced until the step of second magnetic field annealing, thereby facilitating the change of the magnetization direction of the free magnetic layer in a predetermined direction. Therefore, when the second heat treatment temperature is set to a temperature lower than the blocking temperature at which the exchange coupling magnetic field of the first antiferromagnetic layer is lost, and the second magnitude of the magnetic field is set to be lower than the exchange coupling magnetic field of the first antiferromagnetic layer, the magnetization direction of the free magnetic layer can easily be pinned in the direction perpendicular to the magnetization direction of the pinned magnetic layer.

Particularly, even when the first and second antiferromagnetic layers are formed by using the same antiferromagnetic material, the magnetization direction of the free magnetic layer can easily be pinned perpendicularly to the magnetization direction of the pinned magnetic layer.

What is claimed is:

1. A thin film magnetic element comprises a multilayer film exhibiting a magnetoresistive effect, and a first antiferromagnetic layer for orienting the magnetization direction of at least one magnetic layer which constitutes the multilayer film;

the multilayer film comprising a second antiferromagnetic layer, a pinned magnetic layer in which the magnetization direction is pinned by the second antiferromagnetic layer, a nonmagnetic material layer, and a free magnetic layer in which the magnetization direction changes with an external magnetic field, the first antiferromagnetic layer laminated above or below the free magnetic layer with the nonmagnetic material layer provided therebetween so that the magnetization direction of the free magnetic layer is oriented in a direction crossing the magnetization direction of the pinned magnetic layer with magnetic coupling with the first antiferromagnetic layer;

the free magnetic layer comprising a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other, and wherein at least one of the plurality of the ferromagnetic material layers is made of a magnetic material having a composition represented by the following formula:

CoFeNi wherein the composition ratio of Fe is 9 atomic % to 17 atomic %, the composition ratio of N is 0.5 atomic % to 10 atomic %, and the balance is the composition ratio of Co.

2. A thin film magnetic element according to claim 1, wherein the thickness of the free magnetic layer is set in the range of 15 to 45 Å.

3. A thin film magnetic element according to claim 1, wherein all of the plurality of the ferromagnetic material layers are made of CoFeNi, in which the composition ratio of Fe is 9 atomic % to 17 atomic %, the composition ratio of Ni is 0.5 atomic % to 10 atomic %, and the balance is the composition ratio of Co.

4. A thin film magnetic element according to claim 1, wherein the first and the second antiferromagnetic layers are made of antiferromagnetic materials having the same composition.

5. A thin film magnetic element according to claim 1, wherein the first antiferromagnetic layer and/or the second antiferromagnetic layer is made of a PtMn alloy, a X—Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

6. A thin film magnetic element according to claim 1, wherein the nonmagnetic layer is made of a conductive material.

7. A thin film magnetic element according to claim 6, wherein the nonmagnetic layer is made of at least one element selected from the group consisting of Ru, Cu, Ag, and Au.

8. A thin film magnetic element according to claim 7, wherein the nonmagnetic layer is made of Ru, and has a thickness of 8 to 11 Å.

9. A thin film magnetic element according to claim 1, wherein another antiferromagnetic layer is provided between the nonmagnetic layer and the first antiferromagnetic layer.

10. A thin film magnetic element according to claim 9, wherein the other antiferromagnetic layer comprises a specular reflection layer for extending the mean free path of conduction electrons by a specular reflection effect.

11. A thin film magnetic element according to claim 10, wherein the specular reflection layer comprises a material which can form an energy gap having the high probability of specular reflection which maintains the spin state of conduction electrons.

12. A thin film magnetic element according to claim 11, wherein the specular reflection layer comprises a single layer film or multilayer film of a semi-metal Heusler alloy.

13. A thin film magnetic element according to claim 10, wherein the semi-metal Heusler alloy is either of NiMnSb and PtMnSb.

14. A thin film magnetic element according to claim 1, wherein the first antiferromagnetic layer comprises a pair of antiferromagnetic layers formed above or below the nonmagnetic layer to be arranged with a predetermined space therebetween in the track width direction.

15. A thin film magnetic element according to claim 14, wherein the thickness of the other antiferromagnetic layer is more than 0 and 30 Å or less.

16. A thin film magnetic element according to claim 1, wherein a recess having a width dimension corresponding to a track width is formed in the first antiferromagnetic layer.

17. A thin film magnetic element according to claim 16, wherein the recess has the side surfaces perpendicular to the surface of the substrate.

18. A thin film magnetic element according to claim 16, wherein the bottom of the recess is provided in the first antiferromagnetic layer.

19. A thin film magnetic element according to claim 18, wherein the thickness of the region of the first antiferromagnetic layer, which is overlapped with the bottom of the recess, or the total thickness of the region of the first antiferromagnetic layer, which is overlapped with the bottom of the recess, and the other antiferromagnetic layer is 30 Å or less.

20. A thin film magnetic element according to claim 16, wherein the bottom of the recess is provided in the other antiferromagnetic layer laminated between the nonmagnetic layer and the first antiferromagnetic layer.

21. A thin film magnetic element according to claim 20, wherein the thickness of the region of the other antiferromagnetic layer, which is overlapped with the bottom of the recess, is more than 0 and 30 Å or less.

22. A thin film magnetic element according to claim 16, wherein the bottom of the recess is provided in the nonmagnetic layer.

23. A thin film magnetic element according to claim 1, wherein the pinned magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other.

24. A thin film magnetic element according to claim 23, wherein each of the nonmagnetic intermediate layers is made of an alloy of at least one element selected from the group consisting of Ru, Rh, Ir, Cr, Re and Cu.

25. A thin film magnetic element according to claim 1, wherein an intermediate, layer made of a CoFe alloy or Co is formed between the nonmagnetic material layer and the ferromagnetic material layer deposited closest to the nonmagnetic material layer.

26. A thin film magnetic element according to claim 25, wherein at least one of the plurality of the ferromagnetic material layers is made of a magnetic material having a composition represented by the following formula:

CoFeNi in which the composition ratio of Fe is 7 atomic % to 15 atomic %, the composition ratio of Ni is 5 atomic % to 15 atomic %, and the balance is the composition ratio of Co.

27. A thin film magnetic element comprising a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field, wherein a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer, and another antiferromagnetic layer is laminated between the free magnetic layer and the second antiferromagnetic layer;

the free magnetic layer having a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other, and wherein at least one of the plurality of the ferromagnetic material layers is made of a magnetic material having a composition represented by the following formula:

CoFeNi wherein the composition ratio of Fe is 9 atomic % to 17 atomic %, the composition ratio of Ni is 0.5 atomic % to 10 atomic %, and the balance is the composition of Co.

28. A thin film magnetic element according to claim 27, wherein the thickness of the free magnetic layer is set in the range of 15 to 45 Å.

29. A thin film magnetic element according to claim 27, wherein the first antiferromagnetic layer and the second antiferromagnetic layer are made of antiferromagnetic materials having the same composition.

30. A thin film magnetic element according to claim 27, wherein all of the plurality of the ferromagnetic material layers are made of CoFeNi, in which the composition ratio of Fe is 9 atomic % to 17 atomic %, the composition ratio of Ni is 0.5 atomic % to 10 atomic %, and the balance is the composition ratio of Co.

31. A thin film magnetic element according to claim 27, wherein the first antiferromagnetic layer and/or the second antiferromagnetic layer is made of a PtMn alloy, a X-Mn (wherein X is at least one element of Pd, Ir, Rh, Ru, Os, Ni, and Fe) alloy, or a Pt—Mn—X' (wherein X' is at least one element of Pd, Ir, Rh, Ru, Au, Ag, Os, Cr, Ni, Ar, Ne, Xe, and Kr).

32. A thin film magnetic element according to claim 27, wherein the other antiferromagnetic layer comprises a specular reflection layer for extending the mean free path of conduction electrons.

33. A thin film magnetic element according to claim 32, wherein the specular reflection layer is made of a material which can form an energy gap having the high probability of specular reflection which maintains the spin state of the conduction electrons.

34. A thin film magnetic element according to claim 33, wherein the specular reflection layer comprises a single layer film or multilayer film of a semi-metal Heusler alloy.

35. A thin film magnetic element according to claim 34, wherein the semi-metal Heusler alloy is either of NiMnSb and PtMnSb.

36. A thin film magnetic element according to claim 27, wherein the thickness of the other antiferromagnetic layer is more than 0 and 30 Å or less.

37. A thin film magnetic element according to claim 36, wherein the thickness of the other antiferromagnetic layer is 10 Å to 30 Å.

38. A thin film magnetic element according to claim 27, wherein a recess having a width dimension corresponding to a track width is formed in the second antiferromagnetic layer.

39. A thin film magnetic element according to claim 38, wherein the recess has the side surfaces perpendicular to the surface of the substrate.

40. A thin film magnetic element according to claim 38, wherein claim 38, wherein the bottom of the recess is provided in the second antiferromagnetic layer.

41. A thin film magnetic element according to claim 40, wherein the total thickness of the region of the second antiferromagnetic layer, which is overlapped with the bottom of the recess, and the other antiferromagnetic layer is more than 0 and 30 Å or less.

42. A thin film magnetic element according to claim 38, wherein the bottom of the recess is provided in the other antiferromagnetic layer.

43. A thin film magnetic element according to claim 38, wherein the thickness of the region of the other antiferromagnetic layer, which is overlapped with the bottom of the recess, is more than 0 and 30 Å or less.

44. A thin film magnetic element according to claim 27, wherein the pinned magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other.

45. A thin film magnetic element according to claim 44, wherein each of the nonmagnetic intermediate layers is made of an alloy of at least one element selected from the group consisting of Ru, Rh, Ir, Cr, Re and Cu.

46. A thin film magnetic element according to claim 27, wherein an intermediate layer made of a CoFe alloy or Co is formed between the nonmagnetic material layer and the ferromagnetic material layer laminated closest to the nonmagnetic material layer.

47. A thin film magnetic element according to claim 46, wherein at least one of the plurality of the ferromagnetic material layers is made of a magnetic material having a composition represented by the following formula:

CoFeNi wherein the composition ratio of Fe is 7 atomic % to 15 atomic %, the composition ratio of Ni is 5 atomic % to 15 atomic %, and the balance is the composition ratio of Co.

48. A thin film magnetic element comprising a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field;

wherein a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer;

a recess having a width dimension corresponding to a track width is formed in the second antiferromagnetic layer;

the first and second antiferromagnetic layers are made of antiferromagnetic materials having the same composition; and the pinned magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other;

the free magnetic layer comprises a plurality of ferromagnetic material layers having magnetic moments of different magnitudes per unit area, which are laminated through nonmagnetic intermediate layers so that the adjacent ferromagnetic material layers through the nonmagnetic intermediate layer are in a ferrimagnetic state in which the magnetization directions thereof are antiparallel to each other, and at least one of the plurality of the ferromagnetic material layers is made of a magnetic material having a composition represented by the following formula:

CoFeNi wherein the composition ratio of Fe is 9 atomic % to 17 atomic %, the composition ratio of Ni is 0.5 atomic % to 10 atomic %, and the balance is the composition ratio of Co.

49. A thin film magnetic element according to claim 48, wherein each of the nonmagnetic intermediate layers is made of an alloy of at least one element selected from the group consisting of Ru, Rh, Ir, Cr, Re and Cu.

50. A thin film magnetic element according to claim 48, wherein all of the plurality of the ferromagnetic material layers are made of CoFeNi, in which the composition ratio of Fe is 9 atomic % to 17 atomic %, the composition ratio of Ni is 0.5 atomic % to 10 atomic %, and the balance is the composition ratio of Co.

51. A thin film magnetic element according to claim 48, wherein the bottom of the recess is provided in the second antiferromagnetic layer.

52. A thin film magnetic element according to claim 51, wherein the thickness of the region of the second antiferromagnetic layer, which is overlapped with the bottom of the recess, is more than 0 and 30 Å or less.

53. A thin film magnetic element according to claim 48, wherein an intermediate layer made of a CoFe alloy or Co is formed between the nonmagnetic material layer and the ferromagnetic material layer deposited closest to the nonmagnetic material layer.

54. A thin film magnetic element according to claim 53, wherein at least one of the plurality of the ferromagnetic material layers is made of a magnetic material having a composition represented by the following formula:

CoFeNi wherein the composition ratio of Fe is 7 atomic % to 15 atomic %, the composition ratio of Ni is 5 atomic % to 15 atomic %, and the balance is the composition ratio of Co.

55. A thin film magnetic element comprises a multilayer film exhibiting a magnetoresistive effect, and a first antiferromagnetic layer for orienting the magnetization direction of at least one magnetic layer which constitutes the multilayer film;

the multilayer film comprises a second antiferromagnetic layer, a pinned magnetic layer in which the magnetization direction is pinned by the second antiferromagnetic layer, a nonmagnetic material layer, and a free magnetic layer in which the magnetization direction changes with an external magnetic field, wherein the first antiferromagnetic layer is laminated above or below the free magnetic layer with the nonmagnetic material layer provided therebetween so that the magnetization direction of the free magnetic layer is oriented in a direction crossing the magnetization direction of the pinned magnetic layer with magnetic coupling with the first antiferromagnetic layer;

the free magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other, and wherein at least one of the plurality of the ferromagnetic material layers is made of a magnetic material having a composition represented by the following formula:

CoFeNi in which the composition ratio of Fe is 7 atomic % to 15 atomic %, the composition ratio of Ni is 5 atomic % to 15 atomic %, and the balance is the composition ratio of Co.

56. A thin film magnetic element comprising a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field, wherein a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer, and another antiferromagnetic layer is laminated between the free magnetic layer and the second antiferromagnetic layer;

the free magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other, an intermediate layer made of a CoFe alloy or Co is formed between the nonmagnetic material layer and the ferromagnetic material layer laminated closest to the nonmagnetic material layer, and at least one of the plurality of the ferromagnetic material layers is made of a magnetic material having a composition represented by the following formula:

CoFeNi wherein the composition ratio of Fe is 7 atomic % to 15 atomic %, the composition ratio of Ni is 5 atomic % to 15 atomic %, and the balance is the composition ratio of Co.

57. A thin film magnetic element comprising a first antiferromagnetic layer, a pinned magnetic layer in which the magnetization direction is pinned by the first antiferromagnetic layer, a nonmagnetic material layer, and a free magnetic layer in which the magnetization direction changes with an external magnetic field;

a second antiferromagnetic layer is provided above or below the free magnetic layer so that the magnetization direction of the free magnetic layer is oriented in a direction crossing the magnetization direction of the pinned magnetic layer by exchange coupling with the second antiferromagnetic layer;

a recess having a width dimension corresponding to a track width is formed in the second antiferromagnetic layer;

the first and second antiferromagnetic layers are made of antiferromagnetic materials having the same composition;

the pinned magnetic layer comprises a plurality of ferromagnetic material layers having magnetic moments of different magnitudes per unit area, which are laminated through nonmagnetic intermediate layers so that the adjacent ferromagnetic material layers with the nonmagnetic intermediate layer provided therebetween are in a ferrimagnetic state in which the magnetization directions thereof are antiparallel to each other;

the free magnetic layer comprises a plurality of ferromagnetic material layers having magnetic moments of different magnitudes per unit area, which are laminated through nonmagnetic intermediate layers so that the adjacent ferromagnetic material layers through the nonmagnetic intermediate layer are in a ferrimagnetic state in which the magnetization directions thereof are antiparallel to each other;

an intermediate layer made of a CoFe alloy or Co is formed between the nonmagnetic material layer and the ferromagnetic material layer deposited closest to the nonmagnetic material layer, and at least one of the plurality of the ferromagnetic material layers is made of a magnetic material having a composition represented by the following formula:

CoFeNi wherein the composition ratio of Fe is 7 atomic % to 15 atomic %, the composition ratio of Ni is 5 atomic % to 15 atomic %, and the balance is the composition ratio of Co.

* * * * *

UNITED STATES PATENT AND TRADEMARK OFFICE
CERTIFICATE OF CORRECTION

PATENT NO. : 6,764,778 B2 Page 1 of 1
DATED : July 20, 2004
INVENTOR(S) : Masamichi Saito et al.

It is certified that error appears in the above-identified patent and that said Letters Patent is hereby corrected as shown below:

Column 113,
Line 2, before "wherein the bottom" delete "wherein claim 38,".
Line 12, after "according to" delete "claim 38," and substitute -- claim 42, -- in its place.

Signed and Sealed this

Fifteenth Day of February, 2005

JON W. DUDAS
*Director of the United States Patent and Trademark Office*